(12) United States Patent  
Ramachandran et al.

(10) Patent No.: US 8,011,572 B2  
(45) Date of Patent: Sep. 6, 2011

(54) BANKING TRANSACTION MACHINE THAT OPERATES RESPONSIVE TO DATA BEARING RECORDS

(75) Inventors: Natarajan Ramachandran, Uniontown, OH (US); Mark Owens, Louisville, OH (US); Mark D. Smith, North Canton, OH (US); Sean Haney, North Canton, OH (US); Andrew Junkins, North Canton, OH (US); Matthew Force, Uniontown, OH (US); H. Thomas Graef, Bolivar, OH (US); Elizabeth M. Herrera, North Canton, OH (US); Robert G. Miller, Bath, OH (US); Roy Mleziva, Canton, OH (US); Jeffrey A. Hill, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 331 days.

(21) Appl. No.: 12/288,788

(22) Filed: Oct. 23, 2008

(65) Prior Publication Data

US 2010/0102118 A1    Apr. 29, 2010

Related U.S. Application Data

(60) Division of application No. 11/097,757, filed on Mar. 31, 2005, now abandoned, which is a division of application No. 09/498,789, filed on Feb. 5, 2000, now Pat. No. 6,941,274, which is a continuation-in-part of application No. 09/037,559, filed on Mar. 9, 1998, now Pat. No. 6,023,688.

(60) Provisional application No. 60/067,316, filed on Nov. 28, 1997.

(51) Int. Cl.  
*G06Q 40/00* (2006.01)  
*G06Q 20/00* (2006.01)  
*G07D 11/00* (2006.01)  
*G07F 19/00* (2006.01)  
*G06K 5/00* (2006.01)  
*G06K 7/00* (2006.01)  
*G06K 7/08* (2006.01)  
*G06K 19/00* (2006.01)  
*G06F 7/08* (2006.01)

(52) U.S. Cl. ........ 235/379; 235/380; 235/381; 235/487; 235/435; 235/449; 705/43; 705/44; 705/67

(58) Field of Classification Search .......... 235/379–381, 235/435, 449, 487; 705/41, 43, 44, 67  
See application file for complete search history.

(56) References Cited

U.S. PATENT DOCUMENTS 4,760,245 A * 7/1988 Fukaya ........................ 235/379

(Continued)

FOREIGN PATENT DOCUMENTS

EP    0 101 772    1/1982

(Continued)

*Primary Examiner* — Daniel Walsh  
(74) *Attorney, Agent, or Firm* — Ralph E. Jocke; Daniel D. Wasil; Walker & Jocke

(57) ABSTRACT

A cash dispensing banking transaction machine that operates responsive to data bearing records includes a card reader that reads identifying data from a user card. The machine dispenses cash from a cash dispenser for a financial account without causing the card reader device to read data from a card corresponding to the financial account, when a determination indicates that a voice of the user included in an audio input signal to audio input device corresponds to a particular recognized user stored in a data store in correlated relation with the financial account.

19 Claims, 36 Drawing Sheets

U.S. PATENT DOCUMENTS

| | | | |
|---|---|---|---|
| 4,942,464 A | 7/1990 | Milatz | |
| 4,990,848 A | 2/1991 | So | |
| 4,991,205 A | 2/1991 | Lemelson | |
| 4,993,068 A | 2/1991 | Piosenka et al. | |
| 5,125,022 A * | 6/1992 | Hunt et al. | 379/88.02 |
| 5,151,582 A * | 9/1992 | Fujioka | 235/469 |
| 5,259,613 A | 11/1993 | Marnell, II | |
| 5,331,544 A | 7/1994 | Lu et al. | |
| 5,386,104 A * | 1/1995 | Sime | 235/379 |
| 5,432,864 A | 7/1995 | Lu et al. | |
| 5,497,314 A | 3/1996 | Novak | |
| 5,546,523 A * | 8/1996 | Gatto | 715/811 |
| 5,557,518 A | 9/1996 | Rosen | |
| 5,576,951 A | 11/1996 | Lockwood | |
| 5,592,377 A | 1/1997 | Lipken | |
| 5,615,277 A | 3/1997 | Hoffman et al. | |
| 5,640,002 A | 6/1997 | Ruppert et al. | |
| 5,644,727 A | 7/1997 | Atkins | |
| 5,722,418 A | 3/1998 | Bro | |
| 5,832,464 A | 11/1998 | Houvener et al. | |
| 5,844,327 A | 12/1998 | Batson | |
| 5,850,470 A * | 12/1998 | Kung et al. | 382/157 |
| 5,864,826 A | 1/1999 | Wada et al. | |
| 5,870,724 A | 2/1999 | Lawlor et al. | |
| 5,878,139 A | 3/1999 | Rosen | |
| 5,893,057 A * | 4/1999 | Fujimoto et al. | 704/246 |
| 5,901,238 A * | 5/1999 | Matsushita | 382/117 |
| 5,983,200 A | 11/1999 | Slotznick | |
| 6,023,688 A | 2/2000 | Ramachandran et al. | |
| 6,049,620 A | 4/2000 | Dickinson et al. | |
| 6,089,451 A | 7/2000 | Krauss | |
| 6,119,096 A | 9/2000 | Mann et al. | |
| 6,149,055 A * | 11/2000 | Gatto | 235/379 |
| 6,173,269 B1 | 1/2001 | Corsini et al. | |
| 6,213,391 B1 * | 4/2001 | Lewis | 235/380 |
| 6,308,887 B1 * | 10/2001 | Korman et al. | 235/379 |
| 6,314,406 B1 | 11/2001 | O'Hagan et al. | |
| 6,330,345 B1 | 12/2001 | Russo et al. | |
| 6,523,742 B1 | 2/2003 | Awatsu et al. | |
| 6,796,492 B1 * | 9/2004 | Gatto | 235/379 |
| 6,810,480 B1 * | 10/2004 | Parker et al. | 713/186 |
| 6,850,872 B1 | 2/2005 | Marschner et al. | |
| 6,941,274 B1 * | 9/2005 | Ramachandran et al. | 705/26.35 |
| 6,944,318 B1 | 9/2005 | Takata et al. | |
| 7,100,818 B2 * | 9/2006 | Swaine | 235/379 |
| 7,494,058 B2 * | 2/2009 | Bonalle et al. | 235/380 |
| 7,543,156 B2 * | 6/2009 | Campisi | 713/186 |
| 7,597,250 B2 * | 10/2009 | Finn | 235/380 |
| 7,814,332 B2 * | 10/2010 | Beenau et al. | 713/186 |
| 2001/0011230 A1 * | 8/2001 | Morganstein et al. | 705/18 |
| 2001/0011680 A1 * | 8/2001 | Soltesz et al. | 235/379 |
| 2001/0051924 A1 * | 12/2001 | Uberti | 705/44 |
| 2003/0046555 A1 * | 3/2003 | Bradley et al. | 713/186 |
| 2003/0161503 A1 * | 8/2003 | Kramer | 382/115 |
| 2003/0209599 A1 * | 11/2003 | Gatto | 235/379 |
| 2003/0220835 A1 * | 11/2003 | Barnes, Jr. | 705/14 |
| 2004/0044627 A1 | 3/2004 | Russell et al. | 705/50 |
| 2005/0167482 A1 * | 8/2005 | Ramachandran et al. | 235/379 |
| 2005/0173519 A1 * | 8/2005 | Gatto | 235/381 |
| 2007/0110283 A1 * | 5/2007 | Hillhouse et al. | 382/115 |
| 2007/0118426 A1 * | 5/2007 | Barnes, Jr. | 705/14 |
| 2007/0164103 A1 * | 7/2007 | Berkowitz et al. | 235/380 |
| 2007/0291996 A1 * | 12/2007 | Hoffman et al. | 382/115 |
| 2008/0019573 A1 * | 1/2008 | Baltatu et al. | 382/115 |
| 2008/0040262 A1 * | 2/2008 | D K et al. | 705/39 |
| 2008/0319872 A1 * | 12/2008 | Russell et al. | 705/26 |
| 2010/0102118 A1 * | 4/2010 | Ramachandran et al. | 235/379 |

FOREIGN PATENT DOCUMENTS

WO　　WO96/36934　　11/1996

* cited by examiner

BANKING TRANSACTION MACHINE THAT OPERATES RESPONSIVE TO DATA BEARING RECORDS

CROSS REFERENCE TO RELATED APPLICATIONS

This application is a divisional of U.S. application Ser. No. 11/097,757 filed Mar. 31, 2005, now abandoned which is a divisional of U.S. application Ser. No. 09/498,789 filed Feb. 05, 2000 now U.S. Pat. No. 6,941,274, which is a continuation-in-part of U.S. application Ser. No. 09/037,559 filed Mar. 09, 1998, now U.S. Pat. No. 6,023,688, which claims the benefit of U.S. Provisional Application No. 60/067,316, filed Nov. 28, 1997.

TECHNICAL FIELD

Exemplary embodiments of the invention pertain to banking systems controlled by data bearing records, classified in U.S. Class 235, Subclass 379. In exemplary embodiments, a method includes operating a banking transaction machine utilizing information read from a user card by a particular card reader device in carrying out transactions through operation of the machine.

BACKGROUND OF INVENTION

Automated transaction machines are known in the prior art. A common type of automated transaction machine is an automated teller machine. Automated teller machines have been developed which are capable of performing a variety of transactions including the dispensing of currency notes. Other types of transaction machines dispense notes and other types of sheets to users such as bank tellers, cashiers and other service providers. Other types of automated transaction machines dispense items such as tickets, travelers checks, scrip, vouchers or gaming materials. Automated transaction machines generally dispense such materials while assessing appropriate charges and credits to the respective accounts of the user, the machine owner and the provider of the dispensed materials. For purposes of this description an automated transaction machine will be considered as any machine that is capable of carrying out transactions including transfers of value.

Automated transaction machines that dispense notes or other types of sheets representative of value are generally constructed to prevent access to the supply of sheets within the machine by unauthorized persons. In most cases such automated transaction machines include a secure chest or other secure enclosure. Access to the enclosure is controlled by a lock or other security device so that the interior thereof may only be accessed by appropriate personnel. The interior of the secure enclosure generally includes storage areas for currency notes and other types of sheets which are valuable. The storage areas are often inside removable canisters or other types of enclosures that may be readily installed in and removed from the machine when the secure area is accessed. Sheets are dispensed by the machine to users from the sheet storage areas. When the storage areas require replenishment a service person opens the secure chest and replenishes the supplies. In some cases this is done by removing the depleted or partially depleted canisters and replacing those canisters with filled canisters. In other situations it may involve inserting a "brick" of currency or sheets into the canisters or other sheet storage areas to replenish the sheet supplies.

A drawback associated with the construction of such conventional automated transaction machines is that replenishing the sheet supplies requires opening the secure area of the machine. This provides the service person with access to all the valuable sheets as well as the sensitive electronic equipment within the machine. This presents opportunities for theft and tampering. When canisters are changed several individuals may have access to the canister during the times when it is being loaded, transported and installed in the machine. Likewise partially depleted canisters returning from machines for replenishment may pass through several hands. This may present opportunities for pilferage for which responsibility cannot be readily documented. Tamper resistant and tamper indicating sheet holding canisters have been developed. However such containers are not failsafe and may still be subject to compromise by skilled thieves. Sheet holding canisters may also be stolen in their entirety when in transit to and from machines. The use of currency canisters is also expensive. The use of such canisters adds to the cost of the automated transaction machines by requiring the inclusion of mechanisms that can open, close and work in conjunction with sheet containing canisters. The handling and transport of canisters also adds to the cost of machine operation.

Lower cost automated transaction machines are often installed in gas stations, convenience stores and other merchandising facilities. Such automated transaction machines often carry out only cash dispensing transactions. While the reduced capabilities of such machines results in a lower machine acquisition cost, the problem of handling sheets still exists. Because the security in such merchandising facilities is often not as high as that found in banking environments, it is not uncommon to use armored car type courier services to carry out cash replenishment transactions in such machines. This adds to the cost of machine operation.

Operators of automated transaction machines in merchandising facilities would desire to replenish the note supplies in such machines with cash that is available within the establishment. Doing this can avoid the cost of having to pay a third party to carry out cash replenishment, which reduces operating costs. However, in many merchandise transaction environments the trustworthiness of the personnel may not be verifiable. As a result the machine operator may not want to give their personnel access to the large amounts of cash which are available within the interior of an automated transaction machine. Replenishing the currency supplies within such machines may be an activity limited to supervisory level personnel. However, despite such precautions shortages and discrepancies can occur. This is particularly true when several individuals have the capability of accessing the interior of a machine.

Recently automated transaction machines have been developed that are capable of "recycling" currency. Such machines are capable of accepting currency notes from a user or operator, and determining the genuineness and particular type of each note. Such machines selectively store the deposited notes in locations within the machine. At a later time when the same or another user requests a dispense of notes, the machine dispenses the previously deposited notes to the user. While such machines have the capability of having the note supplies replenished without accessing the interior of the machine, such machines are generally complex and expensive. The installation of such a machine would generally not be cost justified in situations where relatively low cost, cash dispense only type machines are currently used.

There are also many other types of self service and vending machines that users operate which could be improved by adding the capability to such machines of accepting and dispensing currency notes. Common examples of such machines include motor fuel dispensing pumps, vending machines, automated ticketing machines and automated gaming machines. Often such machines already have a user interface that is capable of reading a user's credit card. Such machines also have the capability of assessing a charge to a user's account in exchange for merchandise or services provided. Increasingly self service machines are being provided with the capability of accepting a user's smart card. Smart cards include a memory thereon which has data representative of monetary value. Instead of assessing a charge to a user's account, such machines also have the capability of deducting the monetary value from the value represented by data in the memory of the user's smart card.

Cash receiving and dispensing capability has generally not been provided in most self service and vending machines for several reasons. First, cash dispensing and accepting mechanisms have in the past generally been expensive and would render such machines cost prohibitive to acquire and operate. Second, such machines generally do not include the security features included in automated teller machines or cash dispensers, because the items generally dispensed by such machines are not readily disposed of for cash value. Another reason such machines have not been provided with cash accepting and/or dispensing capability is that to do so would require the machine operators to incur the additional costs associated with cash handling previously discussed, that are often encountered in the use of operating automated teller machines and cash dispensers. A further drawback has been that making cash acceptance and dispensing an integral part of such machines may limit their operation to selected hours and locations where greater security may be maintained. Thus, while users may benefit from having machines such as motor fuel dispensing pumps and vending machines accept and receive cash, providing such machines with these capabilities has been cost prohibitive.

Thus there exists a need for an automated transaction machine that is inexpensive to produce and operate, but that is also highly reliable. There further exists a need for an automated transaction machine that is capable of being replenished with currency notes or other sheets of value without having to access the note storage areas in the interior of the machine. There further exists a need for an automated transaction machine which includes a note receiving and dispensing component that adds only limited cost to the production and operation of the machine.

OBJECTS OF EXEMPLARY EMBODIMENTS

It is an object of an exemplary embodiment of the invention to provide an automated transaction machine.

It is a further object of an exemplary embodiment of the invention to provide an automated transaction machine which is capable of dispensing sheets having value, such as currency notes.

It is a further object of an exemplary embodiment of the invention to provide an automated transaction machine which dispenses currency notes from a note storage area within the machine and which is capable of having the note storage area replenished without accessing an interior of the machine.

It is a further object of an exemplary embodiment of the invention to provide an automated transaction machine which includes a note supply that can be replenished without accessing an interior area of the machine and which is configurable to be replenished from either the front or the rear side of the machine.

It is a further object of an exemplary embodiment of the invention to provide an automated transaction machine that is economical to produce and to operate.

It is a further object of an exemplary embodiment of the invention to provide an automated transaction machine that is capable of receiving, validating and dispensing sheets such as currency notes.

It is a further object of an exemplary embodiment of the invention to provide an automated transaction machine which provides for the receiving and dispensing of currency notes as a supplementary function to a primary vending or self service function that is carried out by the machine.

It is a further object of an exemplary embodiment of the invention to provide an automated transaction machine which is capable of dispensing notes from a note storage area within the machine and which is capable of having a note supply readily removed from the machine by authorized personnel.

It is a further object of an exemplary embodiment of the invention to provide an automated transaction machine that is easy for users to operate and which provides timely promotional and other messages to users of the machine.

It is a further object of an exemplary embodiment of the invention to provide an automated transaction machine that provides separate user interfaces for both the merchant and the customer/consumer.

It is a further object of an exemplary embodiment of the invention to provide an automated transaction machine that provides an enclosure having an upper portion including user interface areas and a separately connected lower portion including sheet storage areas.

It is a further object of an exemplary embodiment of the invention to provide an automated transaction machine that provides a sheet inlet opening and a sheet outlet opening adjacent the rear of the machine for a merchant side user, and a sheet outlet opening adjacent a front of the machine for a consumer side user.

It is a further object of an exemplary embodiment of the invention to provide an automated transaction machine that provides a merchant user interface adjacent the rear of the machine, and a consumer user interface adjacent a front of the machine.

It is a further object of an exemplary embodiment of the invention to provide a financial transaction apparatus that can identify an authorized user through their general outward appearance and/or voice characteristics.

It is a further object of an exemplary embodiment of the invention to provide a financial transaction apparatus that may identify an authorized user based on a correlation between physical appearance and voice characteristics.

It is a further object of an exemplary embodiment of the invention to provide an automated transaction machine that may determine authorization and/or identity of a merchant user based on the merchant user's appearance and/or voice characteristics.

It is a further object of an exemplary embodiment of the invention to provide a financial transaction apparatus that can identify an authorized user either by physical appearance, voice characteristics, biometrics, or through manual inputs, or any combination thereof.

It is a further object of an exemplary embodiment of the invention to provide an automated transaction machine that may be operated or activated responsive to the sensing of a merchant user's appearance feature and/or voice feature, or any single feature or combination of features relating to a merchant user's appearance, voice, biometrics, user card, etc.

It is a further object of an exemplary embodiment of the invention to provide a method for operating a financial transaction apparatus which includes an operation sequence in which a financial transaction machine outputs audio messages to a user and receives voice instructions from a user in response thereto.

Further objects of exemplary embodiments of the invention will be made apparent in the Following Detailed Description of Exemplary Embodiments and the appended claims.

The foregoing objects are accomplished in an exemplary embodiment by an automated transaction machine. The automated transaction machine may be a machine whose primary function is the receipt and/or dispensing of sheets such as currency notes. Alternatively the automated transaction machine may be associated with a primary function such as the vending of motor fuel, lottery tickets, transit tokens or other transactions and may include the dispensing and/or receipt of sheets having value, such as currency.

The automated transaction machine in one exemplary embodiment includes a machine housing. The housing includes a user interface area including at least one input device through which the machine may receive at least one input from a user of the machine. A sheet inlet opening extends through the housing as does a sheet outlet opening.

Within the housing of the machine is a note receiving and dispensing mechanism. The note receiving and dispensing mechanism is operatively connected to a sheet storage area which in the described embodiment is used for holding currency notes. The sheet receiving and dispensing mechanism includes a passage area through which sheets are passed when they are being received by the mechanism for storage in the storage area. Sheets also pass through the passage area when they are being dispensed by the mechanism from the storage area.

The described embodiment further includes a note inlet transport which extends between the note inlet opening and the passage. A note validator is positioned adjacent the note inlet transport. The note validator is operative to sense notes which are inserted through the inlet opening for purposes of determining whether the notes are valid. The machine further includes a note outlet transport. The note outlet transport extends between the passage and the outlet opening through the housing. The machine further includes one or more drive mechanisms that are operatively connected to the inlet and outlet transports and which enable the selective movement of notes or other sheets therein.

The automated transaction machine of the described embodiment further includes a controller. The controller is in operative connection with the validator and the drive for the inlet and outlet transports. The controller is also in operative connection with the input devices as well as the validator. The controller is operative to control the machine such that in response to at least one input to the input device, notes or other sheets stored in the storage area are dispensed by the mechanism and moved through the outlet transport to the outlet opening. The controller is further operative responsive to insertion of a note or other sheet to the inlet opening to have the validator determine if the inserted note is valid. If so, the note is accepted by the receiving and dispensing mechanism and stored in the storage area.

Configurations of the automated transaction machine of the present invention may provide for both receiving notes from and dispensing notes to customers while charging and crediting appropriate accounts. Alternatively embodiments of the invention may be configured for only dispensing notes to customers who operate the machine. In such embodiments acceptance of notes is limited to personnel who are authorized to replenish the machine on behalf of the machine owner or operator. Alternative configurations of the machine may provide for the note inlet and outlet openings to be positioned on generally one side of the machine, while alternative forms of the invention may provide for such openings to be on generally opposed sides of the machine. Some forms of the invention may provide for accepting sheets into the note inlet opening one sheet at a time while others may be configured for accepting stacks of sheets which are then separated, authenticated and stored within the machine.

In some exemplary forms of the invention, the machine may be configured for separate usage by the merchant and consumer. For example, the merchant cashier may be authorized to use the merchant side interface. The cashier would be able to use a rear side of the machine which would include a cashier user interface, a note inlet opening, and a note outlet opening. The customer or consumer would be able to use the opposite or front side of the machine which would include a consumer user interface and a note outlet opening. Also, the user interfaces may be located in a portion of the machine distinct from a portion of the machine including sheet storage areas. The portions may be operatively connected for carrying out input and output functions. Such an arrangement of distinct portions provides additional security between the user interface areas and the sheet storage areas.

In some exemplary forms of the invention the note receiving and dispensing mechanism may include a roll storage type mechanism. The roll storage mechanism includes a flexible web that extends between a storage reel and a take-up reel. The storage reel and take-up reel are moved by a reel drive mechanism that enables selectively moving the reels to deliver sheets to and to receive sheets from the passage area. The storage and take-up reels in some embodiments are contained within a note storage module that is readily installed in and removed from the machine housing by authorized personnel. Certain preferred forms of the invention are highly reliable and yet relatively lower in cost to produce and operate.

Other preferred forms of the invention include a user interface with a display. The display is used for presenting promotional or other messages to users of the machine. These messages may be time sensitive and/or of limited duration. In preferred forms of the invention such messages are provided by interaction of the controller with a replaceable plug-in memory of a smart card or similar device. Various forms of user interfaces may also be provided to simplify and facilitate operation of automated transaction machines.

DETAILED DESCRIPTION OF EXEMPLARY EMBODIMENTS

Figure 1:
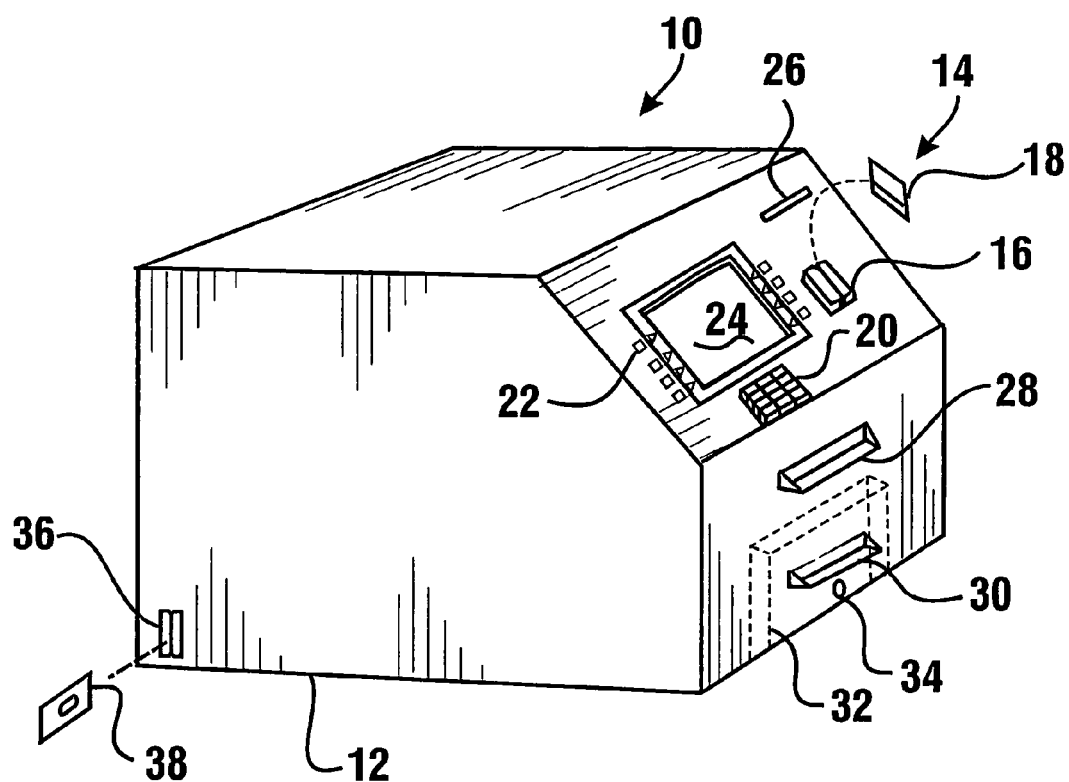
FIG. 1 is an isometric view of one exemplary embodiment of an automated transaction machine of the present invention.

Referring now to the drawings and particularly FIG. 1 as shown therein an automated transaction machine of a first exemplary embodiment of the present invention is generally indicated 10. Machine 10 is an automated teller machine whose primary functions are to dispense and receive currency notes. It should be understood however that other embodiments of the invention may be machines whose primary functions include conducting other types of transactions. These may include for example the dispense of motor fuel, the dispense of tickets, the dispense of vouchers, the dispense of gaming materials or other functions that a user may carry out using the machine. In other embodiments of the invention the machine may be another type of transaction machine, such as check cashing machine, vending machine, or medication dispensing machine. Furthermore, the type of machine used may be a transaction machine at which the identity of a user must be verified as an authorized user.

Machine 10 includes a housing 12. As used herein housing 12 refers to the external enclosure of the machine as well as the internal structures which support components of the machine therein. A user interface generally indicated 14 is supported on the housing and is accessible by a user. In the embodiment shown the user interface includes input devices and output devices. One of the input devices is a card reader 16. Card reader 16 in the machine shown is a swipe type card reader which is operative to read magnetic stripe cards 18 which are passed through the reader by customers. Cards 18 may be various types of cards such as credit or debit cards which include information for identifying the user and/or their accounts.

User interface 14 of the described embodiment also includes other input devices. These include a keypad 20 and function keys 22. Users are enabled to input data and instructions to the machine by selectively pressing the keys which make up the keypad as well as the function keys 22.

The user interface 14 further includes an output device which includes a display 24. Display 24 of the described embodiment may be a CRT or LCD type display that is operative to display messages to a user, including messages which instruct the user in operation of the machine.

It should be understood that the input devices and output devices shown are exemplary and that other embodiments of the invention may employ other types of input and output devices. These include for example other types of card readers for reading magnetic stripe or other types of cards. These may include for example motorized readers or dip readers. Other types of cards may also be employed with the machine. Such cards include so called "smart cards" which include a programmable memory with data thereon. Such data may include information about the user and their accounts. It may also include information representative of monetary value. Such value may be deducted from the memory as the card is used to make purchases. Some cards may have the value thereon periodically replenished. Other types of input devices may be used which read articles such as articles encoded with optical indicia which can be used to identify the user or their accounts. Other types of input devices may include biometric type reading devices such as fingerprint readers, retina scan devices, iris scan devices, speech recognition devices or other types of input devices which are capable of providing an input which can identify a particular user and/or their accounts.

In an exemplary embodiment of the invention, authorization and/or identification of the user of the transaction machine may be determined based on the user's appearance and/or voice characteristics and/or other biometric information and/or card information. Hence, biometric features may be used to identify the user and/or their account. The arrangement and operation may be of the type discussed in U.S. patent application Ser. No. 09/037,559, filed Mar. 9, 1998, entitled "Transaction Apparatus and Method that Identifies an Authorized User by Appearance and Voice," and the disclosure of which is fully incorporated herein by reference.

The transaction machines used in the exemplary embodiments of the invention are capable of being operated, such as in the dispensing of cash, etc., based on the user's appearance and/or voice characteristics and/or other information. The transaction machine, such as an ATM, may be operated or activated based on the sensing of one or more features relating to a user's physical appearance, voice characteristics, biometric input, manual input, such as a user card, etc., or any combination of features thereof. A user's appearance feature, for example, may comprise the user's iris, retina, eyes, face, head, and/or upper body. A user's appearance feature may be used to determine if the appearance of the user corresponds to a particular recognized user. Iris recognition technology, such as an iris scan, may be used to recognize or verify a user.

Based on one or more of the features of the user, such as a customer or a merchant employee, the user's rights or access to transaction machine functions may be limited to specific activities other than full service machine capability. Different recognized users may have different rights. For example, some merchant side users may be permitted to operate the transaction machine only at certain times. Merchant users may be limited to withdrawing a certain amount of money over a certain amount of time and/or withdrawing a total amount of money during a specific time period. The machine may be programmed to recognize that a particular merchant user is limited to withdraw only a maximum amount of money per hour and/or withdraw only a total amount of money over a specific time period, e.g., an eight-hour period. The machine may also have the capability of keeping a current record of whether any amount of money was deposited by the particular merchant user during the specific time period. Hence, the total amount of money that the particular merchant user may receive during the specific time period may be adjusted based on deposits made by that particular merchant user. Other authorized users may have more or fewer machine activity rights.

Likewise, customer users may be permitted to operate the transaction machine or have access to specific machine activities only at certain times based on their recognition by the machine. For example, certain customers may be prohibited from making cash withdrawals during a specific time period. Parents of minors, whom have been provided access to an ATM account, may desire certain security limitations pertaining to the use of the account. Security features, relating to an identified user of a specific account, may limit the total amount of cash withdrawn or transferred over a selected time period, such as a 24-hour period or a week. This arrangement permits the automatic financial supporting of an individual who may be far away, such as a college student.

The machine may also be used as a biometric sign-in device for merchant employees. The owner or operator of the establishment may use the machine as a verification tool to ensure accurate records of employee work history. The machine may be programmed to display an additional option for authorized merchant employees. The option may permit the employees to indicate that they are beginning work.

The transaction machine and the components thereof are in operative connection with a computer. The computer is connected to a data store. The data store includes data corresponding to a plurality of authorized users of the transaction machine. The user data includes for each user, identity data corresponding to the user such as a unique number, which may be a social security number or account number. The data store may include data corresponding to an appearance feature of the user, as well as voice data corresponding to a voice feature of the user. The data store may include other information, including biometric data. The data store may further include for each user, data corresponding to limitations, which may be time based, on rights or access to certain machine services.

The transaction machine may provide image records as well as data records related to transactions and other activities. The arrangement and operation may be of the types discussed in U.S. patent application Ser. No. 09/414,290, filed Oct. 7, 1999, and U.S. patent application Ser. No. 09/414,249, filed Oct. 7, 1999, the disclosures of which are fully incorporated herein by reference. The machine may capture images and enable images and data to be stored, remotely accessed, and selectively processed and analyzed. The transaction machine may have one or more cameras or other image capture devices adjacent thereto. As will be appreciated, a number of cameras may be positioned adjacent to the machine by being within and/or near to the machine for purposes of capturing image data related to users, documents, surroundings, or other types of visual inputs that may be desirable to capture and analyze. One or more cameras may be operatively connected to a device that may receive and capture image data therefrom. It should be understood that additional types of data capture devices may also be included adjacent to or within the machine.

Data, such as image data relating to a user's appearance feature, may be arranged to be automatically updated after a certain time period to replace older feature data. One or more processors may be used in the updating. For example, a current user's appearance may be recognized, captured, and then used to update and replace the older version of the user's appearance data. Additionally, the machine may output audio messages to a user requesting that the user move or reposition their appearance in a certain direction to enable the machine to capture a desired quality, feature, or angle of an appearance image. Furthermore, appearance data and/or audio data and/or other biometric information may be used to recognize the user prior to updating another data feature. For example, the user's voice and/or biometric information may be used to recognize the user prior to the machine updating the user's appearance data. Also, the user's appearance and/or biometric information may be used to recognize the user prior to the machine updating the user's audio data. Alternatively, if the user cannot be recognized or verified with a sufficient degree of reliability from the appearance data and/or audio data and/or other biometric information, the customer may be prompted to input identifying data, such as a card and/or PIN, through manually actuated devices on the machine, such as a card reader and/or keyboard. After the user is verified, then the user's appearance data and/or voice data may be captured, and the user's data file updated with the user's current appearance data and/or voice data.

One or more microphones may be arranged for capturing sound or voice information, as well as devices which capture data related to transactions. Embodiments of the present invention can use voice recognition software to detect sounds from a microphone representative of words or the stress levels of sounds emanating from persons near the machine. Such voice or sound data may be used in combination with images or other data to further detect and evaluate conditions at or near the machine. The machine may detect stress in a particular user's voice, such as a store manager, and send signals to devices to enhance video monitoring, surveillance monitoring, and/or notification of authorities. The detection of certain words or voice stress levels by the machine may require a user to provide additional input information or reply to certain messages provided by the machine. The user may be denied access to the machine.

In a merchant user operation of the transaction machine, the merchant user may approach the machine and have their presence sensed. The machine generates image input signals based on the merchant user's appearance feature and/or audio input signals based on the merchant user's voice feature. A computer or other processor may operate, based on the signals and the information in the data store, to determine if the appearance of the merchant user corresponds to a particular recognized user. The computer may operate based on the audio input signals to determine if the voice of the merchant user corresponds to a particular recognized user. The computer may determine, based on the visual data alone, or the audio data alone, or both the visual data and the audio data, whether the merchant user at the machine is one (and only one) recognized user. If the appearance and/or voice data corresponds to the user, then the user is enabled to operate the transaction function devices which correspond to the user's rights data. Alternatively, other biometric information may be used to verify a recognized user. Alternatively, if the user cannot be verified with a sufficient degree of reliability from the appearance data and/or audio data and/or other biometric information, the customer may be prompted to input identifying data, such as a card and/or PIN, through manually actuated devices on the machine, such as a card reader and/or keyboard. Furthermore, manual input of identifying data may be required together with the input of appearance data and/or audio data and/or other biometric data to provide a higher degree of security.

The keypad and function keys which serve as input devices in the described exemplary embodiment may be replaced in other embodiments by other types of devices which are capable of selectively receiving data or instructions from a user. Other types of output devices may also be used. These may include other types of visual and nonvisual output devices which are capable of communicating a message to a user and which can instruct the user in the operation of the machine. Of course when automated transaction machines of the invention are incorporated with other devices which carry out other functions, other types of input devices associated with carrying out those other functions may also be included. These may include for example switching and control devices for controlling the dispense of motor fuel when the machine of the invention is incorporated with a motor fuel dispensing device. The particular additional devices will depend on the environment in which the invention is used.

Returning to the description of the machine 10 shown in FIG. 1, the housing includes therethrough a receipt opening 26. The receipt opening is used to provide the user with printed receipts for the transactions conducted at the machine. The housing further includes a note outlet opening 28. The note outlet opening 28 is used to deliver notes dispensed from the machine to a user. It should be understood that the note outlet opening may also be referred to herein as a sheet outlet opening, and that in embodiments of the invention sheets other than notes may be received and dispensed from the machine.

The machine 10 further includes a note inlet opening 30. Note inlet 30 is used for inserting notes or other types of sheets into the machine for storage. As indicated in phantom, in some embodiments the note inlet opening 30 may be rendered inaccessible by a movable cover 32. The cover 32 is selectively secured by a suitable locking mechanism 34. The cover may be used in circumstances where the machine operator only wants selected authorized personnel to be able to insert notes for storage in the machine. This may be the case when the machine operator wants users to use the machine only as a cash dispenser. In some embodiments the cover may provide a note supporting surface or include a note holding structure such as a pocket to facilitate holding dispensed notes for the user of the machine when the cover is in position.

As shown in FIG. 1 the housing of the machine further includes a connector 36. The connector 36 is operative to releasibly receive a plug in memory element 38. The plug in memory element in the embodiment shown is used for holding messages that are to be provided to users of the machine through the display 24. As later discussed, the plug in memory 38 may hold promotional messages which are displayed to users of the machine on a timely basis. Such promotional messages may include for example discounts on certain merchandise or special offers which expire on a certain date. In one preferred embodiment the plug in memory 38 may be supported on a smart card. The memory may include one or more promotional items which are promoted only during certain times of day, on certain days of the week or during particular time periods. The use of this feature is later discussed in detail.

Figure 2:
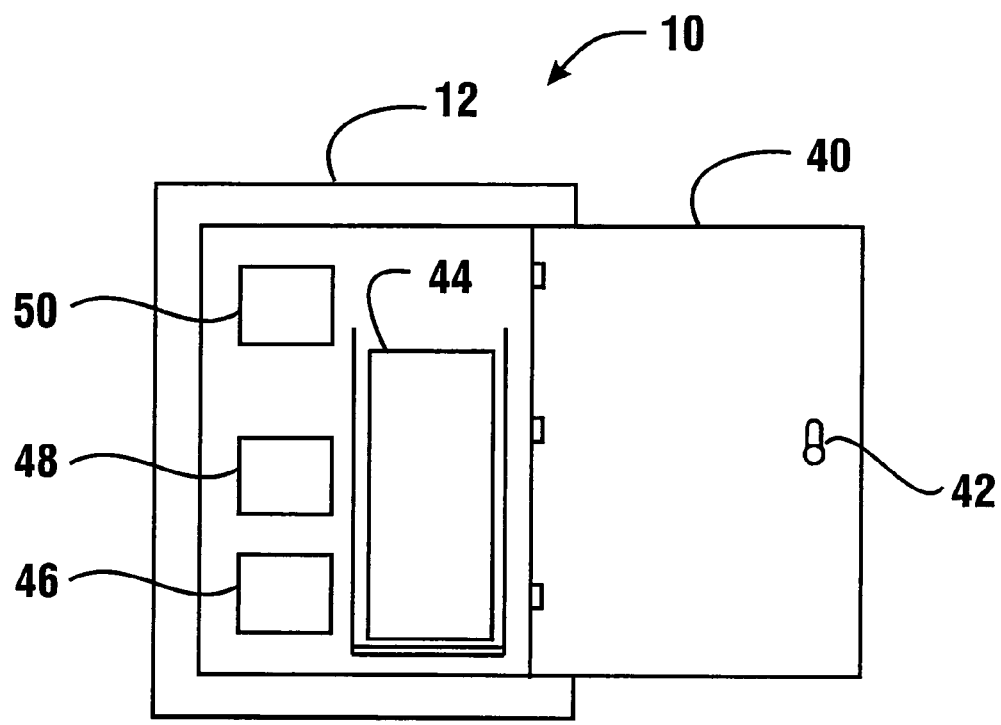
FIG. 2 is a rear plan view of the machine shown in FIG. 1 with an access door in an open position.

FIG. 2 shows the rear of the machine 10. The housing 12 of the machine includes an access door 40 which is shown in the open position in FIG. 2. The access door 40 includes a locking mechanism 42. The locking mechanism 42 is normally used to secure the access door 40 in the closed position. The locking mechanism 42 may be opened by authorized personnel to enable them to access an interior area of the machine.

The interior area of the machine includes various components which are shown schematically. Such components may include for example a note storage module 44. As later described in detail the note storage module 44 includes a note storage area for holding notes within the machine. The note storage module 44 is readily removable and installed in the machine once the access door 40 is in the open position. Other components within the housing of the machine may include a journal device 46. The journal device 46 may be for example a journal printer which makes a permanent hard copy record of transactions which are carried out by the machine. Other devices within the interior of the machine may include a communications device 48. The communications device may be for example a modem, wireless transmitter, lease line interface connection or other suitable device for communicating with other computers to carry out transactions with the machine. These other computers may include for example computers in credit and/or debit card networks which are capable of handling transaction messages and settling accounts between users, sources of monetary value and the operator of the machine. Another device shown schematically in the interior of the machine in FIG. 2 is a receipt printer 50. The receipt printer 50 is operative to produce printed receipts that are dispensed to customers through receipt opening 26.

Figure 3:
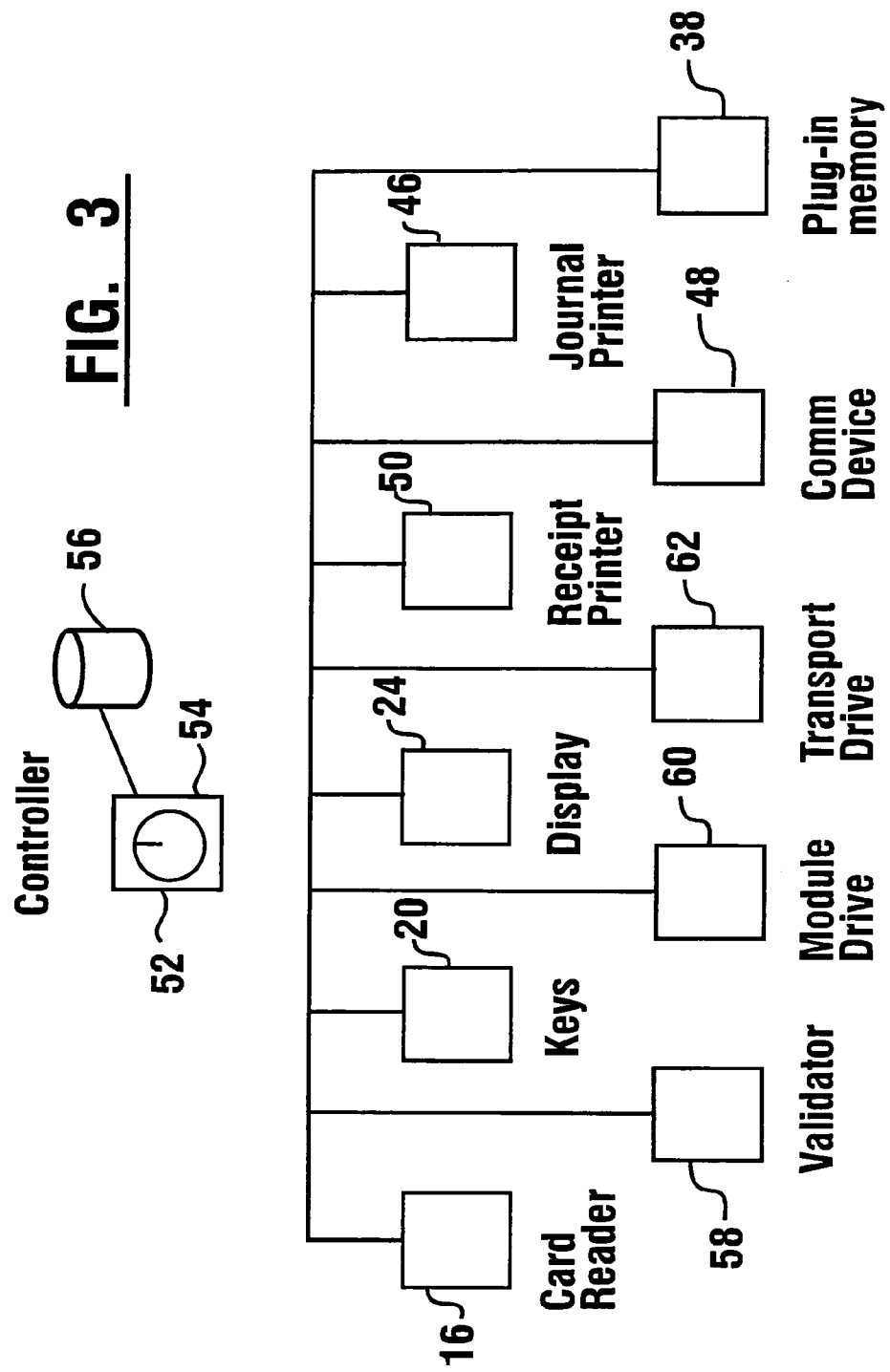
FIG. 3 is a schematic view showing a controller of the automated transaction machine and transaction function devices and other devices in operative connection therewith.

FIG. 3 shows schematically the electrically controlled devices which are included in the described embodiment of the machine 10. A controller 52 serves as a control device for controlling the electrical devices within the machine. The controller 52 includes an internal clock device schematically indicated 54. The controller is in operative communication with a memory 56 which is also referred to herein as a data store. The controller 52 may in various embodiments include one or more processors or operatively connected computers which serve as an electrical signal source for devices which are in operative connection with the controller.

As shown in FIG. 3 the controller is operative to communicate with the transaction function devices previously described. These include the card reader 16, the keypad and function keys 20 and 22 and the display 24. The controller is also operative to communicate and control operation of the receipt printer 30 and the journal device 46, which in this case is a journal printer. The controller is also in operative communication with the plug in memory 38 and the communication device 48 which is used to communicate with other devices. In the described embodiment the controller 52 is also operative to communicate with other devices. These include for example a note validator 58 which will later be discussed in detail. The note validator is operative to sense notes to determine their validity and to distinguish between valid and invalid notes inserted into the machine. The controller 52 is also operatively connected to a module drive 60 and a transport drive 62 which are control circuits for controlling motors which operate to move notes within the machine. These are later discussed in detail. It should be understood that these transaction function devices are exemplary and that other embodiments of the invention may include different and/or additional types of transaction function devices.

Figure 4:
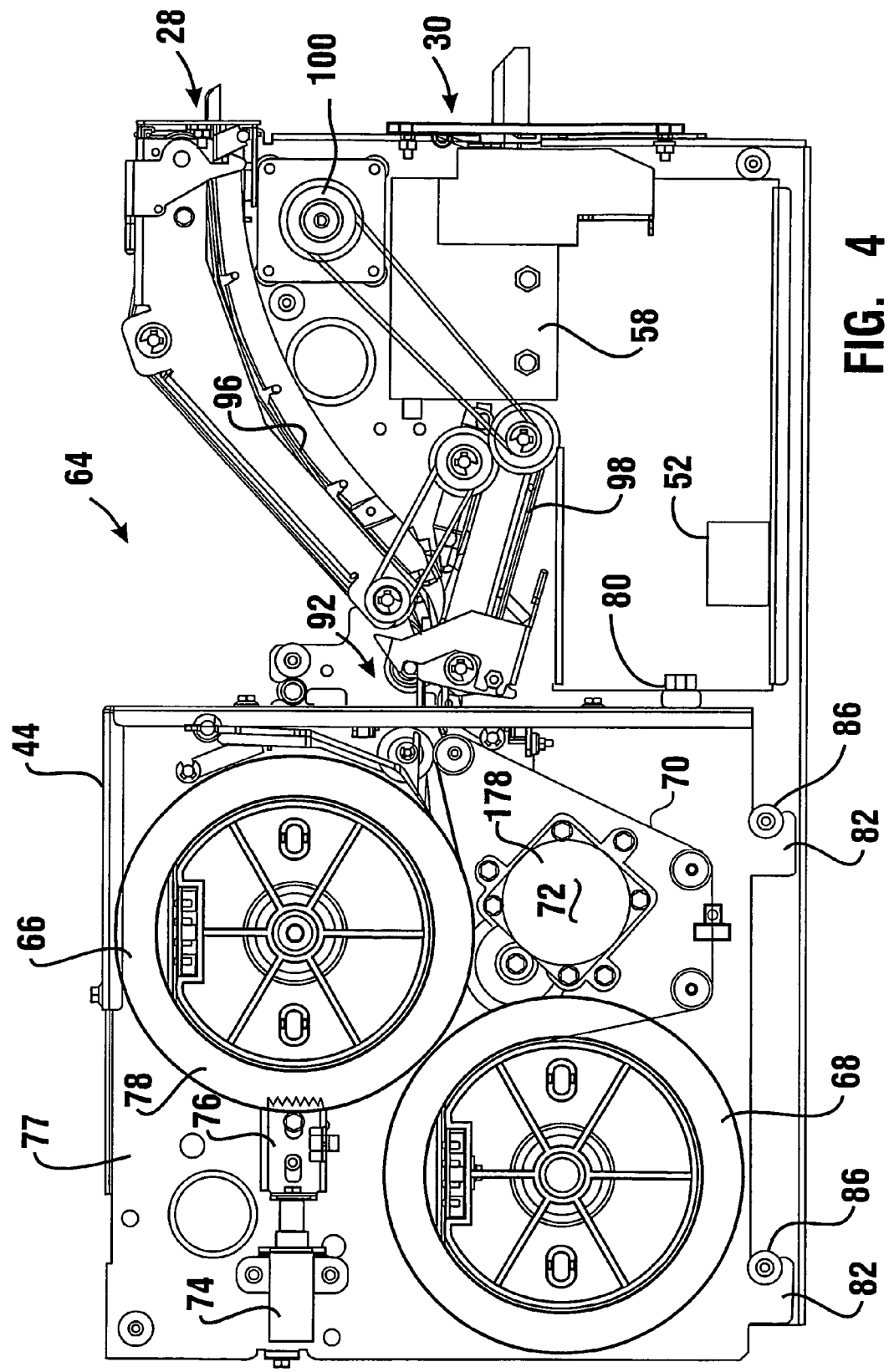
FIG. 4 is a transparent side view of the mechanisms for handling sheets such as currency notes in the automated transaction machine shown in FIG. 1.

FIG. 4 is a view of the sheet handling mechanism that is used for storing and dispensing notes within the machine. The sheet handling mechanism generally indicated 64, includes the note storage module 44 previously discussed which is removably mounted on the housing of the machine. The note storage module includes a storage reel 66 which is rotatably mounted in supporting connection with the housing of the machine in the storage module. A take-up reel 68 which in the preferred embodiment is identical to the storage reel, is also rotatably mounted in the machine. A flexible web 70 extends between the storage reel and the take-up reel.

The note storage module of the described embodiment includes thereon a reel drive mechanism 72. The reel drive mechanism is operative in a manner later discussed to selectively drive the storage reel 66 or the take-up reel 68.

The note storage module 44 also includes therein an actuator 74. The actuator is in operative connection with a movable locking member 76. The locking member 76 is movable by the actuator 74 between a position in which rotational movement of the storage reel is enabled and a position in which the locking member holds the rotatable storage reel in relatively fixed position with respect to the note storage module 44. This is accomplished in the locking position of the locking member by engaging cooperating projections and recesses schematically indicated 78 on the locking member and the storage reel.

The actuator 74 is electrically connected with the controller 52 through a releasible connector 80. The controller 52 serves as an electrical signal source which operates the actuator generally to enable the storage reel 66 to move when it is properly positioned within the machine. When the note storage module is positioned in the machine and the releasible connector 80 connects the actuator 74 to the electrical signal source, the projections and recesses of the locking member and reel are disengaged enabling the reel to move. This feature aids in securing the note storage reel which serves as a note storage area, in fixed position relative to the module when the note storage module is removed from the machine. This makes it more difficult for unauthorized persons to extract the note from the note storage module after it has been removed from the machine.

Figure 14:
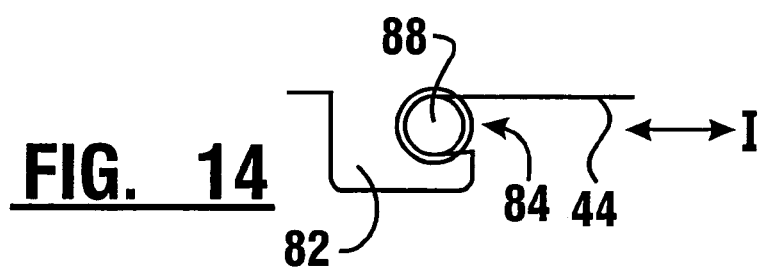
FIG. 14 shows a tab portion on the note storage module engaged with a cylindrical support member.
Figure 15:
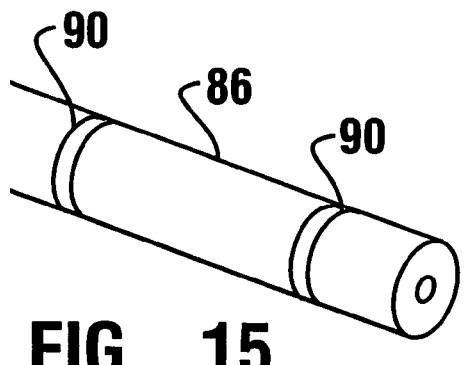
FIG. 15 is an isometric view of the cylindrical support member shown in FIG. 14.

The note storage module 44 is supported in the machine by tab portions 82. Tab portions 82 include semicircular openings or slots 84 (see FIG. 14). Axially elongated cylindrical support members 86 are accepted into the openings 84 when the note storage module 44 is in the operative position within the machine.

The openings 84 in the tab portions 82 extend in generally planar members and are bounded by a surface 88 which serves as an arcuately shaped generally U-shaped projection. The U-shaped projecting surface 88 is positioned to extend in generally annular recesses or slots 90 which extend about the cylindrical support members 86. The interfitting engagement of the U-shaped projections and the annular recesses enables positioning the note storage module 44 in the proper position within the housing of the machine. It further enables engaging and disengaging the tab portions and the cylindrical support members from the engaged and disengaged positions by moving the note storage module along the direction of arrow I shown in FIG. 14.

In the described form of the invention the cylindrical support members 86 also serve as supporting members for the construction of the structure surrounding the note storage module within the machine. Members 86 include threaded openings in each end to facilitate their engagement to other components. The positioning of the annular recesses 90 in the cylindrical support members are also asymmetrical to facilitate the proper positioning of the note storage module. During assembly of the machine the proper positioning of the cylindrical support members is assured by having the threaded openings in each end of the support members of a different size and/or thread configuration. This construction along with the mating fasteners which are used to hold the machine components together assure that the cylindrical support members are installed properly during assembly. Of course the construction of the supporting structure and removable note storage module is exemplary and in other embodiments other suitable structures and assembly methods may be used. This includes using a configuration for positioning the storage module which is generally the reverse of that shown in FIG. 14 as well as other arrangements of interengaging projections and slots.

The note handling mechanism shown in FIG. 4 further includes a passage area 92. The passage area 92 extends through an opening 94 in the front wall of the note storage module (see FIG. 10). Notes passing between the note receiving and dispensing mechanism of the note storage module pass through the passage area 92.

As shown in FIG. 4 a note outlet transport 96 extends between the passage area and the note outlet opening 28. Note outlet transport 96 is operative to move notes in connection therewith. A note inlet transport 98 is operative to move notes between the note inlet opening 30 and the passage area 92. Note inlet transport 98 includes a portion which extends through the note validator 58. As previously discussed the note validator is operative to sense notes which pass through the note inlet transport. The note validator is operative to sense notes which move in the note inlet transport. The note validator is operative to determine if the sensed notes are valid for purposes of acceptance in the machine and to discriminate between valid and invalid notes.

Figure 5:
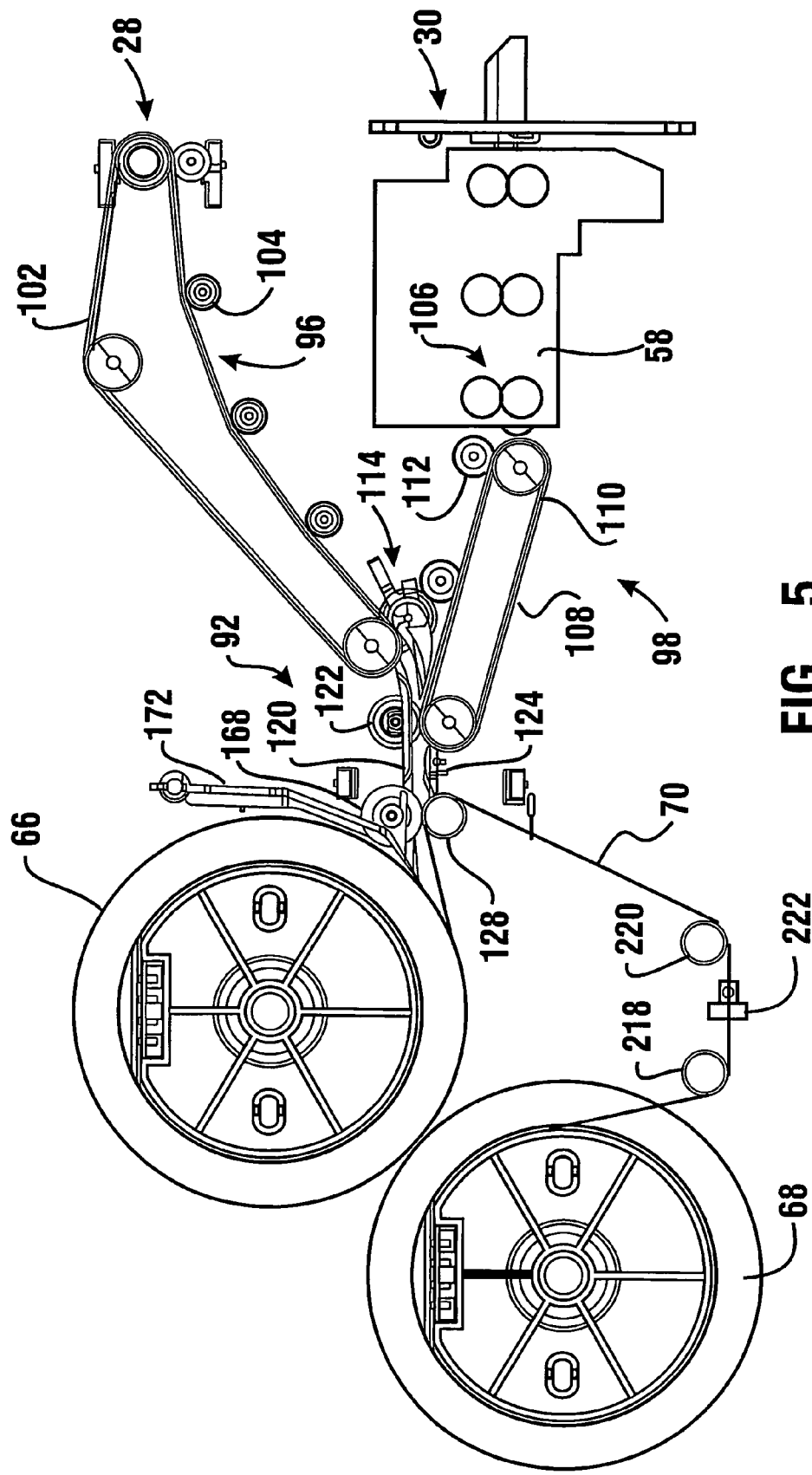
FIG. 5 is a schematic view showing the components included in the sheet paths of the automated transaction machine shown in FIG. 1.

A transport drive 100 is operatively connected to the inlet and outlet transports 96 and 98 respectively. The note inlet and outlet transports are shown in further detail in FIG. 5. The note outlet transport 96 includes a belt 102 and a plurality of note engaging idler rolls 104. The belt and idler rolls engage notes therebetween such that the notes move with movement of the belt between the passage area and the note outlet opening 28. It should be understood that while a belt and roll transport is used for the note outlet transport in the described embodiment, in other embodiments other configurations of cooperating belts, rollers or other moving members suitable for engaging and moving notes may be used.

The note inlet transport in the described embodiment includes note validator 58. In the described embodiment note validator 58 is a standard commercially available note acceptor which is operative to sense and determine the validity of certain types of bills. In the case of a machine which is configured to receive and dispense twenty dollar bills, the validator may be a device for sensing whether an inserted note is a valid twenty dollar bill. The validator 58 includes therein or has adjacent thereto a generally nonslip portion 106 of the note inlet transport 98. Portion 106 is operative to engage and move notes inserted through the note inlet opening 30 past the validator. The generally nonslip portion 106 is operative to move notes past the sensing mechanisms within the validator 58 as required for sensing the note and determining its validity for purposes of receipt within the machine. If an inserted note is determined not to be valid or otherwise not suitable for acceptance within the machine, the nonslip portion 106 after moving the note inward into the validator is operative to move it outward back through the note inlet opening 30. This is done by the validator operating based on its internal programming or in alternative embodiments operating in cooperating relation with the controller 52.

If a note inserted through the note inlet opening 30 is sensed as valid and acceptable by the validator 58, the nonslip portion 106 of note inlet transport 98 is operative to release the note to a limited slip portion 108 of the note transport 98. Limited slip portion 108 includes a belt 110 and idler rolls 112. The belt 110 and idler rolls 112 serve as limited slip engaging members which engage notes passing inward from the validator 58. However, the limited slip portion 108 is not operative to apply sufficient force to a note to remove it from engagement with the nonslip portion 106, until the nonslip portion disengages the note. This enables the validator 58 of the described embodiment to move the note sufficiently rearward so that it can engage the limited slip engaging members 110, 112 and still enable the nonslip portion to reverse the direction of the note so that it can be delivered back out through the note inlet opening in the event that the note is determined to be invalid. This feature enables standard commercially available, compact size note validators to be used in the embodiment shown.

While the note inlet transport 98 shown in the described embodiment has a generally nonslip portion and a limited slip portion, other embodiments of the invention may not include such portions depending on the type of validator used. An example of such an embodiment is later described in detail. In addition although the generally nonslip portion is shown as a plurality of cooperating rolls and the limited slip portion 108 is shown as a belt and roll transport, other embodiments of the invention may include other types of cooperating moving members that are operative to move sheets in the desired fashion.

Figure 9:
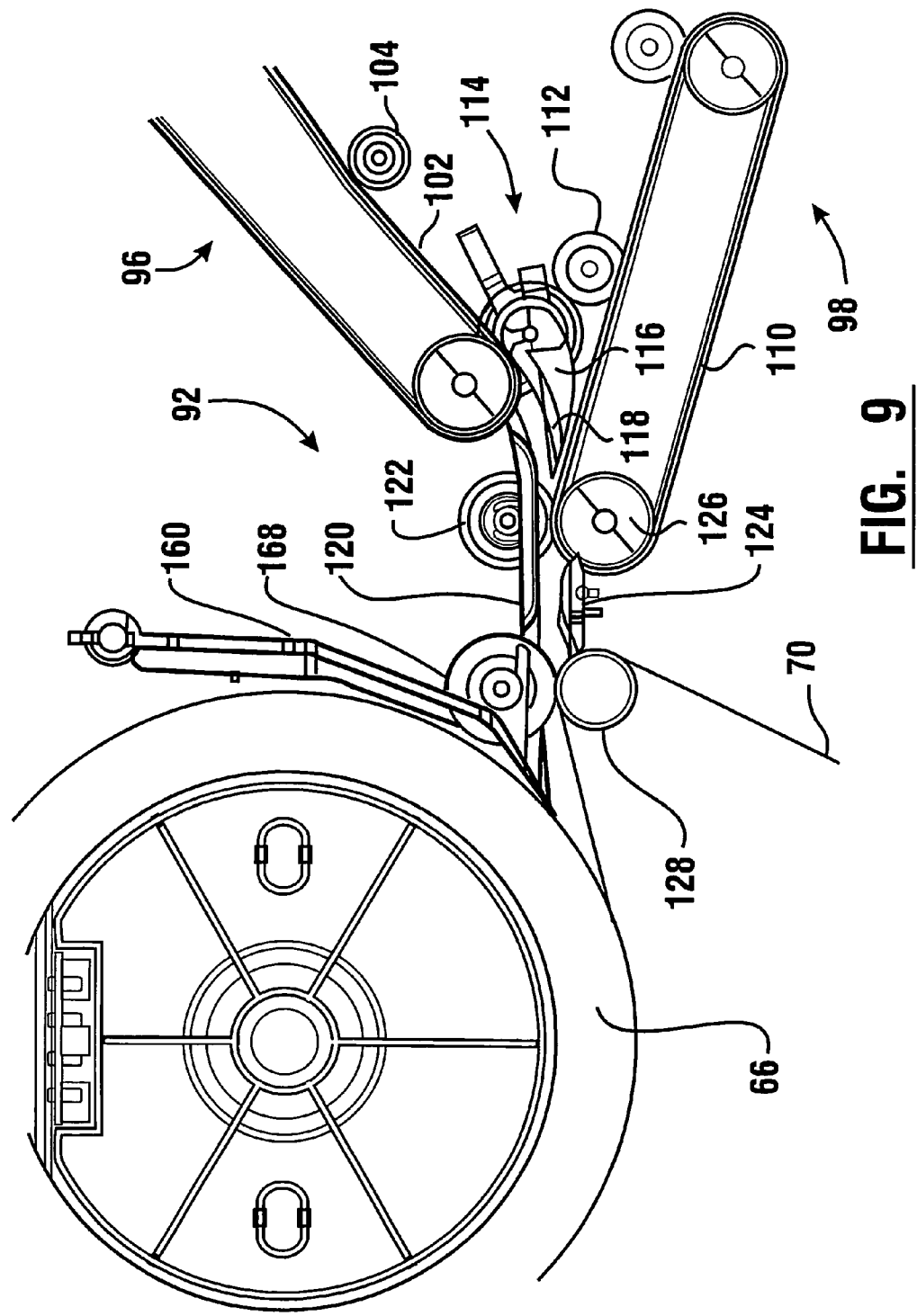
FIG. 9 is a simplified side view of the sheet handling components in the passage area of the machine.

A gate 114 is positioned adjacent to the passage area 92. Gate 114 is operative to selectively direct sheets and enable the passage of sheets relative to the note inlet transport and note outlet transport. As shown in greater detail in FIGS. 9 and 11, gate 114 includes a rotatably mounted gate member 116. Gate member 116 includes a curved lead surface 118 which is disposed adjacent to the passage area. When the lead surface 98 is disposed downward relative to the position shown in FIG. 9 and the mechanism is operated to move sheets outward through the passage area 92, the outward moving notes are engaged with the lead surface and are directed to engage the belt 102 and idler rolls 104 of the note outlet transport 96. In this position the notes are carried in an outward direction by the note outlet transport to the note outlet opening 28. Likewise when notes are moved by the note inlet transport towards the passage area 92, the lead surface 118 is moved upward to an accepting position relative to FIG. 9. In this position notes carried by the inlet transport 98 are enabled to pass into the passage area 92.

A guide 120 extends adjacent to the gate 114 generally between the note inlet and outlet transports. The guide includes rotatable guide rolls 122 in supporting connection therewith. Guide roll 122 is generally engaged with belt 110 and rotates therewith. The guide 120 and guide rolls 122 further aid in guiding sheets through the passage area in a manner later discussed. The passage area is also bounded on an opposed side of the guide by a separating member 124. The separating member also later described in detail, engages the surface of belt 110 which serves as an arcuately shaped moving member in an area overlying belt supporting roll 126. The separating member 124 also engages on an opposed side, the web 70 in an area overlying a supporting roll 128 which is supported on the note storage module 44. The web 70 serves as a arcuately shaped moving member when it moves over the roll 28 in engagement with the separating member 124.

Figure 11:
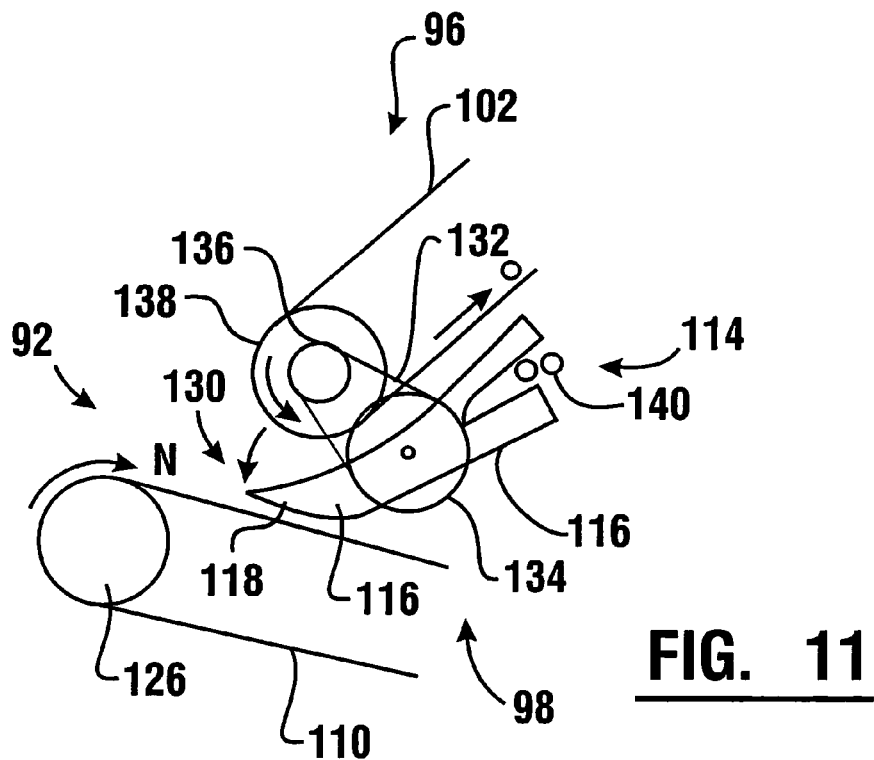
FIG. 11 is a side schematic view of the gate member which serves to direct sheets between the inlet and outlet transports in the passage area.

As shown in FIG. 11, gate 114 is moved between the accepting position which is the position wherein notes are accepted into the passage area from the note inlet transport, and the directing position in which notes passing outward through the passage are directed to the outlet transport, by a limited slip transmission mechanism generally indicated 130. The limited slip transmission mechanism of the described embodiment includes a slipping member 132. Slipping member 132 is a small relatively slippery belt or similar force transmission member, which can be used to translate the gate member 116 to a desired position and thereafter slip in response to driving motion without causing damage to itself or other connected components. In the described embodiment the slipping member 132 is connected to a pulley portion 134 which is operatively connected to the gate member 116. The slipping member 132 is also connected to a pulley portion 136 which is connected to a roll 138 which supports belt 102 of the outlet transport. Stops schematically indicated 140 limit the rotation of the gate member 116.

When the note outlet transport is driven to move notes outwardly from the passage area 92, belt 102 is driven in the direction indicated by the Arrow O. This causes the lead surface 118 of the gate member 116 to move downward until the gate member is engaged with the stop 140 which limits its counterclockwise rotation. Because in this position belt 110 is moved in the direction of Arrow N, notes moving through the passage area 92 are engaged by the lead surface 118 in the directing position and moved in connection therewith to engage the outward moving belt 102. The outward moving belt continues to run for as long as it is controlled to do so in response to the controller. However once the gate member 116 is against the stop the slipping member 132 slips relative to at least one of the pulley portions 134 and 136. This causes the gate member to be held in the directing position but does not result in further movement nor damage to any of the components.

As can be appreciated from FIG. 11, when the note inlet transport 98 moves belt 110 in a direction opposite to that indicated by Arrow N to deliver notes toward the passage area 92, belt 102 moves in a direction opposite to Arrow O. This movement causes roll 138 to rotate the pulley portions 136 and 134 to rotate the gate member 116. The gate member 116 rotates in a clockwise position in the orientation shown to the accepting position where clockwise rotation of the gate member is stopped by engagement with one of the stops 140. Once the gate member has moved to the accepting position the slipping member 132 slips relative to at least one of the pulley portions without causing damage to any of the components. In this position notes are enabled to pass the gate member moving inward in supporting connection with belt 110 to reach the passage area.

While in this described embodiment of the invention the gate 114 includes a gate member that is moved by the same drive mechanism as the belt, in other embodiments other gate moving mechanisms including separate actuators may be used. Alternatively embodiments of the invention may employ passive gate members which enable passage of the notes inwardly by deflection or translational movement of the gate member in connection with the notes. Such passive gate members may through their configuration engage outwardly moving notes and direct them to engage appropriate mechanisms for moving the notes outward. Various arrangements of gate members and sheet moving members may be used in embodiments of the invention. It should further be understood that while single belts have been described herein as moving sheets in the inlet and outlet transports, preferred embodiments of the invention may include a plurality of parallel moving belts, rolls or other note moving mechanisms which are operative to move the notes in the described directions.

Figure 12:
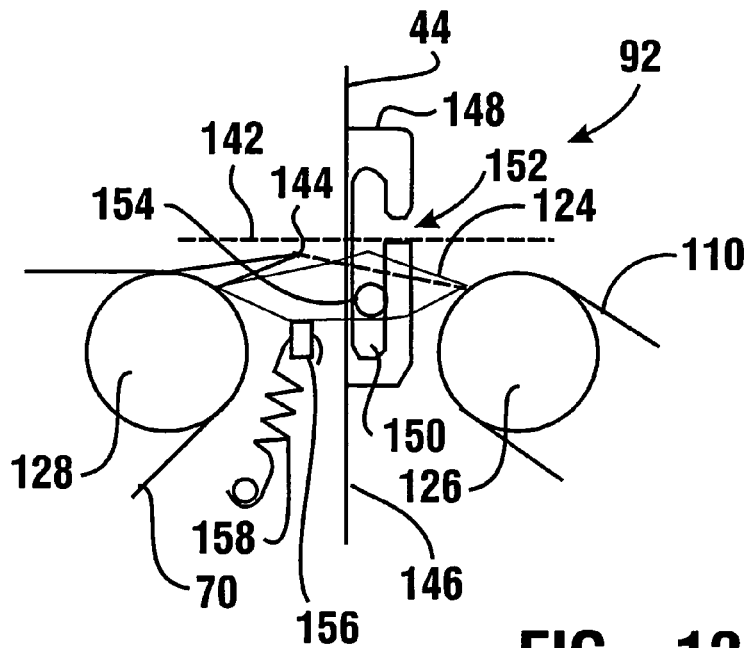
FIG. 12 is a side schematic view of the secondary separating member and its suspension on the note storage module.

FIG. 12 shows in greater detail the operation of the separating member 124 which bounds a first side of the passage area where notes move to and from the note storage module 44. Notes moving through the passage area generally move in a note plane schematically indicated 142 in FIG. 12. The note plane extends generally along an inner surface 144 of the separating member 124. The inner surface 144 of the exemplary embodiment includes a plurality of projections as shown. The projections serve to minimize surface tension so that notes will move more easily over the inner surface 144.

The note storage module 44 includes an inner wall 146. The opening 94 extends through the inner wall. The opening is bounded on each transverse side by an ear portion 148. Each ear portion 148 includes a generally vertically extending slot 150. A cutout portion 152 extends through the ear portion to the slot. The separating member 124 includes a pair of outward extending projections 154 which are sized to be movable in the slot 150. The projections 154 also enable the separating member 124 to be rotatably movable relative to the note storage module 44. The separating member also includes an eye 156. Eye 156 is engaged by a biasing member 158. The biasing member operates to bias the separating member 124 generally in a downward direction as shown.

When the note storage module 44 is installed in the housing of the machine, the separating member 124 is moved to a position in which a first end of the separating member engages belts 110 overlying roll 126. Also in the operative position, the opposed end of separating member 124 engages the web 70 overlying roll 128. In this way the separating member 124 engages at its opposed ends arcuately shaped moving members which move sheets in supporting connection therewith. The separating member of the exemplary embodiment is configured to ride on the moving members and to engage sheets which are supported thereon. The engagement of the separating member with the sheets on the moving members serves to separate the sheets and direct them generally along the note plane 142 through the note passage. The separating member 124 minimizes the risks that notes will be carried by the supporting belt or web underneath the separating member where they may jam or otherwise disrupt the operation of the mechanism. The floating character of the separating member facilitates its ability to properly position itself both vertically and rotationally in the mechanism when the note storage module is in its operative position. Thus the separating member is enabled to correct for minor misalignments and still perform its function by engaging the arcuately shaped moving members on either side. In addition the configuration of the slot 150 and cutout area 152 facilitate the ready replacement of the separating member. This is accomplished because the projections 154 may be moved through the cutout area. Also the biasing member 158 may be readily disconnected from the eye 156. Thus the removal of an existing separating member and installation of a new one is readily accomplished.

It should be understood that while in the described embodiment the projections are associated with the separating member and the slots are associated with the supporting housing structure, other embodiments may have these features reversed such that the projections are associated with the supporting housing and the slots associated with the separating member. Also in other embodiments intermediate or additional structures may be used.

Figure 10:
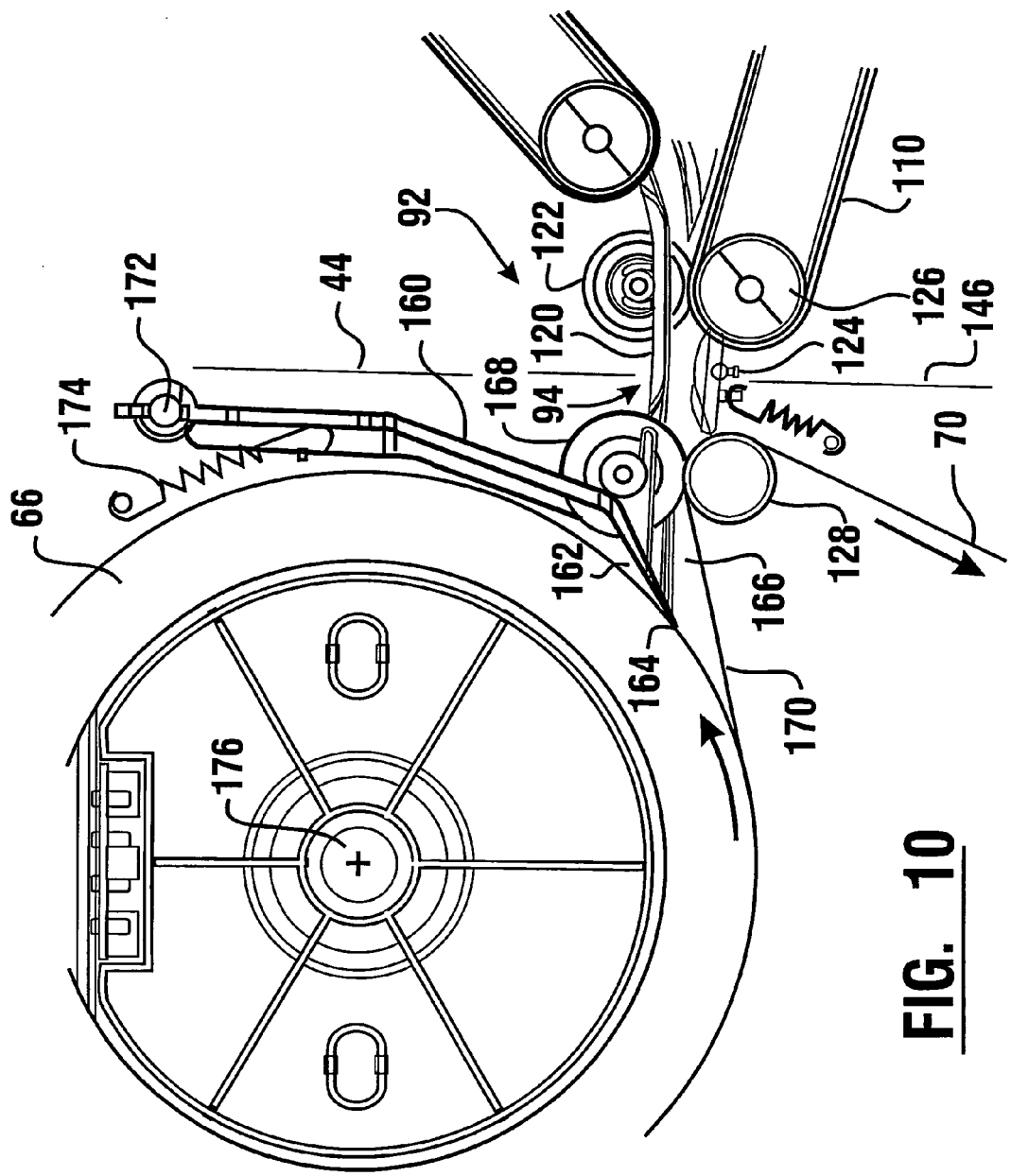
FIG. 10 is an enlarged view of the passage area including the first and second sheet separating members for separating sheets from the sheet supporting web.

As best shown in FIG. 10 the note storage module of the exemplary embodiment further includes a separating member 160. Separating member 160 engages an opposed side of the web from that engaged by separating member 124. Separating member 160 minimizes the risk that notes supported by the web 70 on the storage reel will remain with the web when the web moves in a sheet dispensing direction. The deflector 160 aids in separating sheets from the web and directs them toward the passage area when the storage reel rotates in the direction indicated in FIG. 10.

The separating member includes an edge portion 162. The edge portion 162 engages the web at a location indicated 164. A deflector surface 166 extends from location 164 toward the passage. The deflector surface is positioned to extend generally parallel to the web 70 in the area between the location where the web joins the storage reel and the passage area.

A movable member 168 engages the web 70 in generally overlying relation of the roll 128. The movable member 168 engages inward moving notes so that they can be guided by the deflector surface into a nip 170 generally in the area where the web joins the stored web material on the storage reel 66. Likewise the movable member 168 serves to engage sheets that are separated from the web by the separating member 160 and to move the sheets outward through the passage area.

The separating member 160 is rotatable relative to the housing about an axis generally indicated 172. The separating member 160 is biased to rotate in a clockwise direction as shown about the axis 172 by a biasing member 174. The reel 66 rotates relative to the housing and note storage module about an axis of rotation indicated 176. In the described form of the invention the axis 172 about which the separating member rotates, is angularly disposed relative to the axis 176 about which the storage reel rotates from the nip at a substantial angle of generally about at least 90 degrees. This configuration enables providing relatively controlled angular movement of the edge portion at the location as the amount of web material stored on the storage reel changes during operation of the machine. This relatively limited movement assures more reliable separation and guidance of notes from and onto supporting connection with the storage reel. The configuration further minimizes the wearing of the web material by maintaining desirable relative positions of the edge portion 162 and to the web.

As shown in FIG. 10 the deflector surface 166 is generally located such that it extends on opposed sides of the movable member 168. In certain preferred embodiments of the invention the movable member 168 may include a plurality of transversely disposed movable members across the web. The deflector surface may be configured to extend in the intermediate spaces between the movable members. In addition the guide surface 120 also extends into the areas intermediate of the deflector surfaces. The positioning of the deflector surfaces transversely intermediate of the movable member 168 as well as the guide surfaces 120 provides a relatively movable interfitting relation of surfaces which facilitates guiding sheets through the passage area. It should also be noted that the use of the separating members 172 and 124 which engage opposed sides of the web generally help to avoid uneven wearing of the web and the buildup of stresses unevenly along the surfaces thereof. This along with the configuration and orientation of the separating members helps to prolong the life of the web.

As later discussed in detail the note storage module 44 of the described embodiment includes a note receiving and dispensing mechanism generally referred to as 77 in FIG. 4. This note receiving and dispensing mechanism includes the storage and take-up reels 66 and 68 respectively. The web 70 which extends between the reels, the roll 128 and movable member 168 which engage the web in the passage area, and the separating member 160, serve to assure that notes are separated from the web and directed to and from the passage area. In the operation of this described embodiment, the reel drive mechanism 72 operates to move the reels so that notes can be delivered to and dispensed from the passage area. It should be noted that in alternative embodiments a number of different types of note handling mechanisms may be positioned adjacent to the passage area to accomplish the dispense of notes to or the receipt of notes from customers.

The transport mechanisms described herein while useful are exemplary of but one of many types of mechanisms that may be used. The note storage module 44 of the described embodiment is useful because the module construction may be used with many types of such transport mechanisms including very low cost mechanisms that are suited for installations in machines that perform other types of primary functions. This includes the ability to retrofit cash dispensing capability to such machines by providing suitable mechanisms to connect the passage area and one or more outlets which may be accessed by a customer. In addition the note storage module 44 may be readily removed by authorized personnel from an interior area of the machine. Thus for example in a motor fuel dispensing application, a system operator may readily remove the module 44 from the fuel dispensing pumps during off hours and store such items in a secure location. The removal and reinstallation of such items can be accomplished quickly to minimize the actions required to be taken by personnel in the facility.

The operation of the note receiving and dispensing mechanism within the note storage module 44 is controlled through operation of the reel drive mechanism 72. The reel drive mechanism is operative to control selectively the rotation of the note storage reel 66 and the take-up reel 68. By controlling the rotation of the reels notes may be brought into supporting connection with the web 70 and stored on the note storage reel. Likewise by controlling the rotation of the reels notes stored on the storage reel may be delivered to the passage area.

Figure 6:
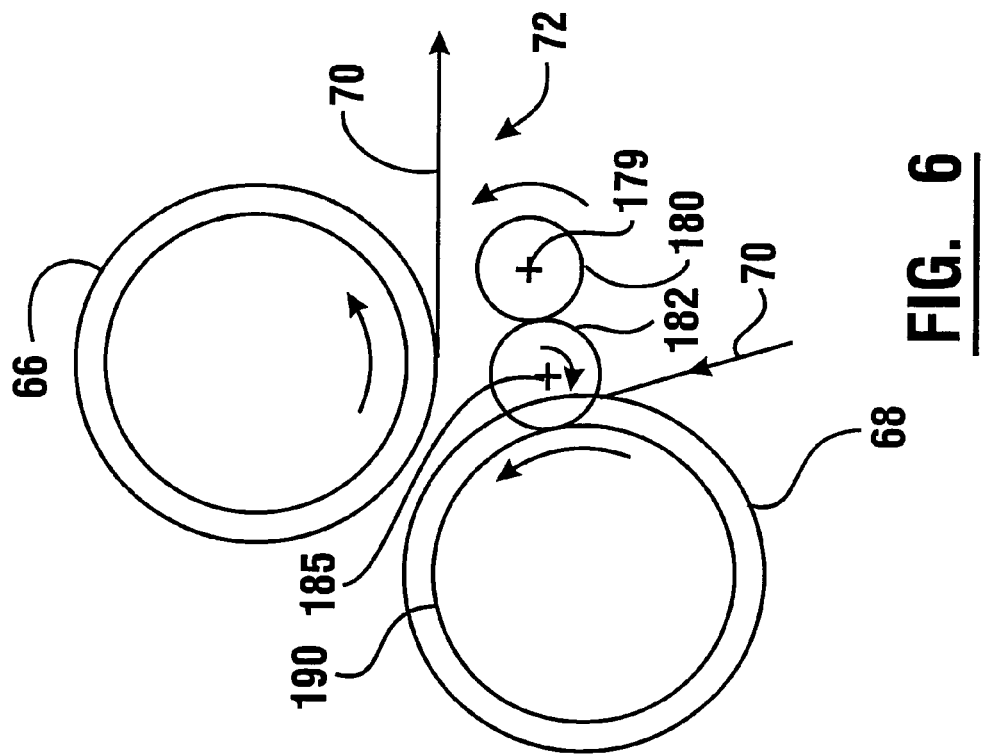
FIG. 6 is a schematic view of a reel drive mechanism operating to move the storage and take-up reels in a sheet dispensing direction.

The reel drive mechanism 72 of the exemplary embodiment includes a motor or other drive indicated 178. The operation of the drive and its direction of rotation is controllable in response to signals from the controller 52 when the note storage module 44 is installed in the machine. The drive 178 is operative as shown in FIG. 6 to rotate a first drive member 180 about an axis of rotation 179. The first drive member 180 in the described embodiment is a gear. However, in other embodiments rollers, belts or other force transmission members may be used.

The first drive member is operative to rotate a second drive member 182. In the described embodiment the second drive member is rotatably connected to the transmission member 184, and the transmission member is rotatable about the axis of rotation 179 of the first drive member 180. The second drive member rotates about an axis of rotation 185 which is movable with the transmission member. Of course in other embodiments other drive arrangements may be used.

Figure 7:
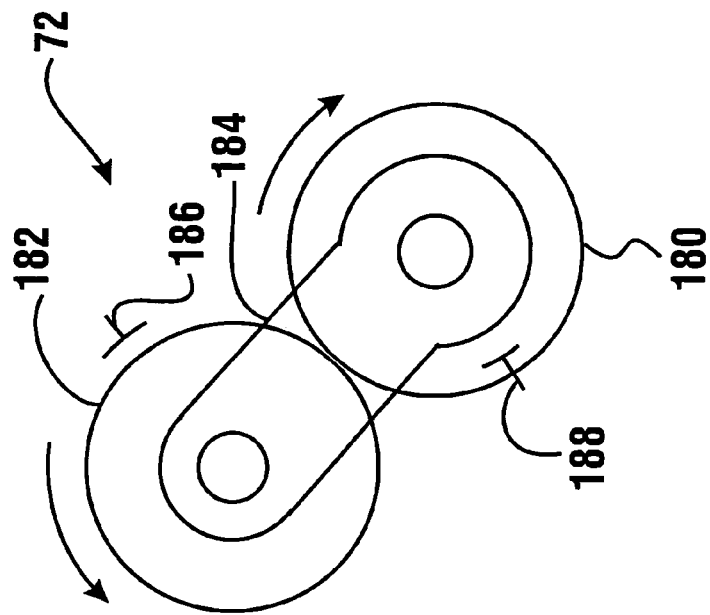
FIG. 7 is a schematic view of the first and second drive members of the reel drive mechanism, along with the transmission member which interconnects the drive members.

As schematically indicated in FIG. 7 a first drag member 186 is in operative connection with the second drive member 182. First drag member 186 is operative to apply a force resisting movement of the second drive member thereon. The first drag member preferably applies a resistance to movement in either rotational direction of the second drive member. The first drag member may include a thrust washer, friction disk, bushing or other suitable member for providing a limited and controlled degree of resistance to movement of the second drive member. The first drag member 186 is operative so that when the first drive member 180 rotates in a clockwise direction as indicated in FIG. 7, the resistance force applied by the first drag member 186 will also tend to cause the transmission member 184 to rotate with the second drive member in a clockwise position. However when the clockwise rotation of the transmission member is stopped such as due to engagement of the second drive member with a further drive surface, the second drive member will rotate in a counterclockwise direction responsive to rotation of the first drive member. Likewise the counterclockwise rotation of the first drive member will move the transmission member and the second drive member counterclockwise until the second drive member engages a drive surface, in which case the second drive member will rotate clockwise. It should be kept in mind that these structures are exemplary and that intermediate drive members and other mechanisms may be included while still achieving the similar results.

As shown in FIG. 7 the reel drive mechanism 72 further includes a transmission drag member 188. The transmission drag member 188 is operative to apply a limited resistance to rotation of the transmission member 184. This limited resistance to rotation is operative to provide a limited and controlled resistance to movement of the transmission member 184. It is also operative to generally hold the transmission member 184 in its then current position until it is deliberately moved responsive to rotation of the first drive member 180. The transmission drag member may include a thrust washer, friction disk, bushing or other suitable device for applying resistance to movement of the transmission member.

As shown in FIG. 6 rotation of the first drive member 180 in a counterclockwise direction is operative to move the transmission member and the second drive member 182 counterclockwise to a position where the second drive member 182 engages a drive surface 190 of the take-up reel. Drive surface 190 of the take-up reel is preferably a surface including gear teeth adapted for meshing engagement with gear teeth on the second drive member 182. However it should be understood that in other embodiments other drive surfaces suitable for receiving power transmitted by the reel drive mechanism may be used. As shown in FIG. 6 the second drive member operates to rotate the take-up reel 168 in a counterclockwise direction. This causes the web 70 to move in a sheet dispensing direction as indicated by the arrows shown superimposed on web 70. As the reel drive mechanism operates to move the take-up reel the sheet storage reel 66 moves in a counterclockwise direction as shown so as to unwind the web 70 therefrom and to deliver notes in supporting connection therewith to the passage area.

Figure 8:
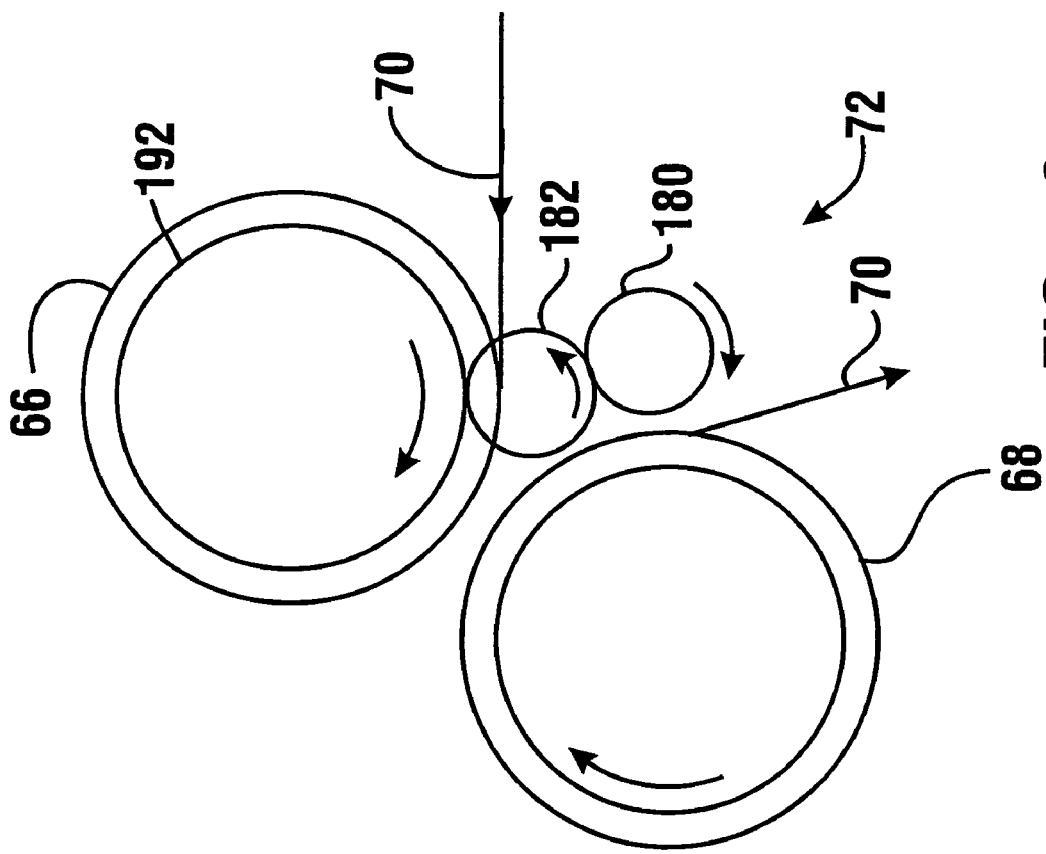
FIG. 8 is a schematic view similar to FIG. 7 with the reel drive mechanism operating to move the storage and take-up reels in a sheet receiving direction.

FIG. 8 shows the operation of the reel drive mechanism 72 when the web 70 is moved in a sheet receiving direction. The sheet receiving direction is the direction that the web moves when notes in supporting connection therewith are wound into the note storage area supported on storage reel 66. Rotation of the first drive member 180 in the clockwise direction shown in FIG. 8 is operative to rotate the second drive member 182 in the clockwise direction relative to the first drive member until the second drive member engages a drive surface 192 on storage reel 66. When the second drive member 182 engages the drive surface 192 the second drive member rotates in a counterclockwise direction which rotates reel 66 in a clockwise direction. The clockwise rotation of reel 66 causes the web 70 and notes supported thereon to be wound into the web for storage on the storage reel. As the storage reel pulls the web thereon the web 70 unwinds from the take-up reel 68.

The operation of the drag mechanisms on the transmission member as well as on the second drive member help to assure that the first drive member remains in positive engagement with the desired drive surface of the reels during movement thereof. Also referring to FIG. 4 it should be noted that the drive surface 192 of the storage reel 66 preferably includes mating gear teeth to engage the second drive member 182. These mating gear teeth may also make up the interengaging projections and recesses 78 which enable the locking member 76 to hold the storage reel in position when the note storage module 44 is removed from the housing.

Figure 13:
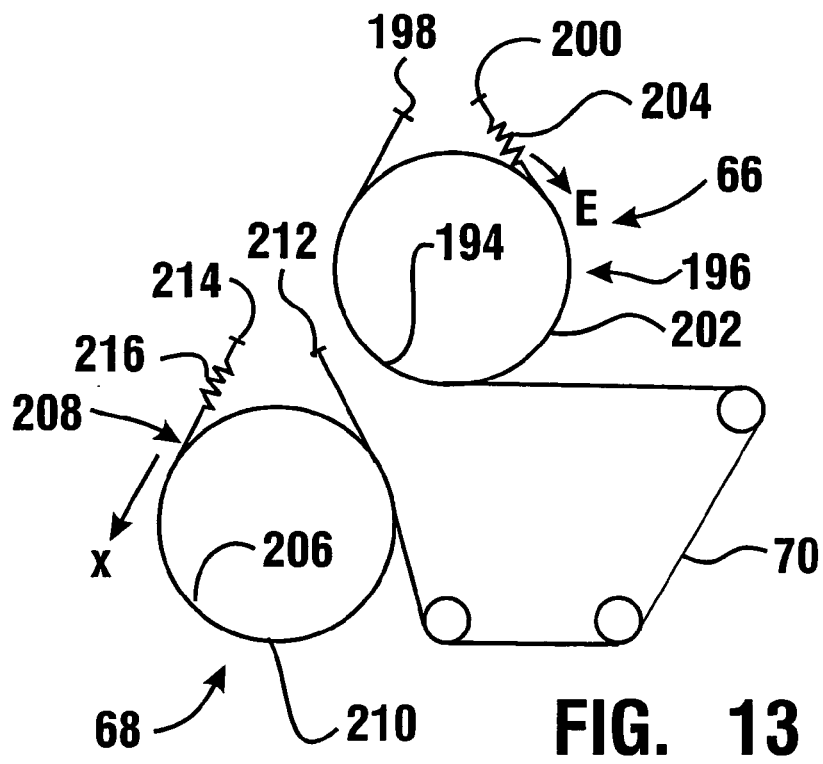
FIG. 13 is a side schematic view of the directional drag applying members used in connection with the storage and take-up reels.

To facilitate the controlled rotational movement of the storage reel 66 and the take-up reel 68, a controlled drag applying mechanism is included in the note storage module 44. An exemplary form of this drag applying mechanism is schematically shown in FIG. 13. The storage reel 66 has thereon an annular brake surface 194. A directional drag applying member 196 extends about the annular brake surface through an angle greater than 180 degrees as shown. The directional drag applying member 196 includes a first end 198 and a second end 200 which are generally fixed relative to the housing through the note storage module.

The directional drag applying member 196 includes a band portion 202. The band portion 202 extends generally in engagement with the annular brake surface 194 of the storage reel. The directional drag applying member 196 further includes an extendable portion schematically indicated 204. Extendable portion 204 includes a resilient biasing portion that is extendable in the direction of Arrow E as shown in FIG. 13.

During operation of the reel drive mechanism 72, the storage reel 66 is rotated in a clockwise direction when it is desired to move the web 70 in a sheet receiving direction such that the web and notes supported thereon are wound onto the storage reel. When the storage reel 66 is moved in a clockwise direction the extendable portion 204 tends to expand in the direction of Arrow E responsive to the force applied to the band portion 202 by the relative movement of the annular brake surface 194. This enables the storage reel 66 to rotate in a clockwise direction relatively easily responsive to the force applied by the extendable portion 204. However when the storage reel 66 is rotated responsive to movement of the web 70 in a counterclockwise direction which corresponds to the web moving in a sheet dispensing direction, the resistance to movement of the storage reel is relatively higher. This is because the tension in the band portion 202 is higher due to a lack of an extendable portion between the band portion and the first end 198. As a result the tension in the band portion is maintained relatively higher as the storage reel is moved in the counterclockwise direction. This provides a relatively higher drag force on the storage reel which minimizes the risk of overrunning.

A similar but oppositely disposed structure is used for applying drag force to take-up reel 68 in this exemplary embodiment. The take-up reel, which as previously discussed in this embodiment is identical to the storage reel, includes an annular brake surface 206 thereon. A directional drag applying member 208 includes a band portion 210 that engages the annular brake surface 206 about an angle of generally more than 180 degrees. The directional drag applying member is generally fixed relative to the housing at a first end 212 and a second end 214. The directional drag applying member 208 includes an extendable portion 216 adjacent the second end 214. Extendable portion 216 is expandable in an extendable direction generally indicated by Arrow X.

In operation of the reel drive mechanism 72 when the take-up reel 68 is rotated in a counterclockwise direction which moves the web 70 in a sheet dispensing direction, the extendable portion 216 of the drag applying member 208 expands to apply relatively lower resistance to movement of the take-up reel 68. However when the take-up reel 68 is moved in a clockwise direction responsive to the web moving in a sheet receiving direction, a relatively higher drag force is applied to the take-up reel.

As a result of the directional drag applying mechanism of the described embodiment, the drag force on the reel being driven by the second drive member 182 is relatively lower. This reduces the amount of force that the reel drive mechanism must produce to move the take-up and storage reels. This is useful compared to systems where drag applying members act equally on storage reels regardless of the direction in which they are moved.

Referring again to FIG. 5, web 70 extends between the storage reel and the take-up reel along a web path. The web path extends adjacent to the passage area in which the web is supported by roll 128. The web path further includes a pair of guiding rolls 218, 220 which guide the web 70 along the web path to the take-up reel 68. A sensor 222 is disposed adjacent to the web path between the guide rolls. Sensor 222 is in operative connection with the controller and is operable to sense machine readable indicia in supporting connection with the web.

Figure 16:
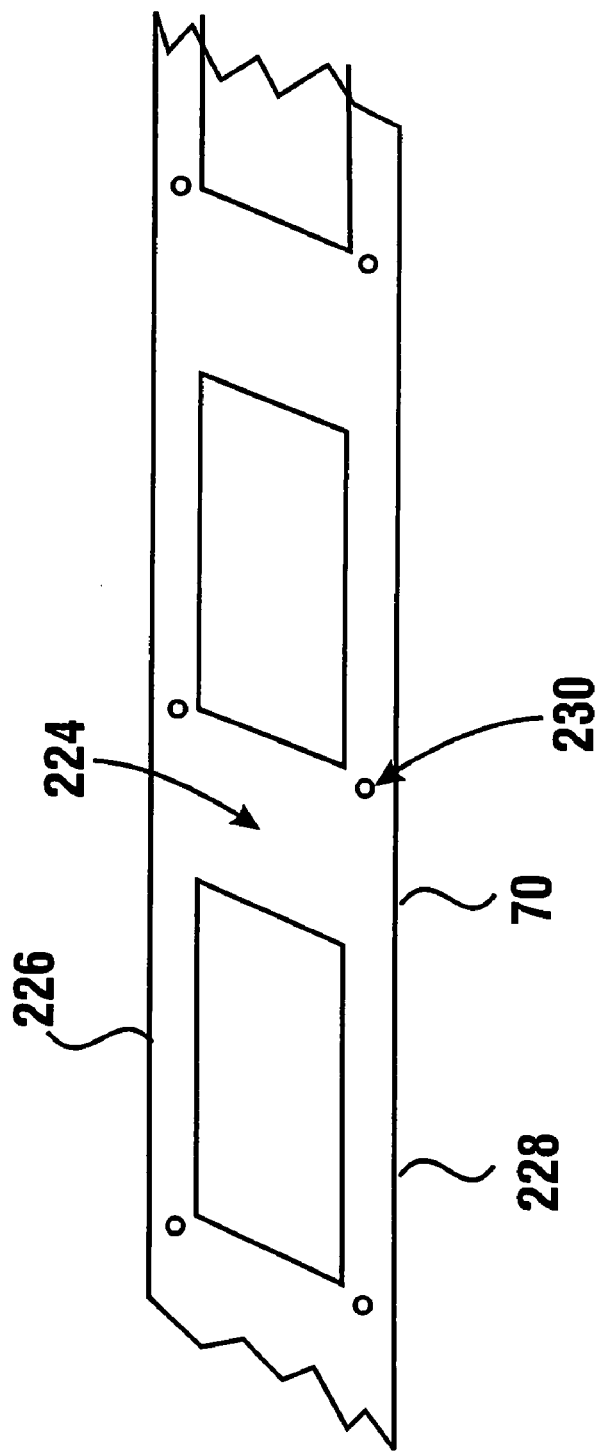
FIG. 16 is an isometric view of a flexible note supporting web with machine readable indicia thereon, the web being shown in supporting connection with currency notes.

FIG. 16 shows a section of web 70 of an exemplary embodiment of the invention. The web includes a transversely central sheet engaging area generally indicated 224. The sheet engaging area 224 operatively engages sheets therewith in the passage area and holds sheets in supporting connection with the storage roll 66.

Transversely outward of the sheet engaging area 224 are a pair of peripheral areas 226 and 228. The peripheral areas extend transversely on either side of the web adjacent the transverse edges thereof. The peripheral areas 226 and 228 include machine readable indicia 230 thereon. In the described form of the invention the machine readable indicia is indicia on the web that serves to block the transmission of radiation therethrough. This blocking of radiation is sensed by the sensor 222. Of course in other embodiments other types of indicia which can be sensed or read by a sensing device may be used.

As previously discussed, the opposed ends of the web are connected to the take-up reel and the storage reel respectively. In the described embodiment the machine readable indicia are configured so as to correspond to a location on the web relative to an end. In the described embodiment the machine readable indicia are symmetrical on the web and are configured such that the spacing between adjacent indicia decreases with proximity to each end. This construction in the described embodiment enables the installation of the web in any of four possible orientations. Thus a person replacing the web need not be concerned that it could be installed improperly. This is because of the symmetry of the machine readable indicia in the peripheral areas as well as the decreasing spacing between the machine readable indicia with proximity to the end.

In operation of the machine, the sensor 222 is operative to cause the controller to include data in the data store representative of the location for the machine readable indicia which is in proximity to the sensor 222. In the described embodiment this data may include data corresponding to a count of a number of machine readable indicia which have moved past the sensor from a reference position located adjacent to a first end of the web at a first end area adjacent to the take-up reel. By holding this data which corresponds to a count, the controller may be operative to determine the relative position of the web with respect to the ends thereof. In addition or in the alternative, the controller may also hold data representative of a count of the sheets which are currently stored in supporting connection with the storage reel. This number of sheets may be correlated with the location indicia such that the controller coordinates the location information provided by the indicia with data corresponding to the number of notes in storage.

Alternatively, the decrease in spacing of the indicia with proximity to the ends of the web enables the controller in the described embodiment to detect a condition which suggests that the web is approaching the first end or the second end. This enables the controller to provide a signal through the communications device or through another output device to indicate that the machine is either reaching a condition where it can hold no further notes or is approaching a condition where it is running out of notes. For example the web must move at least a distance somewhat greater than the length of a note in the dispense of one sheet. If in moving the web this distance during the dispensing of a sheet the sensor 222 senses passage of more than a set number of indicia on the web, the controller may determine that the web is approaching the second end which means that few notes are left on the storage reel. By the number of machine readable indicia which pass the sensor in the dispense of one note or sheet the controller knows generally accurately how close the web now is to reaching the end area when no further notes are stored on the storage reel.

Likewise when operating to receive a note, the reel drive mechanism moves the web a length that is generally slightly greater than the length of one note. If in the process of accepting a note the sensor 222 senses more than a set number of machine readable indicia passing the sensor, the controller may determine that the web is approaching the first end at which point no further web material is stored on the take-up reel. By the number of machine readable indica passing the sensor with the receipt of a note, the controller is operative to determine relatively accurately the position of the web. This enables the controller and its operatively connected memory to determine and indicate quantity condition data which is indicative of a need to replenish the machine, that the machine is full and/or some notes will need to be removed from the machine within a given time period. The machine is still capable of accomplishing this even if the portion of the memory which may be holding information corresponding to an exact location of the web should be lost or corrupted.

An example of how one exemplary embodiment of the invention may operate to dispense sheets and to maintain a count of the number of sheets remaining is discussed in connection with FIG. 17. In the described embodiment sheets are dispensed responsive to a user inputting an input through one or more of the input devices. This may include for example a customer passing a card through the card reader which includes account data corresponding to the customer. If the card is a debit card the customer may also input a personal identification number (PIN) through the keys of the keypad. The customer may thereafter indicate that they wish to withdraw notes and the value of the notes to be withdrawn through inputs through the function keys and/or the keypad keys. In response to these inputs the controller 52 is operative in the described embodiment to operate the communications device 48 to determine through communication with another computer system whether the customer is authorized to withdraw the finds requested. Assuming that the customer is authorized to withdraw the funds the communication device 48 receives back from a host computer or other connected system a message indicating that the requested withdrawal by the customer is permissible. The controller then operates the reel drive mechanism to rotate the take-up reel 68 in the direction indicated. This causes the storage reel to rotate in the direction shown. Rotation of the storage reel causes notes to be separated from the web 70 and moved into the note passage area 92.

Figure 17:
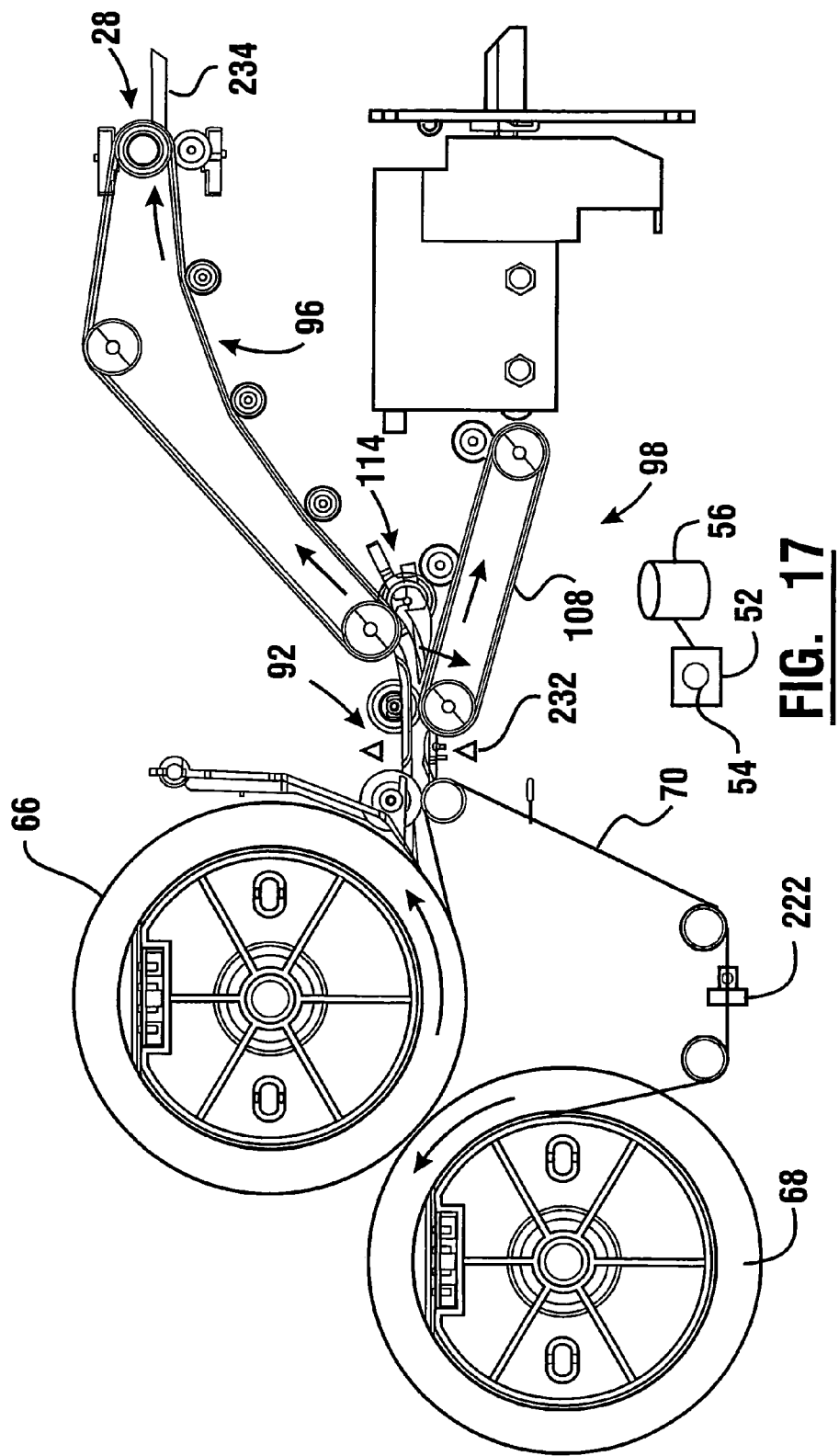
FIG. 17 is a side schematic view indicating movement of parts of sheet handling mechanisms when dispensing sheets.

As shown in FIG. 17 in the described embodiment a passage sensor 232 is positioned adjacent to the passage area 92. Passage sensor 232 is operatively connected to the controller 52 and is operative to sense sheets therein. The passage sensor 232 is operative to sense the leading edge of the note entering the passage area. In response to the passage sensor the controller 52 is operative to operate the transport drive which operates the outlet transport 96. The outlet transport runs so that notes in connection therewith move toward the note outlet opening 28. This motion of the outlet transport also causes the gate 114 to move to the directing position to engage notes with the outlet transport. In the described configuration of the invention the outlet transport and the limited slip portion 108 of the inlet transport 98 move in cooperating relation so as to move notes from the passage area into engagement with the outlet transport.

The reel drive mechanism moves the web 70 in the note dispensing direction until the end of the sheet is sensed passing the passage sensor 232. The sheet passing the passage sensor is carried by the outlet transport 96 to the outlet opening 28 where it is delivered to the customer. This is represented by a note 234. The note at the outlet opening may be held in a tray or by other suitable holding devices until taken by the customer. Alternatively a suitable sensor adjacent to the outlet which is connected to the controller may operate to hold the sheet in connection with the outlet transport in a stopped relation until the customer physically pulls it from the opening. Various approaches to delivering the sheets may be used depending on the nature and character of the transaction machine.

Additional sheets beyond one may be delivered. The controller 52 operates the reel drive mechanism to dispense additional sheets through the passage area and to deliver them through the outlet transport to the customer. When the desired number of sheets has been dispensed which corresponds to the input from the user, the controller operates to stop both the reel drive mechanism and the outlet transport.

In the course of dispensing sheets from the storage reel the passage sensor senses each sheet. The passage sensor may be a radiation type sensor that is capable of sensing both the leading and trailing edges of the sheet. Of course in other embodiments of the invention other types of passage sensors may be used. As the web 70 moves to deliver one or more sheets to the passage area the web sensor 222 provides signals to the controller 52. In response to the sensing of the machine readable indicia by the sensor 222 the controller generates signals. These signals include data representative of sheet quantities. This may include for example in some embodiments a simple count which corresponds to a length of web remaining on the storage reel. Because the notes are generally spaced at a uniform spacing this count data is representative of a quantity of sheets remaining. This data can be stored in the memory 56 as a quantity condition which corresponds to the number of sheets remaining.

Alternatively in embodiments of the invention the sensor 222 may be operative to sense the number of indicia which pass the sensor as a sheet is moved through the passage area as sensed by the sensor 232. The number of indicia which pass the sensor 222 as a single note is dispensed can be correlated with the distance of the location adjacent the sensor to the end of the web. The controller is operative responsive to the sensor sensing more than a determined number of such indicia during the dispense of a single note and may be programmed to store and provide an indication of a quantity condition which indicates that the machine is in need of note replenishment.

In addition to using the machine readable indicia on the web to provide data representative of the quantity of notes remaining, the controller 52 may also be operative to cause actual count data or data representative of a value to be stored in memory 56. In this way the controller may be operative to maintain information on how many notes remain stored in the machine at any time. This may enable a user to query the controller to determine the number of remaining notes.

In the event that the described form of the controller should experience a failure of the volatile memory data concerning the number of notes remaining, the controller may operate the machine to execute a recovery operation to determine how many notes are remaining. The executable steps necessary to perform this recovery operation may be stored in nonvolatile memory so that the machine can almost always execute the recovery operation no matter what conditions are experienced. In the recovery operation the controller responds to a loss of available memory data by operating the reel drive mechanism to wind the web 70 onto the storage reel 66. The reel drive mechanism continues to wind the web onto the storage reel until a first end area adjacent the end of the web attached to the take-up reel is sensed. This may be done a number of ways, for example by the sensor 222 sensing a set number of machine readable indicia on the web within a given time period which the controller determines through use of the clock device 54.

Once the controller has determined that the web has been wound onto the storage reel to generally the full extent, the controller operates the reel drive mechanism to begin moving the web from the storage reel to the take-up reel. As the reel drive mechanism is operated by the controller to do this the controller generates signals responsive to indicia sensed by the web sensor 222. These signals are indicative of how far the web has moved at any given time. The process of winding the web onto the take-up reel is stopped when the passage sensor 232 senses the first note entering the first passage 92. At this point the controller 52 is operative to generate a further signal which corresponds to the location on the web where first sheet is sensed. Because the sheets are generally stored in relatively uniformly spaced relation, the further signal generated is indicative of a number of sheets that remain in supporting connection with the web on the storage reel. This enables the controller to closely determine how many sheets remain in storage. Further operation of the machine dispensing and receiving sheets may thereafter be continued using the data corresponding to the sheet quantity determined through the recovery operation. Of course this is but one example of operation of the machine used in connection with a described embodiment. In other embodiments other approaches to calculating and determining the number of sheets in storage at any given time may be used.

Figure 18:
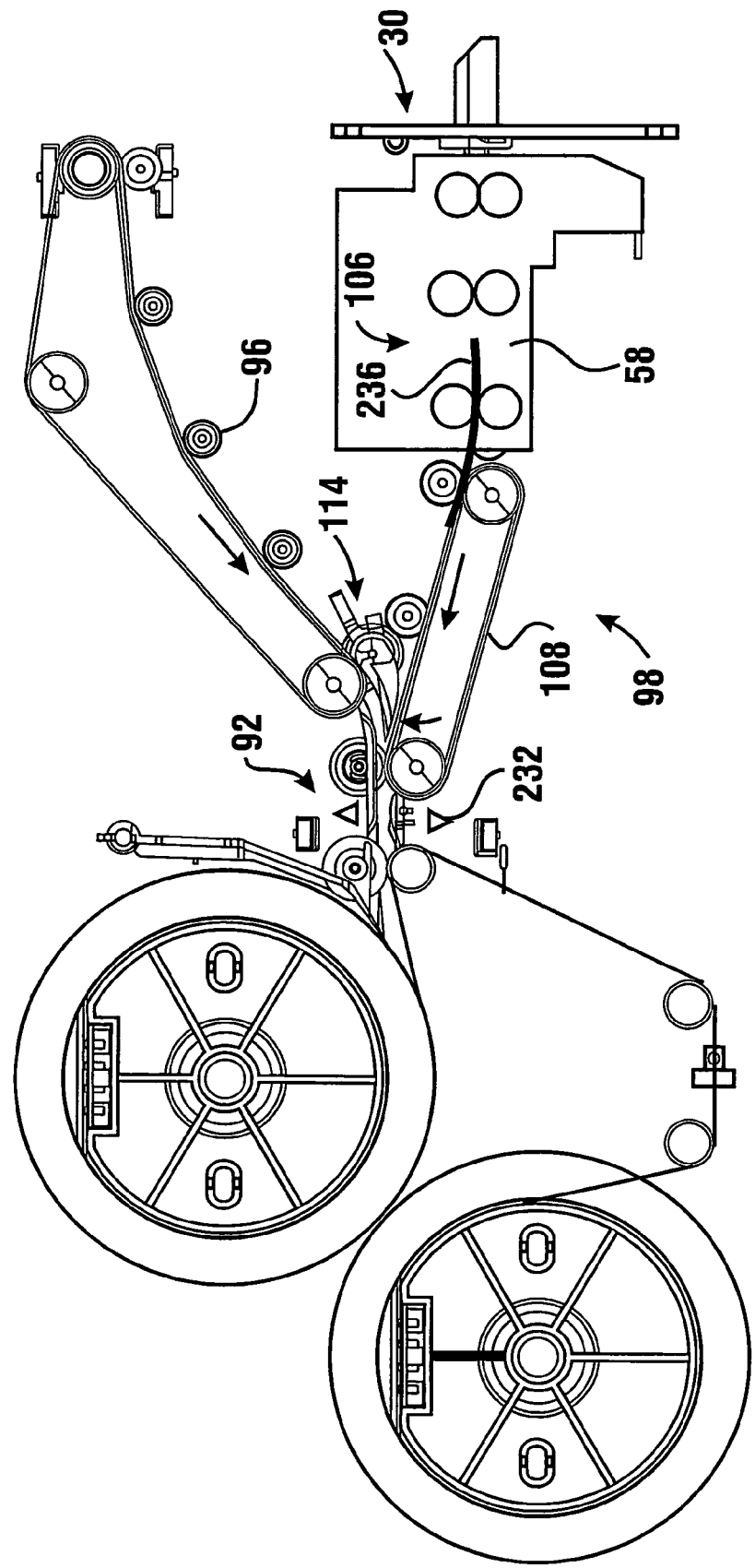
FIG. 18 is a side schematic view showing movement of sheet handling mechanisms when the note validator is operating to determine if an inserted note is valid.
Figure 19:
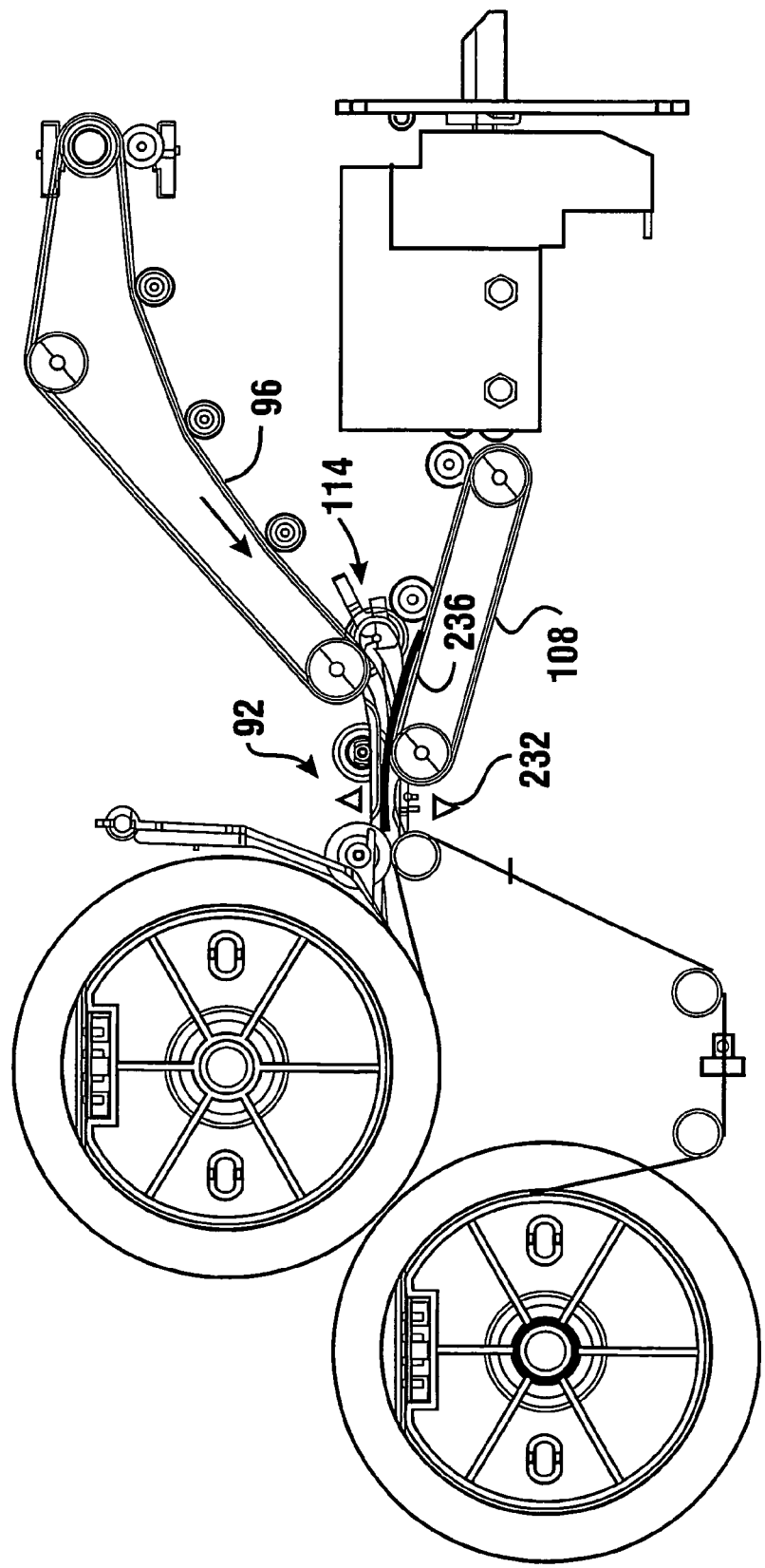
FIG. 19 is a schematic view showing a note that has passed from the note validator to the passage area.
Figure 20:
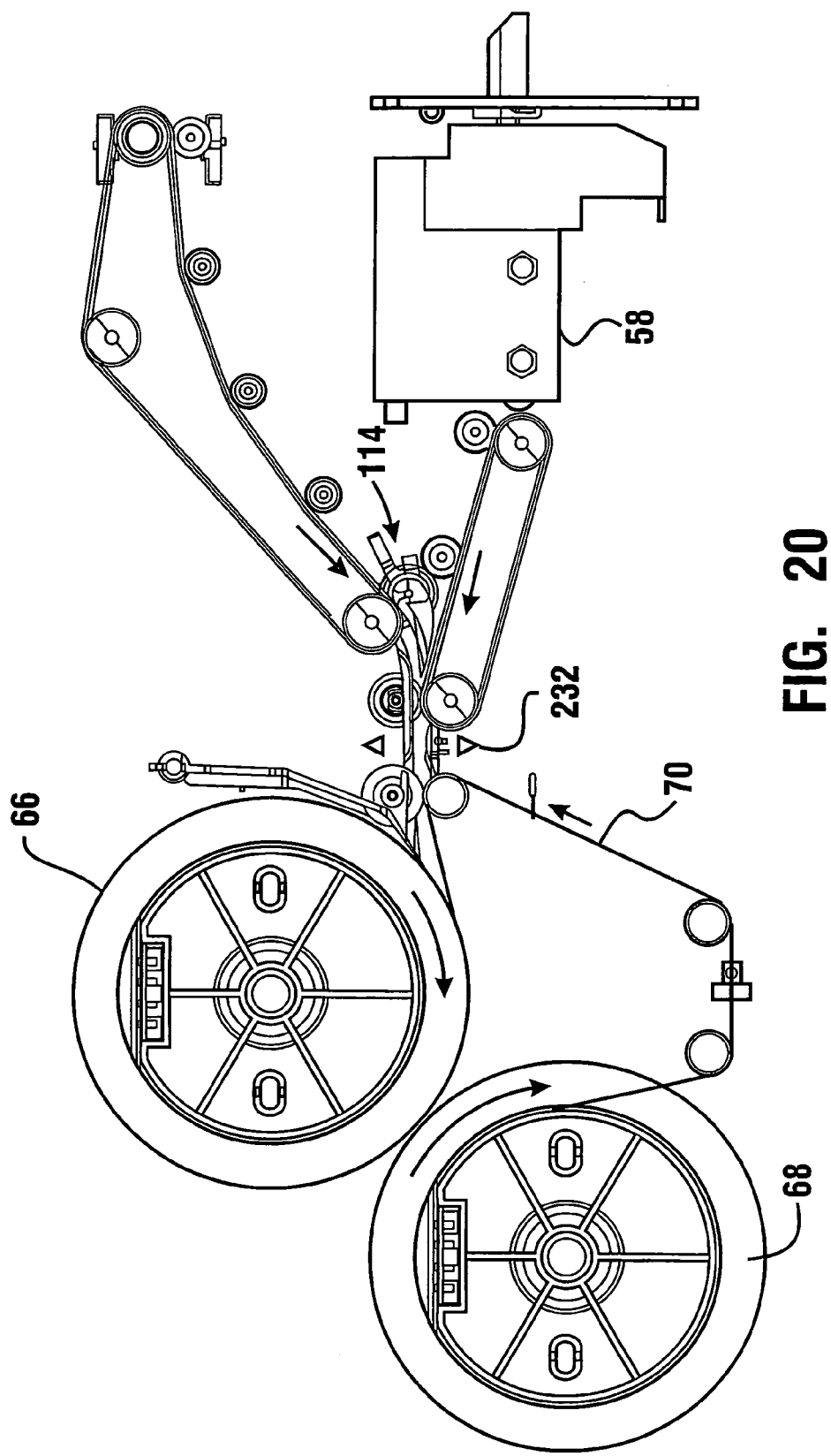
FIG. 20 is a schematic view indicating operation of sheet handling mechanisms in moving a note through the passage area and into supporting connection with the web and sheet storage reel.

The operation of the machine to receive a note is now explained with reference to FIGS. 18-20. To insert notes into the machine may require an appropriate input by an authorized user through the input devices. This may include special cards or codes which are used by servicing personnel to replenish notes in the machine. Alternatively as was discussed in connection with FIG. 1, the housing of the machine may include a physical security device which can be accessed by authorized personnel and which only enables such personnel to input notes into the inlet opening. Alternatively the inlet opening may be positioned relative to the housing in such a way that it is generally only accessible by authorized personnel. Finally in some embodiments of the invention users may both insert cash into the inlet opening as well as receive cash through the outlet opening. The particular activities that a user may go through in order to enable the machine to operate to accept notes through the note inlet opening will depend on the particular machine and the programming by the operator of the controller 52.

When notes are to be accepted a note is inserted through the inlet opening 30 to the inlet transport 98. In the inlet transport 98 the note first extends in the nonslip portion 106 of the inlet transport which extends adjacent to the validator 58. The validator includes sensors therein for sensing if the inserted note is a note that is valid for acceptance by the machine. For example in this embodiment the validator may be configured to accept only US twenty dollar bills and to reject all other inserted sheets as invalid for this machine. The controller 52 operates in connection with the validator 58, and a sheet schematically represented 236 is moved therein by the nonslip portion 106. As represented in FIG. 18 the sheet 236 may be extended from the nonslip portion into the limited slip portion 108 which is driven by the transport drive to move in the direction indicated. The limited slip portion engages the sheet but allows it to be moved back and forth by the portion 106. In the event that the note is determined to be invalid the nonslip portion may disengage the note from the limited slip portion 108 and move it back outwards through the opening 30. If the note is determined to be valid however the portion 106 releases the note 236 into the limited slip portion 108 which moves the note in connection therewith towards the passage area 92.

Because in the described embodiment the limited slip portion 108 and the outlet transport 96 are operated by a common drive mechanism, movement of the limited slip portion in the direction indicated also causes the outlet transport to move in a manner which causes the gate 114 to be rotated to the note accepting position. As a result the note 236 is moved to the passage area 92 as shown in FIG. 19. When the note reaches the passage area it is sensed by the passage sensor 232.

The controller is operative responsive to the note being sensed by the passage sensor to operate the reel drive mechanism. The controller is operative to cause the web 70 to move in the note accepting direction as shown in FIG. 20. The reel drive mechanism moves the web so that the note comes into supporting connection therewith and is wound onto the note storage reel 66. The controller continues to operate the reel drive mechanism until the trailing edge of the note is sensed as passing the passage sensor 232. Thereafter the controller may operate the reel drive mechanism to move the note a sufficient distance so as to provide spacing from the next note which is inserted. Once the controller has moved the inserted note a sufficient distance onto the note storage reel the reel drive mechanism stops until instructed to move further by the controller.

While in this first described embodiment the nonslip drive portion adjacent the validator sensors 58 is operative to immediately push out notes that are sensed as not valid, alternative forms of the invention may be programmed to operate differently. For example a controller 52 may be programmed to move a note in the inlet transport past the validator. If the validator senses an invalid note, the note may be stopped at the passage area once the trailing edge of the note has passed the gate 114. The controller may thereafter operate to reverse the direction of the transports 96 and 98 which causes the gate to direct the note outward through the outlet opening. The controller 52 may operate both the inlet and outlet transports as well as the roll storage mechanism to accomplish this. This may include for example causing the invalid note to be stored partially or temporarily in supporting connection with the web 70 before the direction of the note is reversed to deliver the note outward. These are examples and other embodiments of the invention may operate differently to reject notes.

Figure 21:
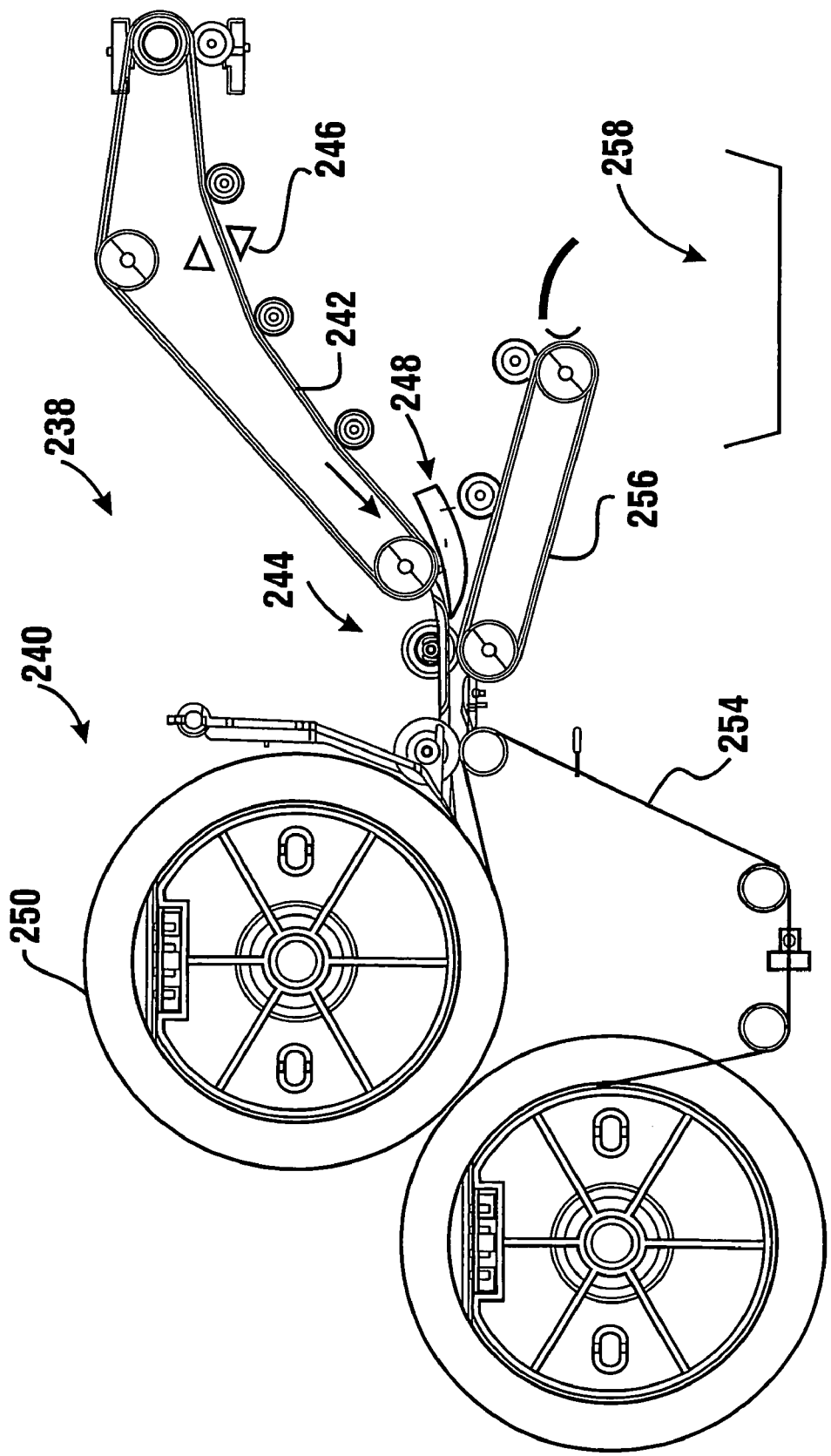
FIG. 21 is a schematic view of an alternative embodiment of an automated transaction machine which includes a common note inlet and outlet transport in connection with a note validator.

Alternative forms of the invention may be produced to accommodate other types of validating mechanisms. FIG. 21 shows an alternative form of a note handling mechanism generally indicated 238. Mechanism 238 is generally similar to that previously described except as otherwise indicated. It includes a note receiving and dispensing mechanism 240 similar to mechanism 77 previously discussed. Mechanism 238 further includes a combined inlet and outlet transport 242. Inlet and outlet transport 242 is selectively operative to both move sheets into and out from a passage area 244. Note sensors 246 are positioned adjacent to the transport 242. Note sensors 246 may be operative to sense that the note is valid, such as for example whether a note which is passing through the transport 242 is a valid US twenty dollar bill. An example of a suitable note sensing device for this purpose is described in U.S. Pat. No. 5,923,413 which is owned by the Assignee of the present invention and incorporated by reference as if fully rewritten herein.

If the note is sensed as valid it may be moved by a transport 242 past a gate 248 and into a storage location on the storage reel 250. Likewise when the note is to be dispensed from the storage reel, a web 254 which holds the notes in supporting connection with the storage reel may move the note into the passage area 244. The gate 248 is moved by an actuator (not shown) to direct the note to engage the transport 242. The transport 242 then operates in a direction to carry the note from the passage area to a note outlet adjacent the end of the transport 242.

If the controller of the mechanism 238 is operating to sense notes being input into the machine and the sensors 246 operate to sense an invalid note, the transport 242 may be reversed immediately to reject the note. Alternatively if it is not desired to reject the note through the exterior of the machine, the note may be moved by the transport 242 into the passage area 244. The note may also be moved partially onto the web 254 as is necessary in the operation of the machine. Thereafter, after the note has been moved to the storage area, the position of the gate 248 may be changed and the controller may operate a reject transport 256. The reject transport is operated to move the note inward to a storage area 258 inside the housing of the machine. As a result suspect notes are held within the housing of the machine until they can be removed by authorized personnel.

An advantage of the described embodiment of the invention shown in connection with mechanism 238 is that a single transport can be used as both the inlet and the outlet transport for notes. This may have advantages in some embodiments in which the validity of notes may be determined within a single note path which moves selectively in opposed directions.

Figure 22:
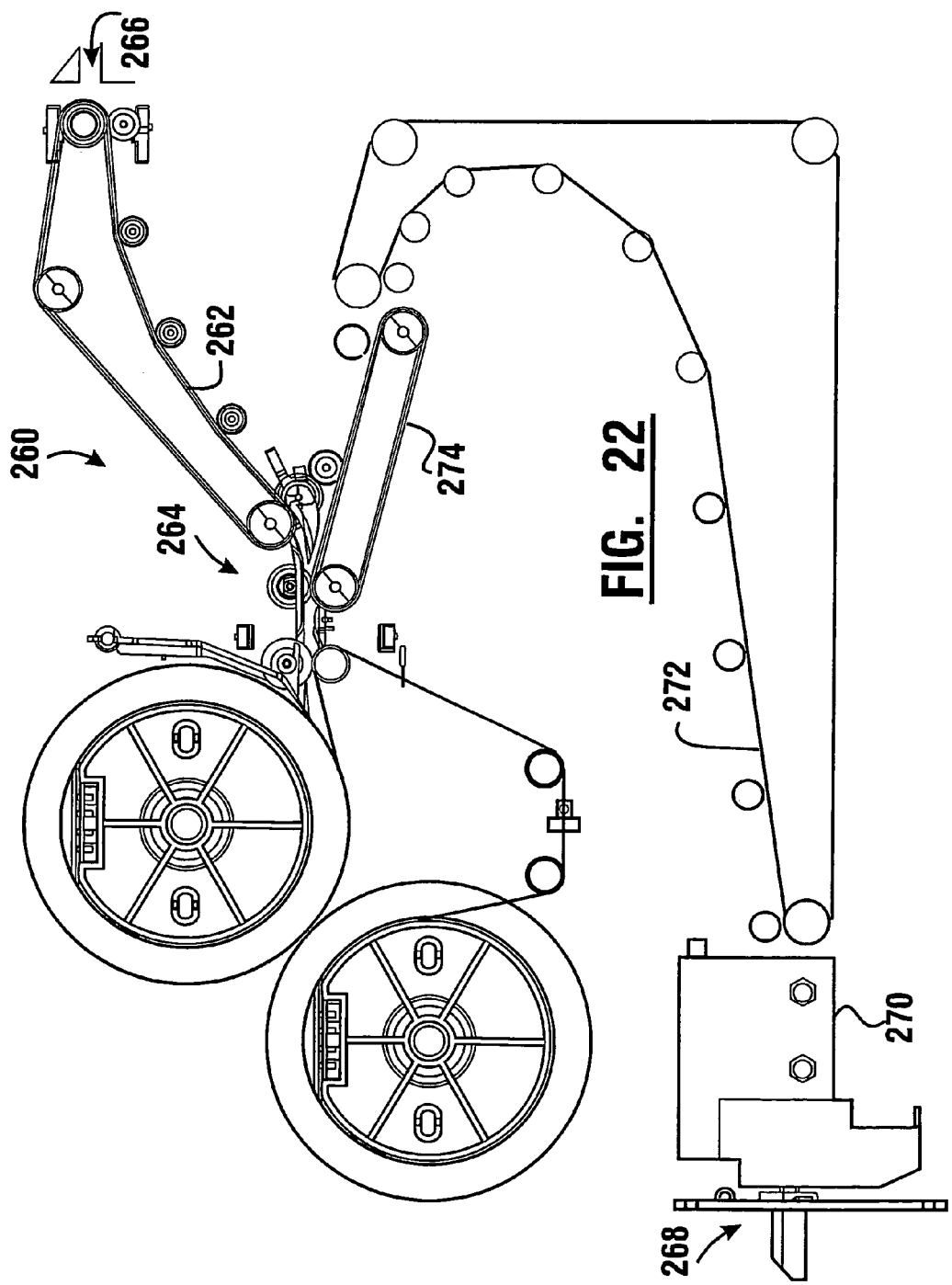
FIG. 22 is a schematic view of a further alternative embodiment which has a note inlet opening on an opposed side of the machine from the note outlet opening.

An alternative note handling mechanism generally indicated 260 is shown in FIG. 22. The note handling mechanism 260 is similar to the first note handling mechanism described except where otherwise indicated. Note handling mechanism 260 includes an outlet transport 262 that extends between a passage area 264 and a note outlet opening 266. Mechanism 260 further includes a note inlet opening 268. The note inlet opening extends in a housing wall of the machine which is generally opposed of a housing wall in which the outlet opening extends. Inlet opening 268 is operatively connected to a note validator 270 which may be of a type previously described. The note validator 270 is connected to a first limited slip transport section 272 and a second transport section 274. Transport sections 272 and 274 are operative to carry notes that have passed the validator 270 to the passage area 264.

The operation of the mechanism 260 is generally similar to the first described embodiment of the invention. However an advantage of the construction shown in FIG. 22 is that an operator of the machine is enabled to load currency into the machine from the rear. Certain preferred forms of the invention are sufficiently small such that they may be supported on a counter top or on a standard interior building wall. This enables the machine operator to feed notes into the machine from behind the counter or from within an interior room within a building. This may facilitate loading of notes in the machine as the machine operator does not have personnel blocking access to the machine as notes are being loaded, which may discourage customers from using the machine. In addition this configuration may eliminate the need for covers or other devices over the note inlet opening to prevent confused customers from attempting to insert things into the inlet opening. Further advantages of this alternative structure shown in FIG. 22 will be apparent to those skilled in the art.

Figure 23:
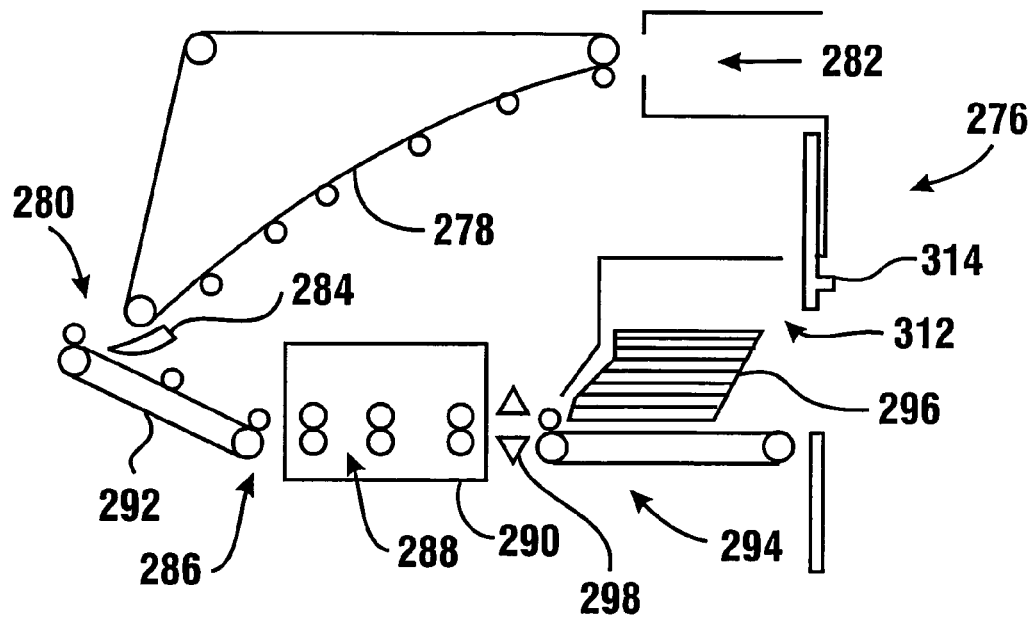
FIG. 23 is a schematic view of an automated transaction machine which is capable of receiving and separating a stack of notes.

Yet another embodiment of a note handling mechanism generally designated 276 is shown in FIG. 23. This alternative note handling mechanism 276 is operative in the described embodiment to work in connection with the note receiving and dispensing mechanism 77 of the first embodiment including the note storage module 44 which has been previously described. The alternative note handling mechanism 276 is operative to avoid the need for a user to insert notes generally one at a time for storage within the machine.

The note handling mechanism includes an outlet transport 278 which extends between a passage area 280 and a note outlet opening 282. A gate 284 is positioned adjacent to the passage area 280 and operates in the manner previously described. An inlet transport 286 includes a first portion 288 which extends adjacent to a validator 290. A second transport portion 292 extends between the validator and the passage area 280.

The note separating mechanism generally indicated 294 is positioned generally adjacent to the validator. The note separating mechanism is operative to separate notes individually from a stack 296 and deliver the individual notes to the validator 290. A note thickness sensor 298 is positioned adjacent to the unstack mechanism. The note thickness sensor 298 operates to sense if more than one note has been removed from the stack. In the event that more than one note is sensed as passing from the stack toward the validator, the controller is operative to cause the note separating mechanism 294 to reverse the movement of the note. The note is moved back into the stack and another attempt made until a single note is separated as sensed by the thickness sensors and delivered to the validator.

Figure 24:
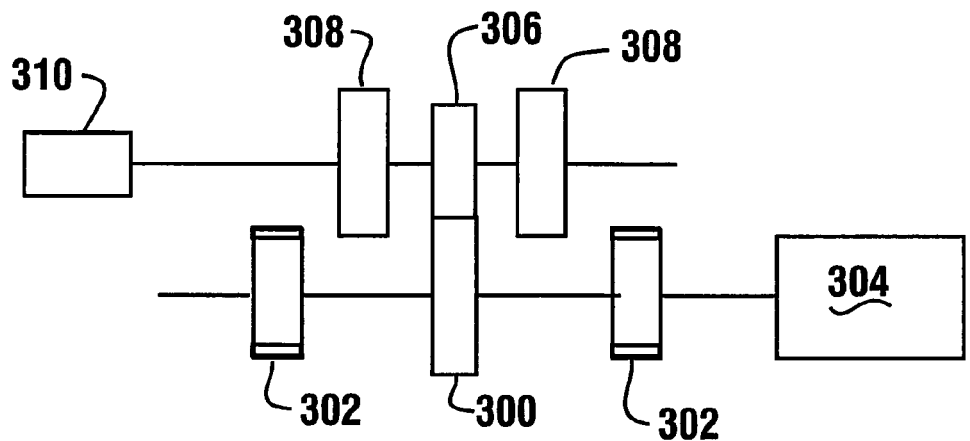
FIG. 24 is a schematic view of a mechanism used for separating notes individually from the stack in the embodiment shown in FIG. 23.

An exemplary separating mechanism is shown schematically in FIG. 24. The arrangement includes a central feed roll 300 which is flanked by two supplementary belt supporting feed rolls 302. The feed rolls 300 and 302 are rotated by a drive schematically indicated 304. The drive is selectively operated responsive to signals from a controller.

A contact stripper roll 306 and a pair of non-contact stripper rolls 308 are positioned in generally opposed abutting arrangement with feed rolls 300 and 302. Rolls 306 and 308 are connected on a common shaft to a one-way clutch 310. The one-way clutch is operative to resist rotation of rolls 306 and 308 in a direction which would facilitate the movement of sheets from the stack towards the validator. However the clutch 310 readily enables the rolls 306 and 308 to rotate in a direction generally moving sheets away from the validator towards the stack. When the drive 304 moves rolls 300 and 302 to move a sheet at the bottom of the stack 296 towards the validator, both rolls 306 and 308 resist motion of the sheet. This generally prevents all but the first sheet at the bottom of the stack from moving past the sensors 298 to the drive portion 288 adjacent the validator 290. If however multiple sheets are sensed by the sensors 298 as being passed out of the stack, the controller operates to reverse the direction of drive 304. In this situation rolls 306, 308, 300 and 302 cooperate to readily help move the sheets back into the stack.

As shown in FIG. 23 in the described form of the invention the stack 296 may be inserted in an unstack area 312 within the housing of the machine. Access to the unstack area may be controlled by a door schematically indicated 314. In the described form of the mechanism shown in FIG. 23, the machine operator is enabled to place a stack of notes in the unstack area 312 and then close and secure the door 314. The machine may thereafter operate to separate the notes in the stack to validate them as proper and to store the notes in the storage reel of a connected note storage module. If in the course of sensing the sheets invalid sheets are found, the invalid sheets may be diverted through operation of the gate 284 into the transport 278 which can deposit the sheets in the area adjacent to the note outlet opening 282. Alternative forms of the invention may provide other storage areas for holding invalid sheets. Further alternative forms of the invention may provide for interrupting the note validating and stacking operation of the machine for a user who wishes to operate the machine for dispensing purposes. Of course other alternative arrangements and configurations utilizing the principles of the invention may be devised by those skilled in the art.

Figure 25:
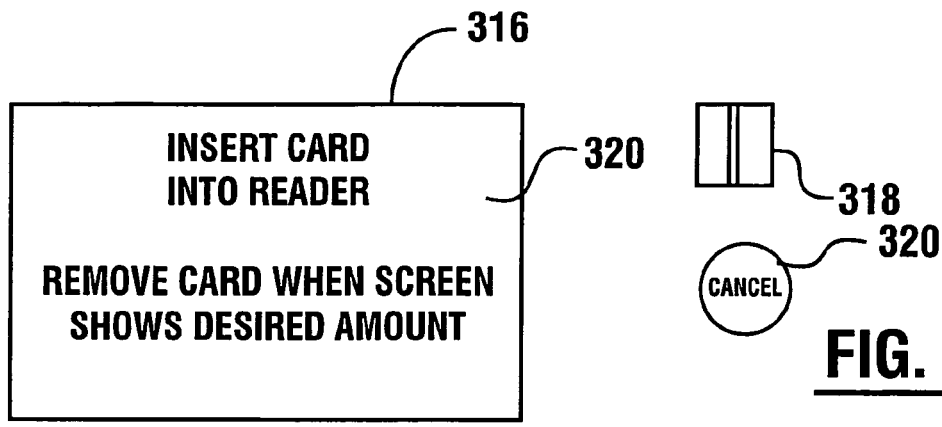
FIGS. 25-30 are schematic views of a user interface and the operation thereof which may be used in connection with embodiments of the invention.

Alternative forms of user interfaces may be provided for use in connection with embodiments of the invention. Such an alternative embodiment is shown in FIGS. 25-30. The alternative embodiment includes a display 316 which in various embodiments may be an LCD, CRT or other type of visual or nonvisual output device. The interface further includes an input device in the form of a dip card reader for reading magnetic stripe cards generally indicated 318. The interface further includes a cancel button indicated 320. In this simplified user interface the controller operates to display messages which can be observed by the user on the display 316. These various displays which include preprogrammed text and/or graphics are referred to as screens herein. When the machine is waiting for a customer to begin operating the machine an initial screen indicated 320 and shown in FIG. 25 is output on the display. The initial screen 320 instructs a user to insert their card into the dip reader and to withdraw the card therefrom when the amount that they desire is displayed on the screen.

Figure 26:
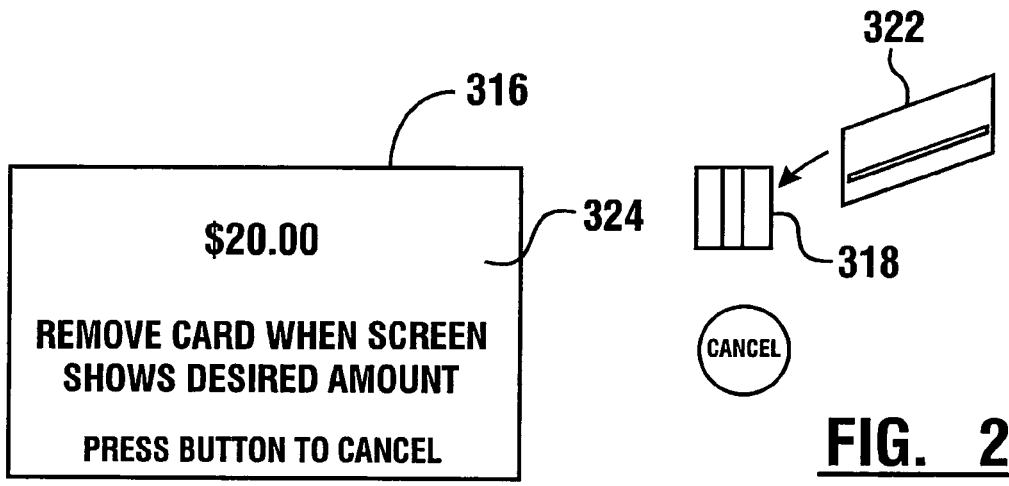
Figure 27:
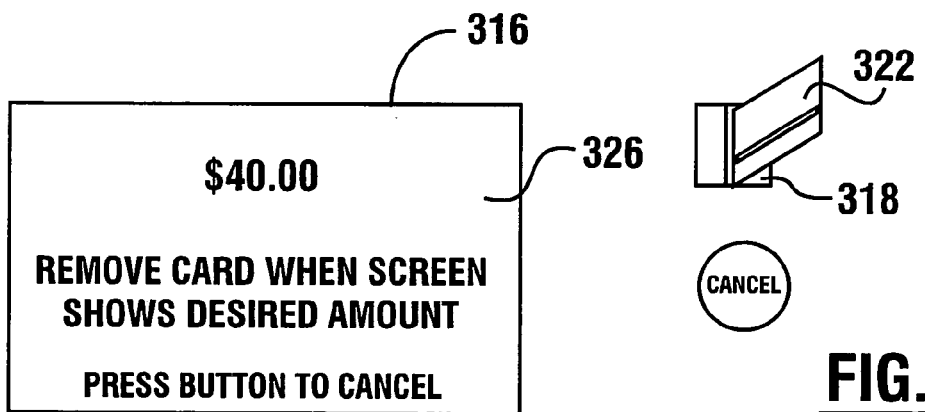

FIG. 26 shows a card schematically indicated 322 of the magnetic stripe variety being inserted into the reader 318. In response to the card being inserted and held therein a first amount screen indicated 324 is displayed. The first amount screen which is generated responsive to the controller advises the customer of an amount and to withdraw their card from the dip reader when the amount shown on the screen corresponds to a desired amount that they wish to receive. In the described embodiment within approximately five seconds after the first screen is displayed a second account screen indicated 326 and shown in FIG. 27 is displayed. The second amount screen shows a different amount and again instructs the user to remove the card from the dip reader when the amount that they desire is shown. Assuming that the user does not withdraw the card from the reader when the second amount screen 326 is shown, a short time later (about five seconds in this exemplary embodiment) a third amount screen is displayed. Because the described embodiment dispenses twenty dollar bills, each sequential display screen increases the amount by twenty dollars. This sequence is continued until a maximum amount screen is reached or until the customer presses the cancel button 320.

Figure 28:
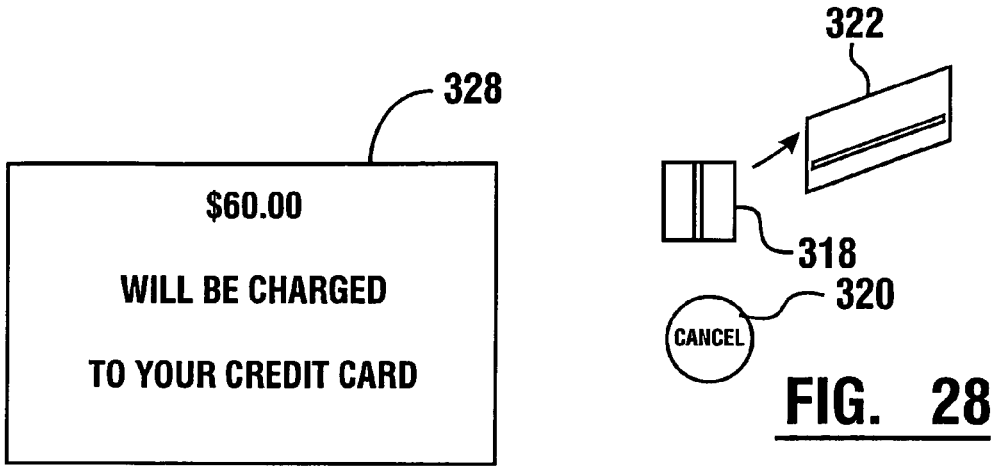
Figure 29:
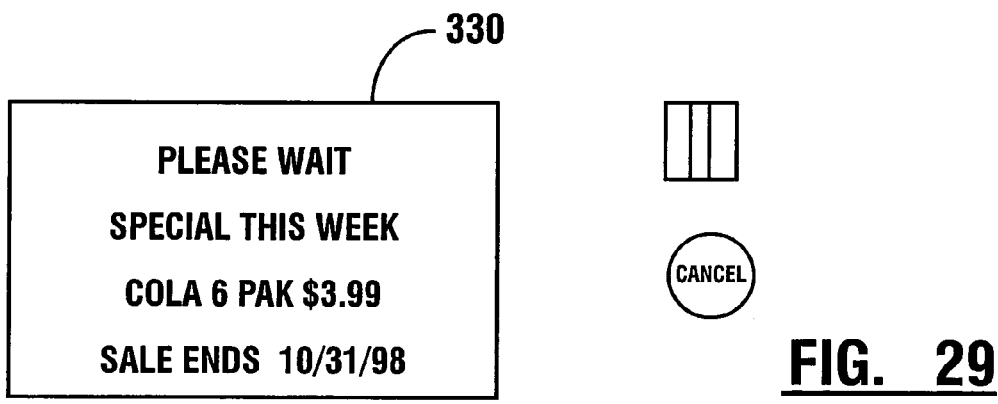

Assuming that the customer removes their card from the reader 318 when a sixty dollar amount is displayed, a withdrawal screen generally indicated 328 and shown in FIG. 28 will be displayed. The withdrawal screen 328 advises the customer of the amount that will be charged to their account. Again assuming that the customer does not promptly hit the cancel button 320 the controller operates to communicate through its associated communication device with an appropriate host computer or other system to determine whether the customer is authorized to charge the amount requested. During this time period a wait screen 330 shown in FIG. 29 is displayed. When the machine receives authorization indicating that the customer is authorized to receive the amount requested, the controller operates the components of the machine to cause the requested amount to be delivered to the customer through the outlet opening in the housing. The controller also operates to have a transaction receipt printed.

Figure 30:
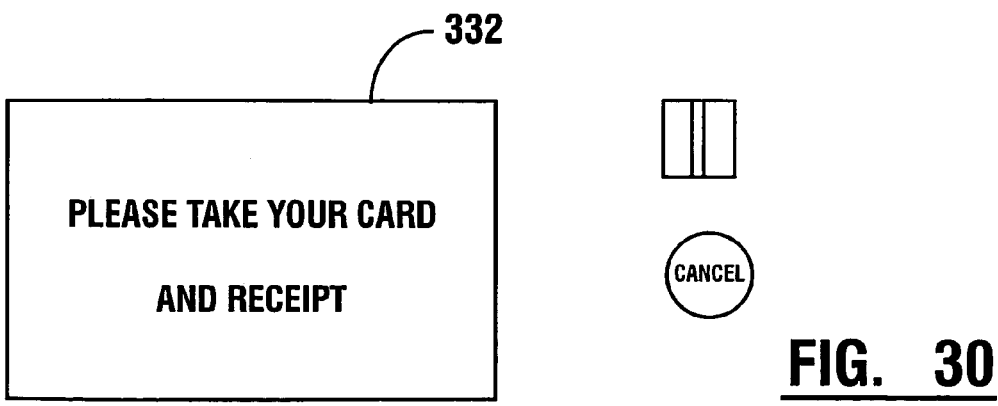

After this is done a completion screen generally indicated 332 and shown in FIG. 30 is displayed. The completion screen advises the customer to take their cash and their receipt. Of course if for some reason the transaction is not authorized, an alternative screen advising the customer of this is displayed to the customer. Thereafter the controller is operative to return to the initial screen 320.

An advantage of this exemplary user interface is that it can be used with machines that dispense cash in response to credit card inputs and requires no further input devices other than a cancel button and a dip reader. Such components are very common on many types of transaction machines whose primary function is not the dispensing of cash. This interface facilitates incorporating the note dispensing mechanism of the present invention into other types of transaction machines. In addition other embodiments may eliminate the cancel button by enabling the customer to cancel the transaction by removing the card at a time when a particular screen is displayed. Many alternative embodiments employing these principles may be devised.

A further novel aspect of the described embodiment of the invention is the ability of the machine to display selected promotional messages to the customer on a timely basis. Such a promotional message is shown in screen 330 and indicates a sale on a beverage item. In an exemplary embodiment of the invention this promotional message is generated in response to the data stored on the plug in memory 38 which is connected to the connector 36 on the housing. The data stored in the plug in memory which in the described form of the invention is a smart card, includes a promotional message as well as time parameters associated with the promotional message. Thus for example if the special offer represented in screen 330 is to extend only until a certain date, the controller and its associated clock device are operative to sense the passage of this date and to no longer display the particular promotional message once this date has passed. For example if the operator of the machine fails to remove the plug in memory and the controller determines that the message is no longer timely, screen 330 may include only a blank space or a blank area below the "please wait" notice on the screen while the machine is operating to obtain verification and to dispense the user's cash.

Likewise other data may be stored in the plug in memory module so that particular promotional messages are displayed at particular times of day or within particular time periods. The plug in memory module may also include several promotional messages which are designed to be displayed at various times or sequentially to users of the machine. Alternatively the data stored in the plug in memory module may include public service messages such as promoting various charitable organizations and events. The data stored in the plug in memory may also be operative to generate graphical presentations as well as other types of video and audio presentations that may be of interest to a user. Other data stored in the memory module may include for example logos or other advertising for the establishment where the automated transaction machine is operated.

Because the exemplary form of the invention enables the presentation of promotional messages selectively by simply plugging a smart card into an associated connector, the promotional messages may be changed readily from outside the machine and very cheaply. For example the merchandising establishment or entities sponsoring promotional events may provide promotional messages on smart cards to operators of the machine. The operators of the machines may plug the cards into the machine and during the selected time windows for presentations of the messages, the messages will be displayed. At times when the memory indicates that such messages are not to be displayed, screens including the messages are not provided to users of the machine. Thus the providers of promotional messages are able to avoid their promotions being presented beyond the expiration date or at other times when it is not appropriate.

Of course the automated transaction machine may be operative to output such promotional messages at other times during its operation. This may include for example periodically displaying promotional messages in place of the initial screen. This may include for example alternating a promotional message with the initial screen 316 during relatively brief time periods such as a period of five seconds. In this way a user walking up to the machine will be advised in a very brief period of time how to operate the machine. However such a user will also receive at least one and perhaps several promotional messages before they proceed to insert their card into the reader 318. In this way the described form of the invention enables operators of the machines to conduct additional marketing relatively simply and reliably and at a minimum cost.

It should be understood that while in the exemplary embodiment the plug in memory element includes a smart card, other embodiments may include other types of plug in memory devices. These may include for example floppy disks, PROMS, CD-ROMs or other devices. It should further be understood that access to such replaceable memory items may be limited by a cover, such as for example the cover for the note inlet opening previously discussed. In this way access to the connector or reader for the plug in memory is limited to persons who are authorized to change the plug in memory. However, such persons do not need to have access to the note storage area inside the machine to change the plug in memory.

An exemplary embodiment of the invention is shown in FIGS. 31-45. All features previously discussed in relation to FIGS. 1-30 may likewise be incorporated into the exemplary embodiment of the invention shown in FIGS. 31-45. The element numerals used in FIGS. 1-30 represent like elements when used in FIGS. 31-45.

The automated transaction machine apparatus may be used in numerous establishments, including but not limited to restaurants, stores, casinos, and amusement parks. The machine would be useful in any location where cash transactions occur. Furthermore, the machine has the benefits of both a safe and an automated transaction machine. An authorized merchant person, perhaps an employee or owner, may safeguard excess cash in the machine as needed. An authorized merchant person, perhaps a cashier, may also remove cash from the machine as needed for business operations. The machine also permits replenishing of sheets by the merchant when needed, thereby avoiding the expenses of paying a third party to carry out cash replenishment. Additionally, consumers may use the machine to withdraw cash as needed.

Figure 31:
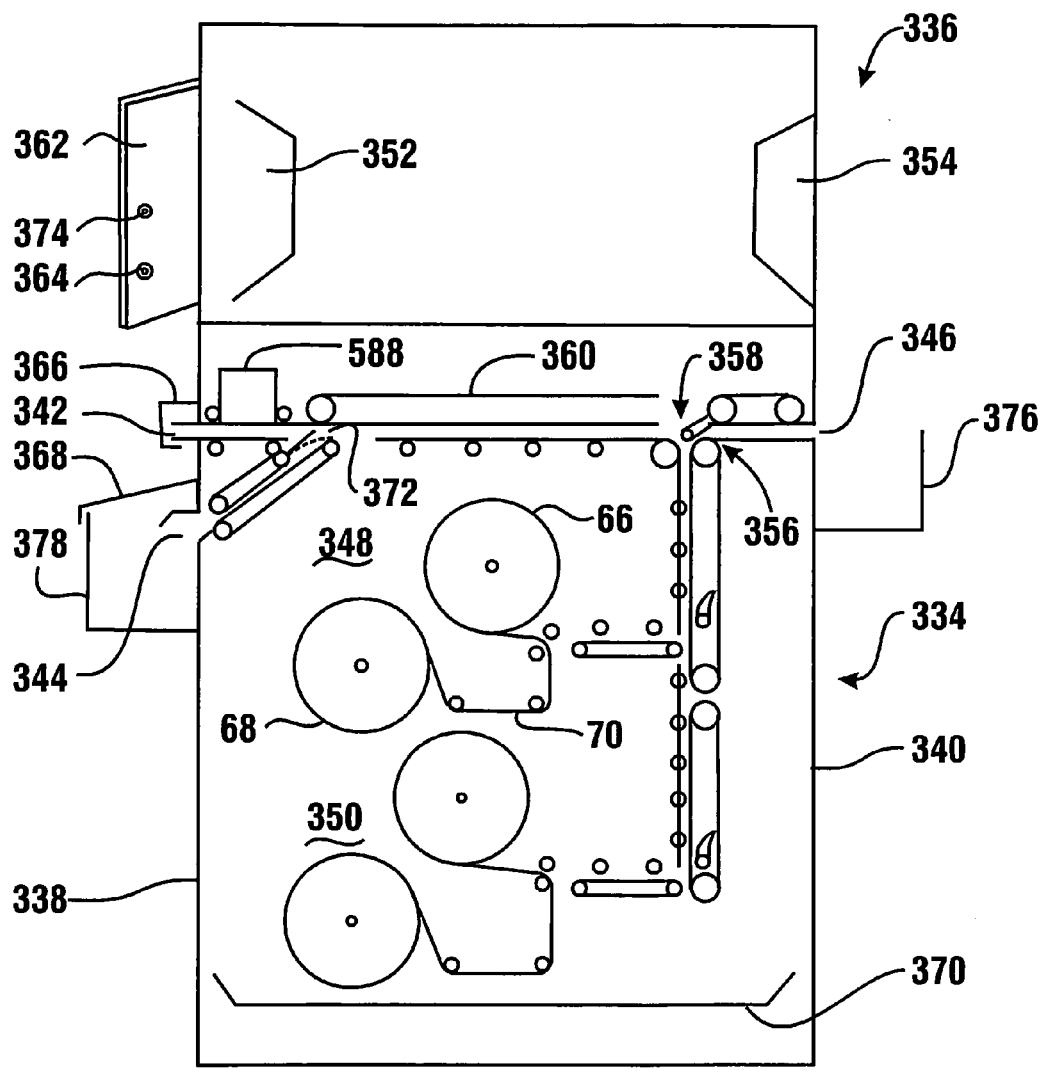
FIG. 31 is a side view of an exemplary embodiment of an automated transaction machine of the present invention.

As appreciated from FIG. 31, the automated transaction machine apparatus of this configuration has a housing which comprises a lower portion and an upper portion. The machine of FIG. 31 permits dual usage. A customer or consumer may use the machine from a front side to dispense sheets such as currency notes. A merchant may use the machine from a rear side to either store or dispense sheets such as currency notes as needed. Hence, the machine includes a common storage area for the currency notes that may be dispensed to either the consumer and the merchant.

The lower portion of the exemplary automated transaction machine comprises a chest portion 334. The chest portion includes a first side 338 or merchant side, and a second side 340 or consumer side. The merchant side of the chest portion includes a sheet inlet opening 342 and a first sheet outlet opening 344. The consumer side of the chest portion includes a second sheet outlet opening 346. Pockets 376, 378 for retaining the dispensed sheets may be provided adjacent to the outlet openings. The chest portion further comprises sheet storage areas 348, 350. Additionally, the chest portion may comprise one or more access doors, including locking mechanisms, providing access to the sheet storage areas. The sheet storage areas, for example, may be used to store different denominations of currency notes. The notes are stored in the lower portion of the automated transaction machine. The notes may be either new or used. Hence, the automated transaction machine of FIG. 31 is of the recycler type of automated transaction machine.

The lower portion of the automated transaction machine may also incorporate additional features, as previously discussed in detail in relation to other embodiments. For example, the chest portion may include a connector 36 operative to releasibly receive a plug-in memory element 38 or other memory. The chest may also house a journal device 46, a communications device 48 and other devices as previously discussed in detail in relation to FIGS. 1-3.

The upper portion of the exemplary automated transaction machine comprises a distinct enclosure portion or top hat 336. The top hat is in supporting connection with the chest portion. The top hat further includes in supporting connection therewith a first user interface 352 and a second user interface 354. The first user interface may be used by the merchant, and the second user interface may be used by the consumer. As previously discussed in detail, the user interfaces may comprise a card reader, keypad, function buttons, display screen, and receipt printer outlet. It should be appreciated that these input and output devices are exemplary and that other embodiments may include additional or different types of input devices which operate to receive information or instruction from users and/or output devices which provide information or instructions to users. Either user interface may be of the arrangement and operation of the type discussed in U.S. application Ser. No. 09/089,287 filed Jun. 2, 1998 or Ser. No. 09/130,756 filed Aug. 7, 1998, the disclosures of which are fully incorporated herein by reference. Additionally, the top hat may comprise an access door 362 for accessing the merchant interface 352. The door may have a handle 374 and a locking mechanism 364 for permitting access to authorized users of the merchant interface. It should be understood that this two-compartment housing construction is exemplary and other embodiments may house all the components within a single chest type housing.

Each note storage area 348, 350 comprises a sheet receiving and dispensing mechanism similar to mechanism 77 previously described. Each sheet receiving and dispensing mechanism is operated responsive to one or more controllers which may be similar to controller 52 as previously discussed in detail, for example, in relation to FIG. 4. The sheet receiving and dispensing mechanisms may each comprise a removably mounted storage module similar to module 44. The storage modules may comprise a storage reel 66 and a take up reel 68. The storage reel and a take-up reel 68 may be rotatably mounted in the machine and driven by a reel drive mechanism. A flexible web 70 extends between the storage reel and take-up reel as previously discussed in detail in relation to FIG. 4. A separator member may be used in separating sheets from the web as previously discussed in detail in relation to FIGS. 9 and 10. The controller is in operative connection with the first user interface 352, the second user interface 354, and the sheet receiving and dispensing mechanisms. The controller controls the movement of sheets in the automated transaction machine. Additionally, the chest portion may comprise one or more access doors for enabling access to the sheet storage areas. The doors may have locking mechanisms for permitting access to authorized personnel in the sheet storage areas.

A passage area 356 and a gate 358 operatively connect the sheet receiving and dispensing mechanisms with a sheet transport mechanism 360. Although the transport mechanism 360 may comprise several transports used in the movement of sheets, as previously discussed in detail, the transport mechanism 360 may also be a single common transport extending adjacent the inlet opening to adjacent the consumer outlet opening. A common transport would be common to sheets passing from the sheet inlet opening 342 to a storage area 348, 350; to sheets passing from a storage area 348, 350 to the first sheet outlet opening 344; and to sheets passing from a storage area 348, 350 to the second sheet outlet opening 346. The transport mechanism may comprise a belt arrangement and operation of the type discussed in U.S. Pat. No. 5,850,075, the disclosure of which is fully incorporated herein by reference. Other configurations of cooperating belts and rollers, or other members suitable for engaging and moving sheets, may be used.

The gate 358 may be of the arrangement and operation as discussed in U.S. application Ser. No. 09/193,793 filed Nov. 17, 1998, the disclosure of which is incorporated herein by reference. FIGS. 32-35 show such an alternative gate arrangement. As shown, the transports may include a supporting surfaces 398, 424 which preferably include dimpled projections and/or elongated projections 426. This structure enables sheets to be transported in engaged relation between the projections and the belt flights 422. The gate 358 may include a plurality of arms 428. The arms are engaged to move together responsive to an actuator. The actuator is in operative connection with the controller. The arms are selectively movable about an axis of rolls 390. Each arm 428 has a roll 430 movably mounted thereon. Each roll 430, which serves as a diverter member, is positioned in alignment with a corresponding inner belt flight 396. The rotation of the rolls and the position of the diverter member 430 determines the direction of sheet movement as sheets pass through the gate. The controller operatively controls the rotation of the rolls and the position of the diverter member.

Figure 32:
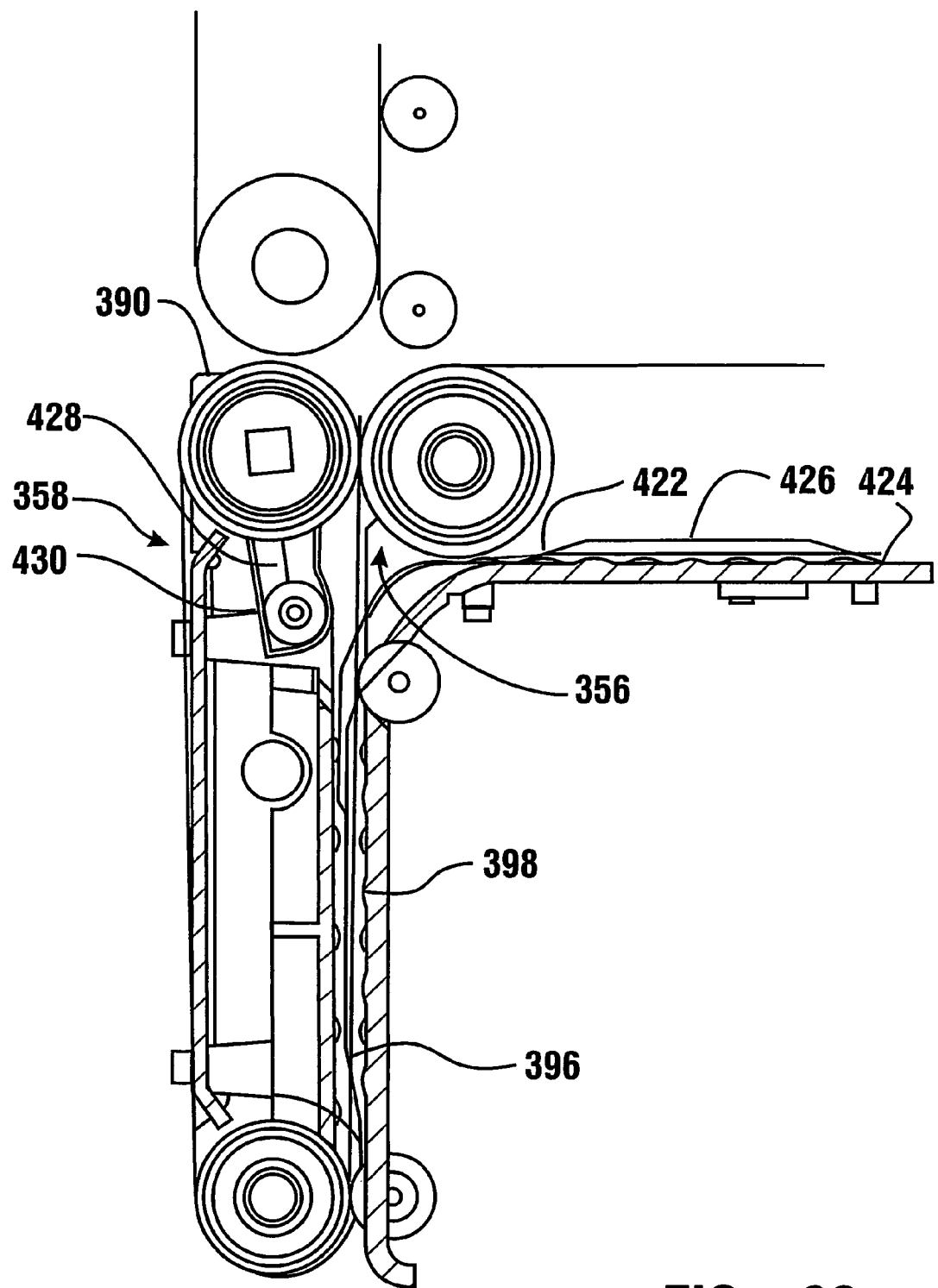
FIG. 32 is a schematic view of an alternative embodiment of a gate arrangement of FIG. 31.
Figure 33:
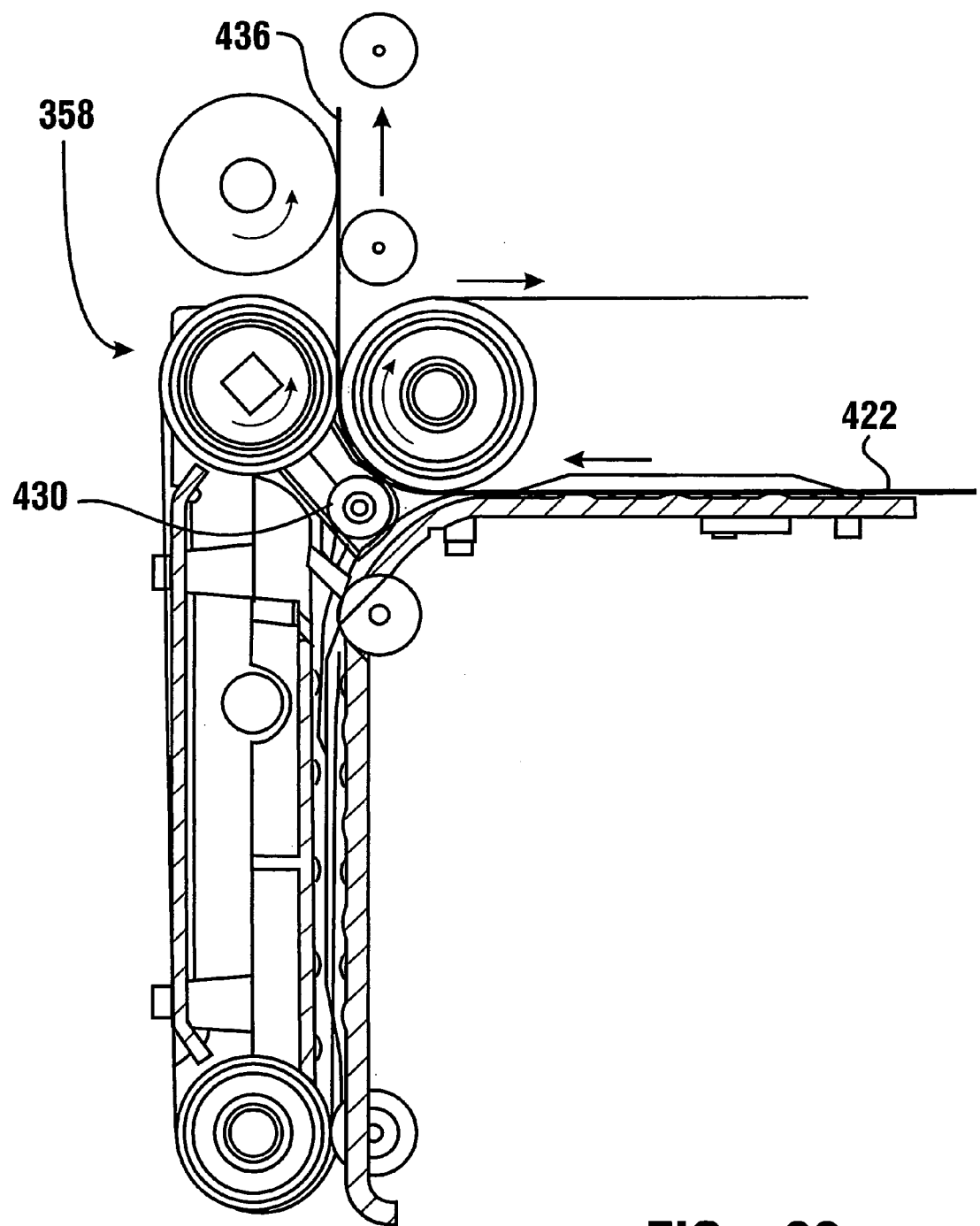
FIG. 33 shows a sheet being moved from a storage area toward the consumer outlet opening with the gate arrangement of FIG. 32.
Figure 34:
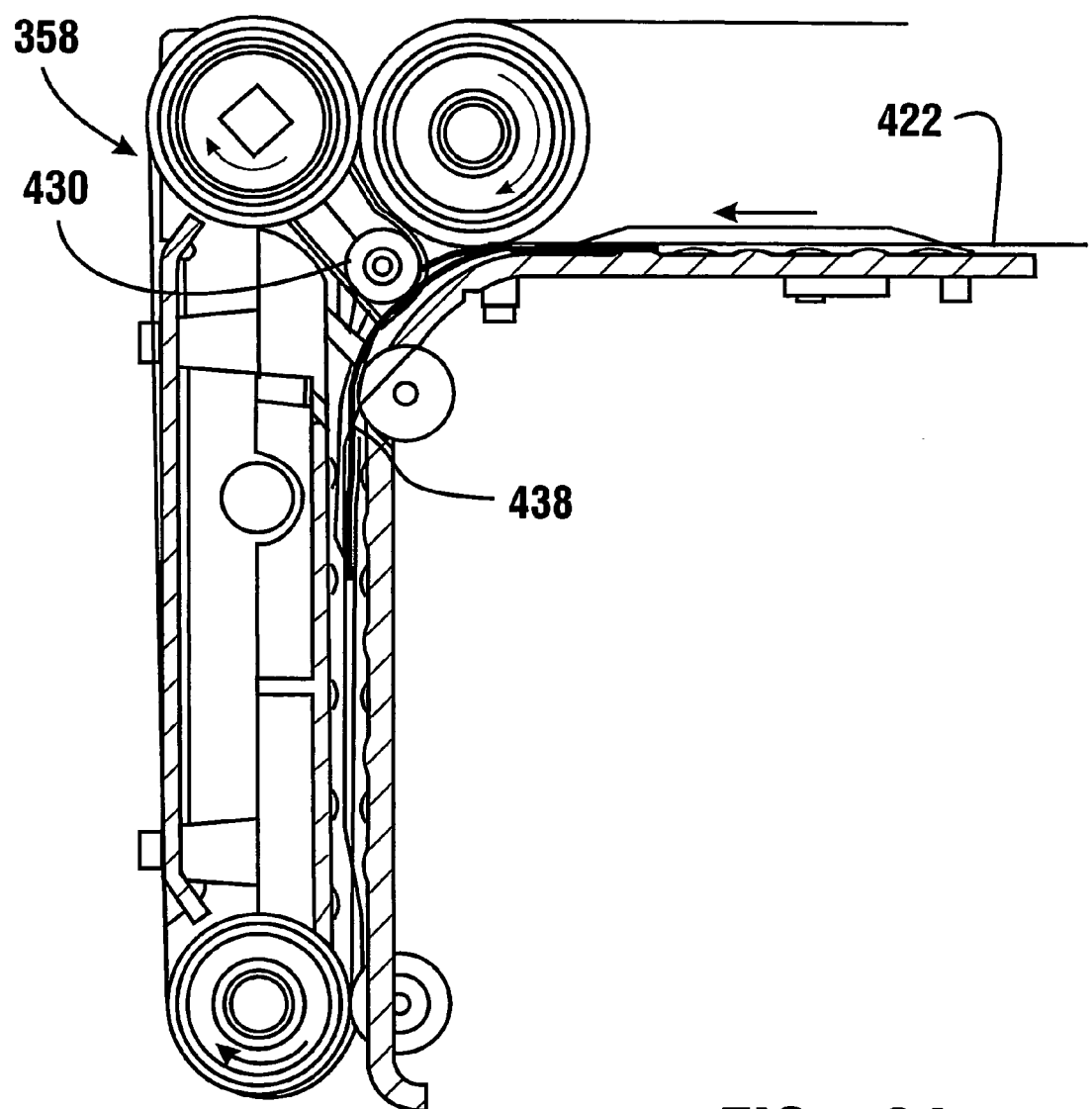
FIG. 34 shows a sheet being moved from a storage area toward the merchant side outlet opening with the gate arrangement of FIG. 32.
Figure 35:
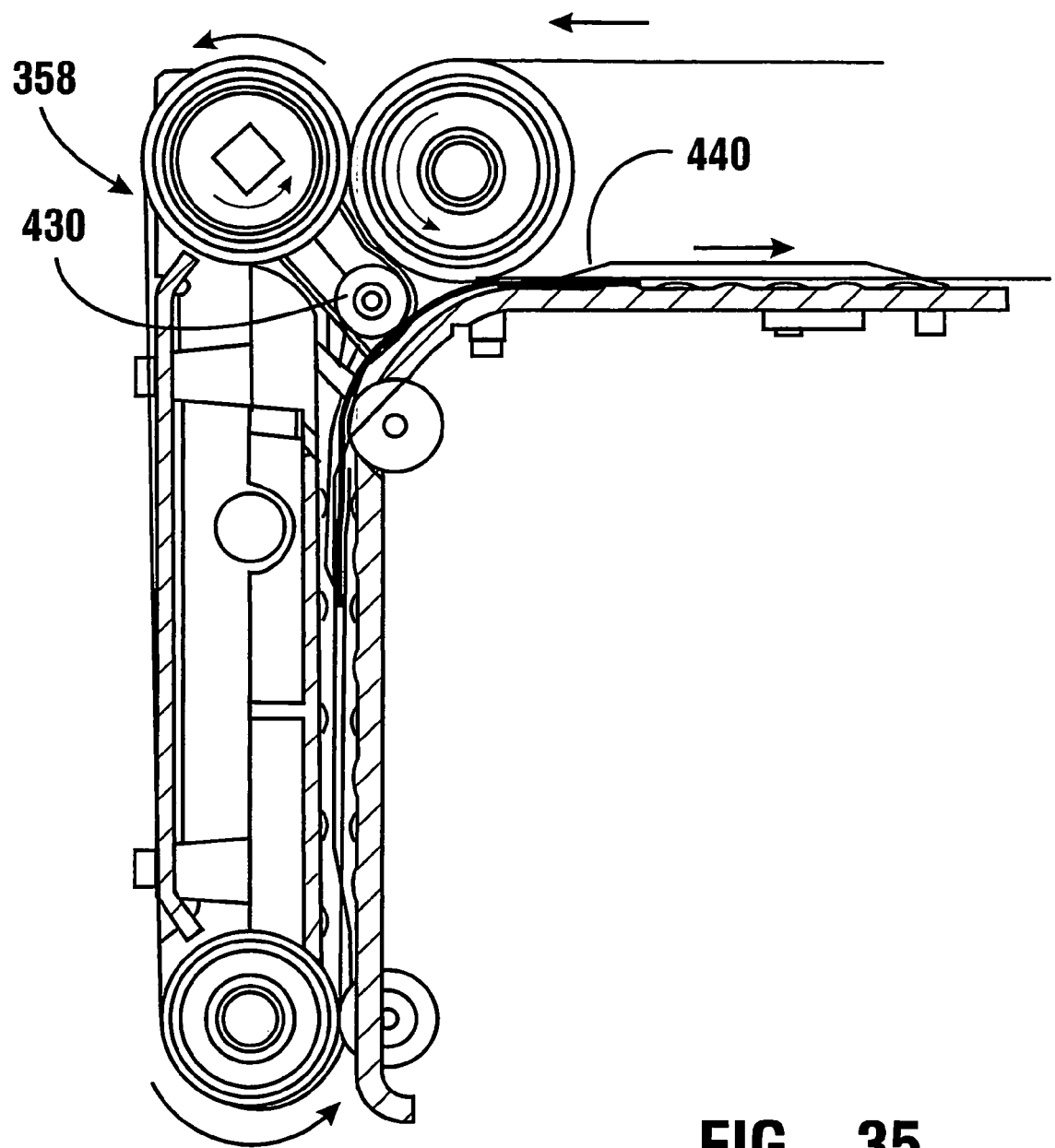
FIG. 35 shows a sheet being moved from the inlet opening toward a storage area with the gate arrangement of FIG. 32.

FIG. 32 shows the gate arrangement in the passage area. FIG. 33 shows a sheet 436 being moved from a storage area toward the consumer outlet opening 346. FIG. 34 shows a sheet 438 being moved from a storage area toward the merchant outlet opening 344. FIG. 35 shows a sheet 440 being moved from the inlet opening toward a storage area.

Figure 42:
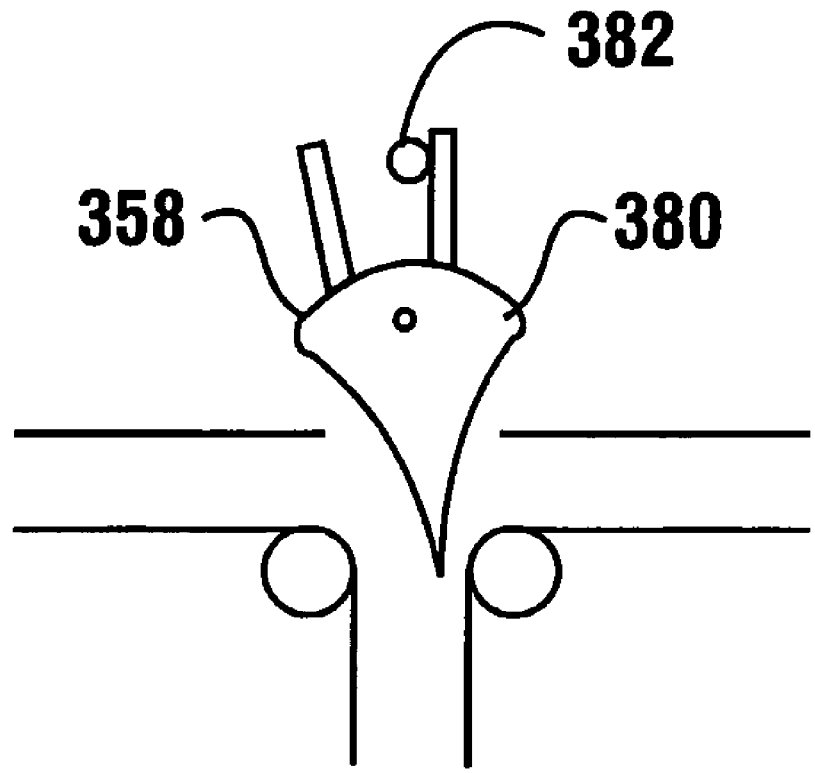
FIG. 42 shows a schematic view of a gate arrangement in the passage area of FIG. 31 in a side position.

Alternatively, the gate 358 in the passage area may be of the arrangement and operation as shown in FIG. 42. The gate may comprise one or more gate members 380. The gate may be electrically or electromagnetically driven to rotate or pivot between two positions. A stop 382 may be provided to limit movement of the gate member. The gate may be operably positioned between a single belt having an open center portion or in between two adjacent belts. A belt arrangement and operation of this type is explained in the above mentioned in U.S. Pat. No. 5,850,075.

The gate 358 operates adjacent the passage area 356 to selectively direct the sheets toward a storage area, the first sheet outlet opening, or the second sheet outlet opening. The gate member 380 is able to be moved or pivoted either to the right or left as shown in FIG. 42.

Alternatively, the gate may be of the arrangement and operation as discussed in relation to any of the previous gates, such as gates 114, 248, or 284. The gate movement is operatively controlled by the controller. The gate movement enables sheets to pass through the passage area to/from the desired opening.

A validator 588, of one of the types previously discussed in detail, may be adjacent the sheet inlet opening 342. Invalid notes may be returned to the first interface user by the sheet inlet opening 342. A lower area of the chest portion 334 may comprise a divert area 370 for notes which cannot be handled by the machine. These may be for example damaged or unidentifiable sheets which the controller causes to be moved to the divert area. In embodiments of the invention the controller may direct notes that cannot be identified by validator 588 to divert area 370.

Another gate 372 operates adjacent the validator 588 to direct incoming sheets toward storage areas 348, 350 and outgoing sheets toward the first outlet opening 344. The exemplary gate 372 is able to be moved or pivoted between the positions shown in solid and dashed lines in FIG. 31. In the position shown in solid lines, outgoing sheets are able to be moved to merchant outlet opening 344. In the dashed line position, incoming sheets are able to be moved from the validator toward a storage area. In this exemplary embodiment the gate 372 may be movable responsive to the force applied by passing sheets. Alternatively, the gate may be of the arrangement and operation as discussed in relation to any of the previous gates, such as gates 114, 248, or 284. The gate movement may be controlled by the controller. The gate movement enables sheets to pass from the validator toward a storage area, or from a storage area to the first outlet opening.

The sheet transport mechanisms may be driven by at least one drive, for example, as shown in FIG. 4, or there may be several drives. The drives may operate to move sheet moving members such as the belts previously discussed in detail. Alternatively, the drives may operate to move rollers, slides or other devices suitable for moving sheets.

As shown in FIG. 31, the sheet inlet opening 342 may have access thereto controlled by a movable closing cover 366. The cover 366 may be hinged at a location adjacent the side of the chest portion as shown to enable the cover to be pivoted in a manner permitting access to the opening 342. In the pivoted open position, the cover may rest against the side of the chest portion. This arrangement permits the cover to remain open in a hands-free position. Alternatively, doors or other closing members may be used. Another movable closing cover 368 may be provided for the merchant side outlet opening 344. Such doors or covers may be manually operated or automatically operated responsive to the controller. The covers may be of any shape or size desired to prevent the deposit and/or accumulation of dirt or other unwanted material in the openings. Additionally, the merchant interface, when located inside of door 362 is likewise protected from dirt and unwanted material.

Figure 36:
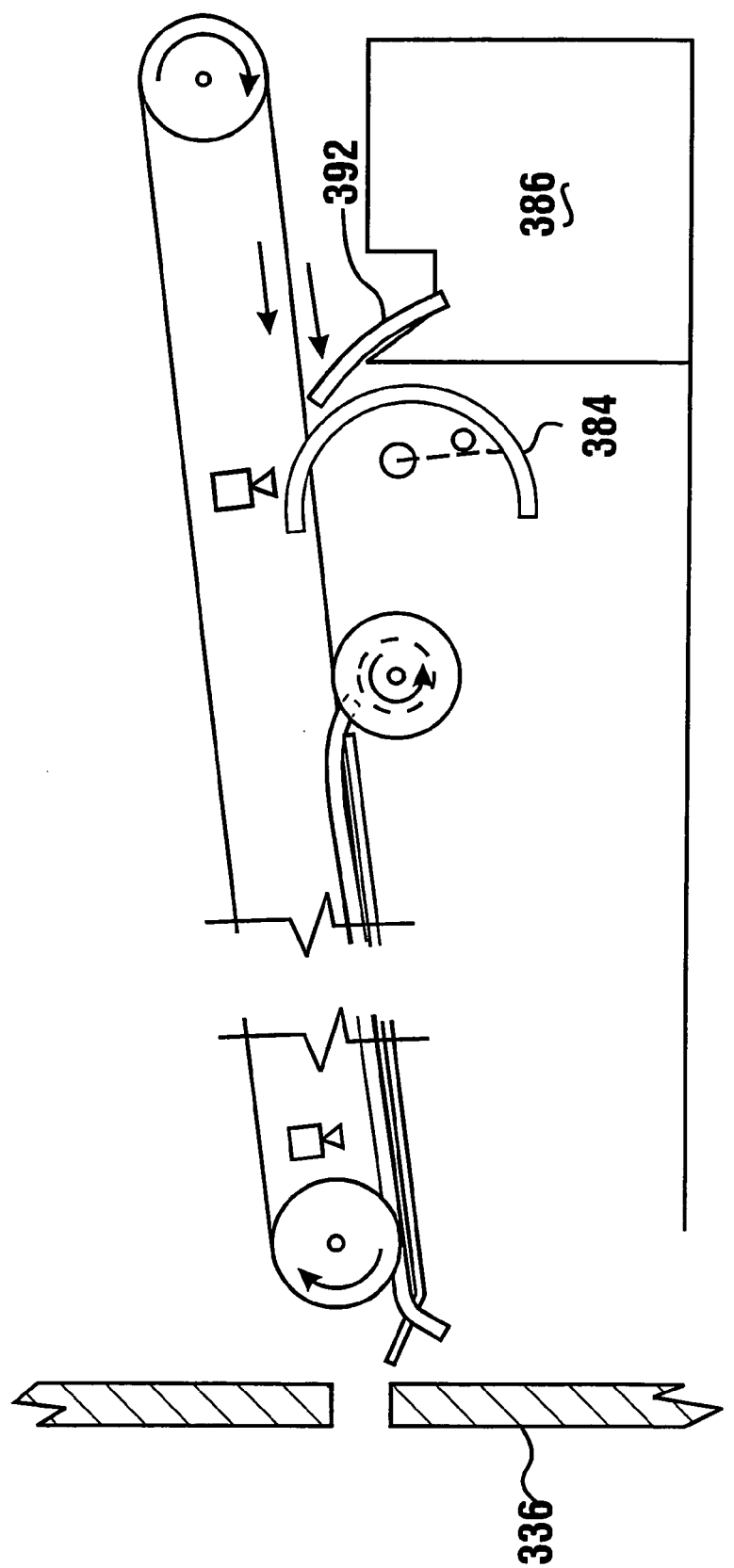
FIG. 36 shows a view of a printer dispensing and transport arrangement for dispensing a printed receipt to a receipt outlet.
Figure 37:
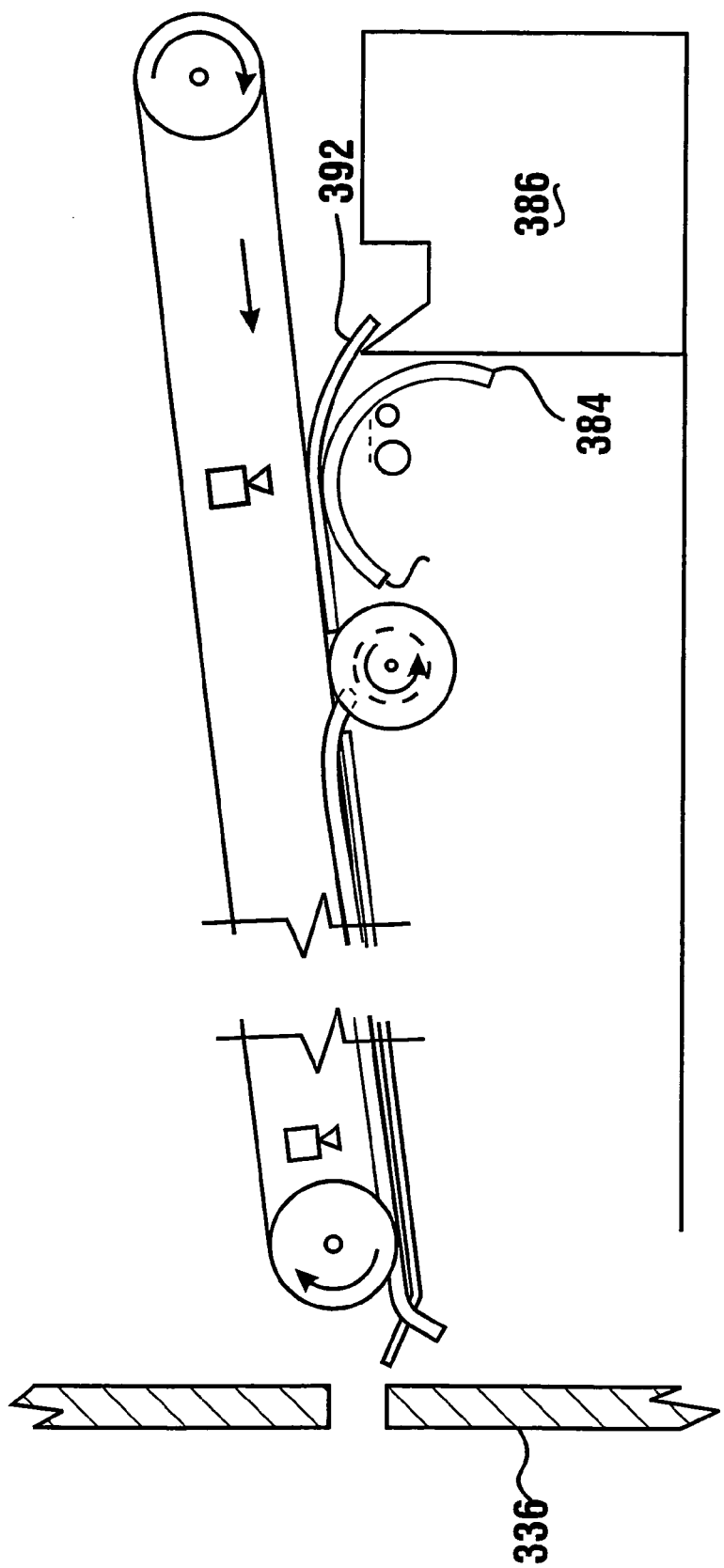
FIG. 37 shows the receipt transport of FIG. 36 in another dispensing and transport state.

Each user interface may include or be in connection with a corresponding printer, as previously discussed in detail, for example, in relation to FIGS. 2 and 3. The printer or printers are operative to produce printed receipts or other documents that are dispensed to the user. FIGS. 36 and 37 show a dispensing and transport arrangement for the receipt 392 from a printer 386. Additionally, gate member 384 operatively controlled to discard a receipt not taken by a user. A printer receipt dispensing and transport arrangement and operation of this type is explained in the above mentioned U.S. Pat. No. 5,850,075 which is incorporated herein. Furthermore, each interface may share a common printer. As shown in FIGS. 38 to 42, different gate arrangements may be used to direct a printed receipt from a common printer toward a receipt outlet at either the merchant or consumer interface.

Figure 38:
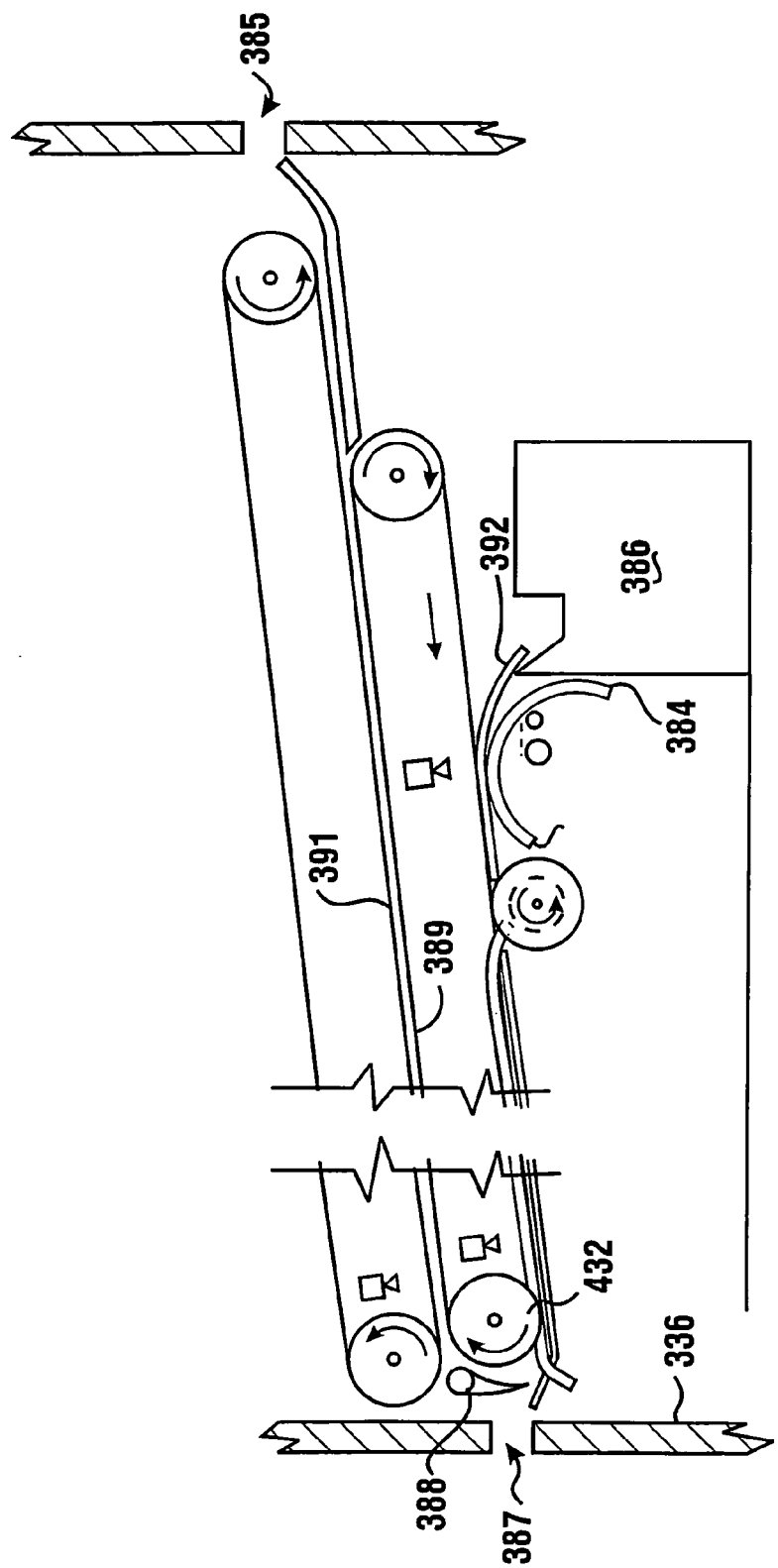
FIG. 38 shows an alternate view of a common printer dispensing arrangement based on the dispensing and transport arrangements of FIGS. 36 and 37.

The dispensing and transport arrangement of FIG. 38 is based on the arrangement shown in FIGS. 36 and 37. The portion left of the broken lines in FIG. 38 includes the receipt opening for one user interface while the area to the right includes the receipt opening for the other user interface. In FIG. 38 gate member 384 is operative to store a receipt not taken by either a merchant user or a consumer user. FIG. 38 also shows a change of direction gate member whack is selectively movable relative to roll 432. Gate member 388 is selectively operative to direct a receipt to either the first or second receipt outlet of top hat 336. As shown in FIG. 38, when gate member 388 is in a first position relative to roller 432, then the receipt is permitted to exit the adjacent outlet 387. When gate member 388 is positioned in a second position relative to the roll 432, the receipt is redirected to pass in the opposite direction to exit the opposite outlet 385 in engagement with the upper roller and belt arrangement. In this arrangement the receipt is directed by the gate 388 to move in engaged relation between upper belt flight 389 and a lower belt flight 391. Alternatively the receipt may move in other transport arrangements.

Figure 38A:
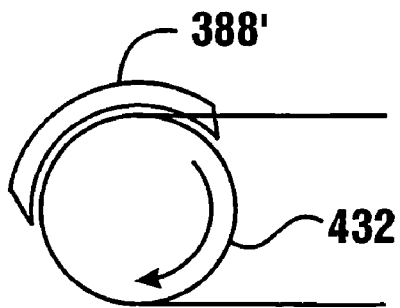
FIG. 38A shows an alternate gate member in a first position.
Figure 38B:
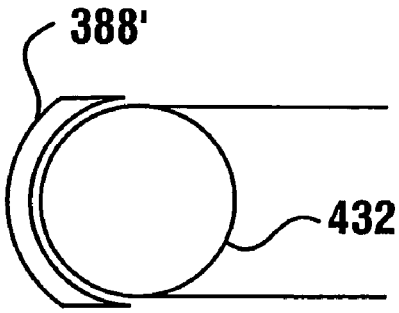
FIG. 38B shows an alternate gate member in a second position.

FIGS. 38A and 38B show an alternative gate member 388' that may be used in directing a receipt. The gate member 388 is rotatable or pivotal about the axis of rotation of roller 432. The gate member 388' of FIG. 38B may also be arranged to move laterally relative to roller 432. As shown in FIGS. 38A and 38B, the gate member 388' may be selectively positioned to either permit a receipt to pass (FIG. 38A) to the adjacent outlet or redirects (FIG. 38B) the receipt to the opposite outlet. The gate member 388' may also acts as a turnover member. Several turnover members may be used to achieve the desired receipt orientation prior to reaching the opposite outlet. The gate member 388' and transport arrangements may be of the arrangement and operation as discussed in U.S. application Ser. No. 08/980,467, the disclosure of which is fully incorporated herein by reference.

Figure 39:
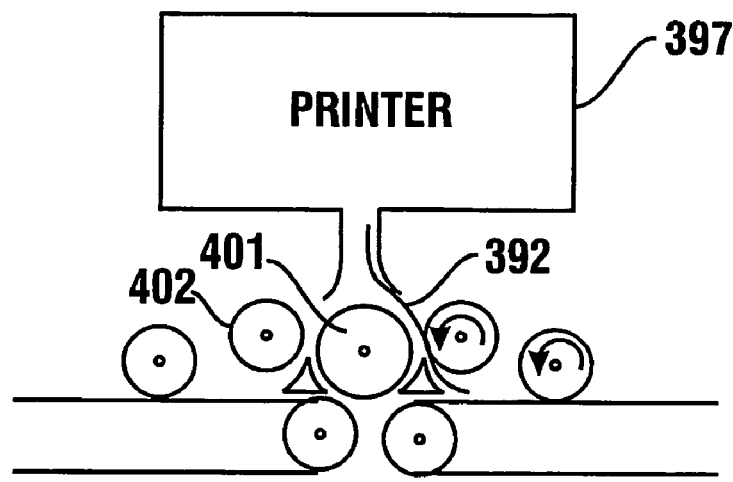
FIG. 39 shows an alternate view of a common printer dispensing and transport arrangement.

FIG. 39 shows an alternative configuration of a printer 397 which provides printed documents selectively to receipt outlets. The rotational direction of a directing roll 401 and cooperating rolls 402 operate to selectively direct a sheet 392 to a transport path.

Figure 40:
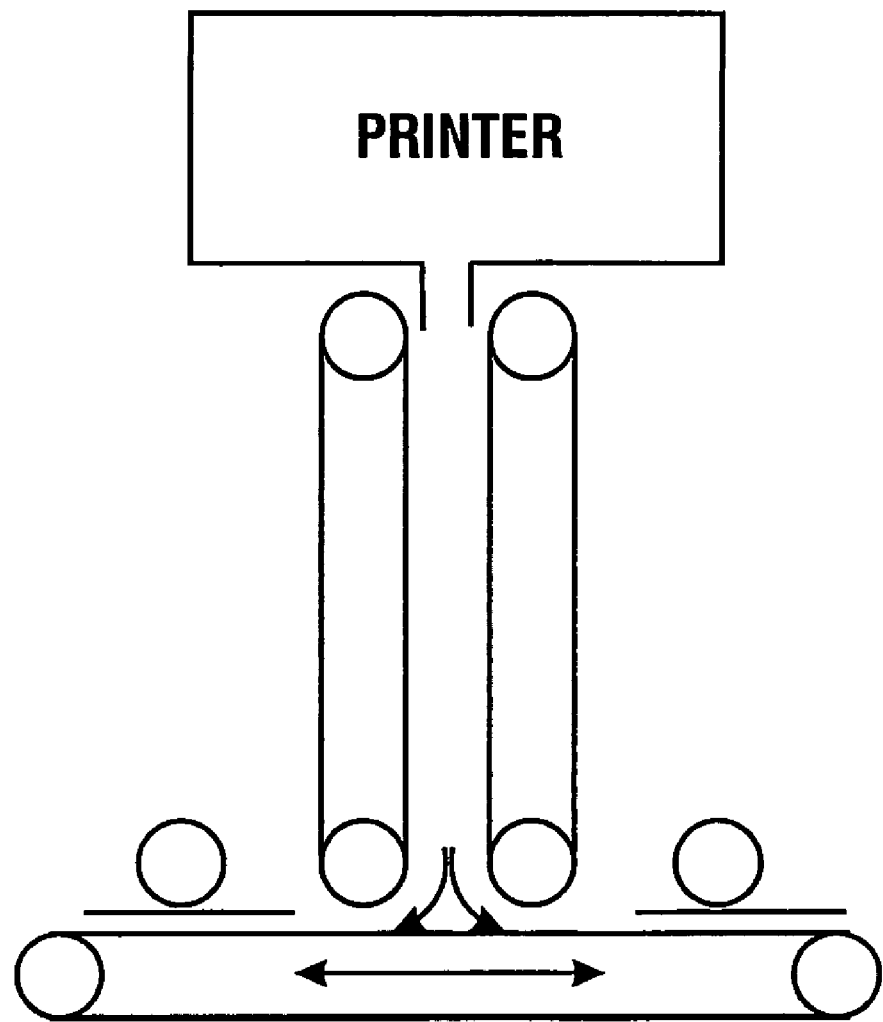
FIG. 40 shows an alternate view of a common printer dispensing and transport arrangement.
Figure 41:
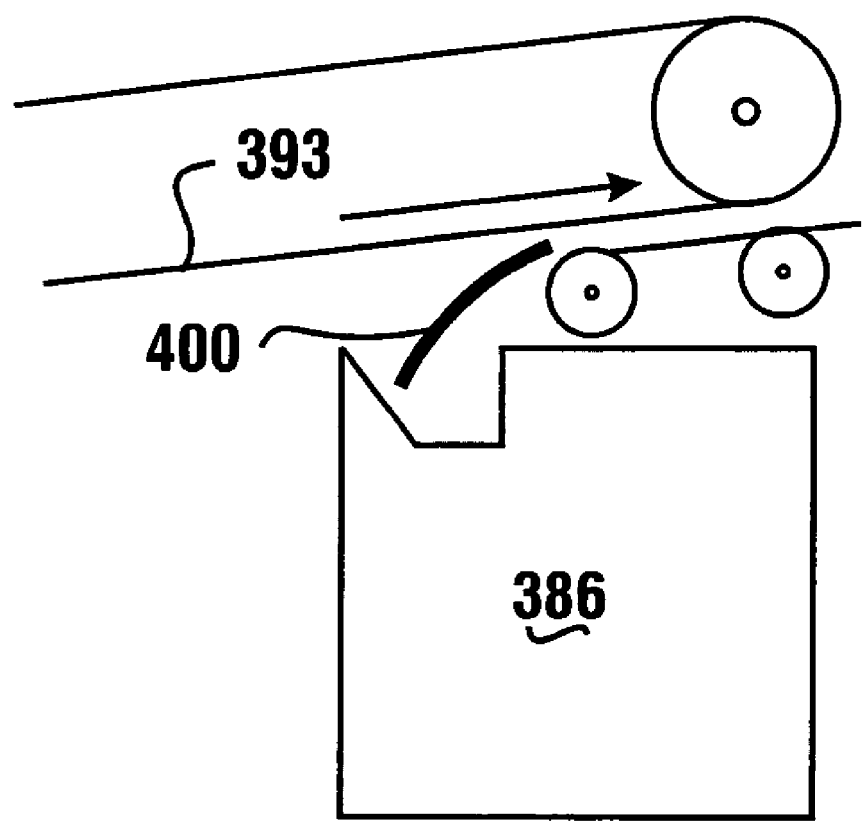
FIG. 41 shows an alternate view of a common printer dispensing arrangement based on the dispensing and transport arrangements of FIGS. 36 and 37.

FIG. 40 shows a further alternate configuration of a printer dispensing and transport arrangement. A printed receipt may be directed to either outlet. FIG. 41 shows an alternative arrangement similar to that shown in FIG. 37 in which the direction of belt flight 393 is controlled to selectively direct a printed receipt 400 from a common printer 386 to either outlet. The gate arrangement similar to that shown in FIG. 42 may also be used to direct a printed receipt from a common printer toward a receipt outlet at either the merchant or consumer interface.

Figure 43:
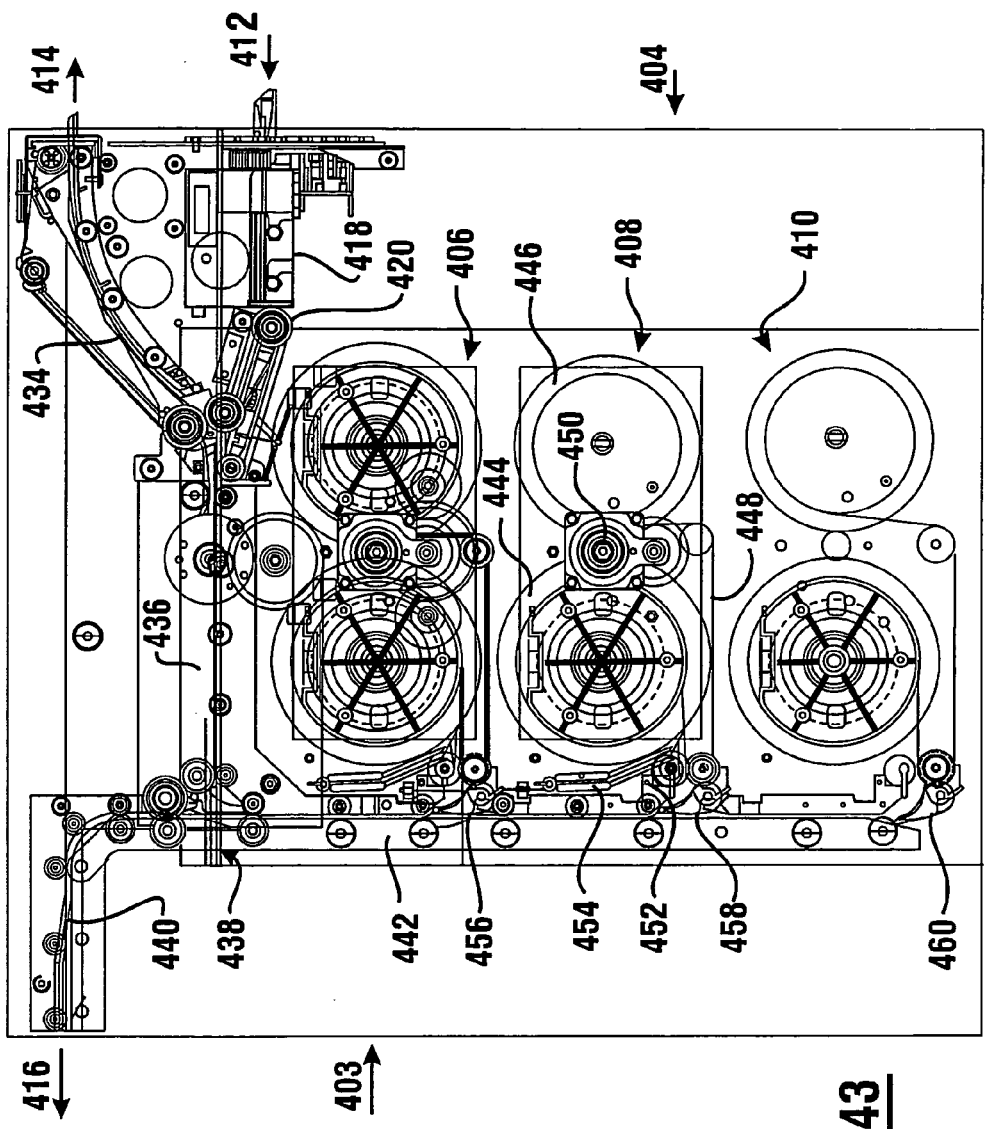
FIG. 43 is a side view of an exemplary embodiment of an automated transaction machine of the present invention.

FIG. 43 shows another exemplary embodiment of a currency recycler type of automated transaction machine 403. FIG. 43 shows a chest portion 404 including sheet receiving and dispensing mechanisms 406, 408 and 410. The detailed arrangement is similar to those previously discussed. Machine 403 includes a cashier side inlet opening 412, cashier side outlet opening 414, and consumer side outlet opening 416. Additionally, a validator 418 may be located adjacent the cashier inlet opening for validation of notes prior to storage. Inserted notes not found valid by the validator 418 may be returned to the cashier at the cashier inlet opening 412. Alternatively notes not determined as valid for the machine may be routed for return through outlet opening 414.

In machine 403, validator 418 is connected to an inlet transport 420 which may be similar to limited slip transport 108 previously described. Outlet 414 is in connection with an outlet transport 434. Outlet transport 434 functions in a manner similar to outlet transport 96 previously described. In this exemplary embodiment a gate similar to gate 114 is positioned adjacent to the intersection of inlet transport 420 and outlet transport 434. The gate operates in the manner previously discussed to selectively route sheets to the appropriate transport.

Inlet transport 420 and outlet transport 434 are connected to a lateral transport section 436. Lateral transport 436 is selectively operative responsive to the controller in the machine to move sheets either to or from the intersection of the inlet and outlet transports. Lateral transport section 436 is in operative connection with a gate 438. Gate 438 is positioned at an intersection of the lateral transport section 436 and a consumer outlet transport section 440. Gate 438 is also positioned at the intersection of the lateral transport section and a note storage transport section 442. Gate 438 is selectively operated under the control of the controller to selectively direct sheets either to or from the lateral transport section 436, consumer outlet transport section 440 or note storage transport section 442.

The sheet receiving and dispensing mechanisms 406, 408 and 410 in the exemplary embodiment are all similar in construction and are shown in various levels of detail to facilitate clarity and understanding. Each of the mechanisms 406, 408 and 410 is operatively connected with the note storage transport section 442. In the exemplary embodiment each of the sheet receiving and dispensing mechanisms is used for storing and dispensing a different denomination of currency notes. This enables the machine 403 to provide multi-denominational storage.

As each of the sheet receiving and dispensing mechanisms in this embodiment are similar, only mechanism 408 will be described in detail. The mechanisms include a note storage reel 444 and a web takeup reel 446. A flexible web 448 extends between the reels. The reels are driven by a drive 450 similar to that previously described. Driving the note storage reel 444 in a counterclockwise direction as shown enables notes to be stored in wrapped relation with the web onto the note storage reel. Likewise as previously described, driving the note storage reel in a clockwise direction as shown causes notes to be unwrapped from the note storage reel and delivered from the mechanism. Each sheet receiving and dispensing mechanism further includes nip rolls 452 which are used for guiding the sheets which are moved onto or off of the note storage reel 444. A separating member 454 similar to that previously described is also included for assuring that notes to be delivered are separated from the web.

In the embodiment shown diverter gates 456, 458 and 460 are positioned in operative connection with the note storage transport section and respectively adjacent to sheet receiving and dispensing mechanisms 406, 408 and 410. Positioning of the respective diverter gate responsive to signals from the controller enables notes traveling generally downward as shown in the note storage transport section to be engaged with a selected one of the receiving and dispensing mechanisms. This enables a note to be selectively delivered into engagement with the nip rolls of the mechanism so that it may be stored on the storage reel thereof. This operation of the controller of the machine enables selected sheets to be stored in selected receiving and dispensing mechanisms. Diverter gates 456, 458 and 460 may also be positioned so as to guide notes which are delivered from the respective mechanisms into engagement with the note storage transport section. As a result dispensed sheets are enabled to be transported through the gate 438 and selectively delivered to either the consumer side outlet opening or the cashier side outlet opening.

It should be understood that while in the exemplary embodiment shown there are three sheet receiving and dispensing mechanisms, other embodiments of the invention may include different numbers of such mechanisms. In addition the type of mechanism shown herein is but one of several types of sheet storage and/or dispensing mechanisms that may be provided in embodiments of the present invention for purposes of storing and delivering sheets. It should also be understood that while machine 403 is shown without the top hat section which includes the cashier and consumer interfaces, such interfaces as previously described may be used in connection with the machine.

Figure 44:
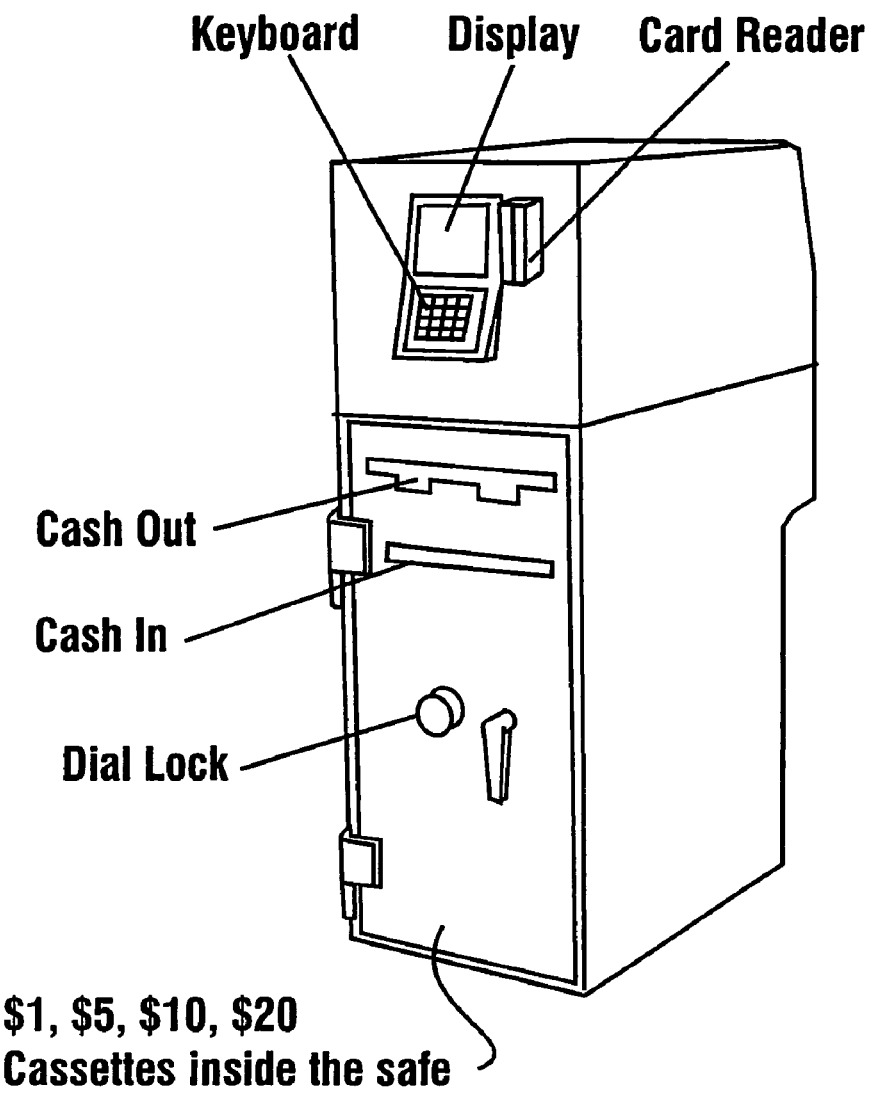
FIG. 44 is an isometric view of a stand alone automated transaction machine.

FIG. 44 shows an example of a stand alone type of automated transaction machine. The view may be used at a business/customer environment for transactions, such as through a counter.

FIG. 44 shows the merchant interface on the rear face of the machine. The consumer interface is adjacent the front side of the machine. A door and lock mechanism for the chest portion are also shown.

Figure 45:
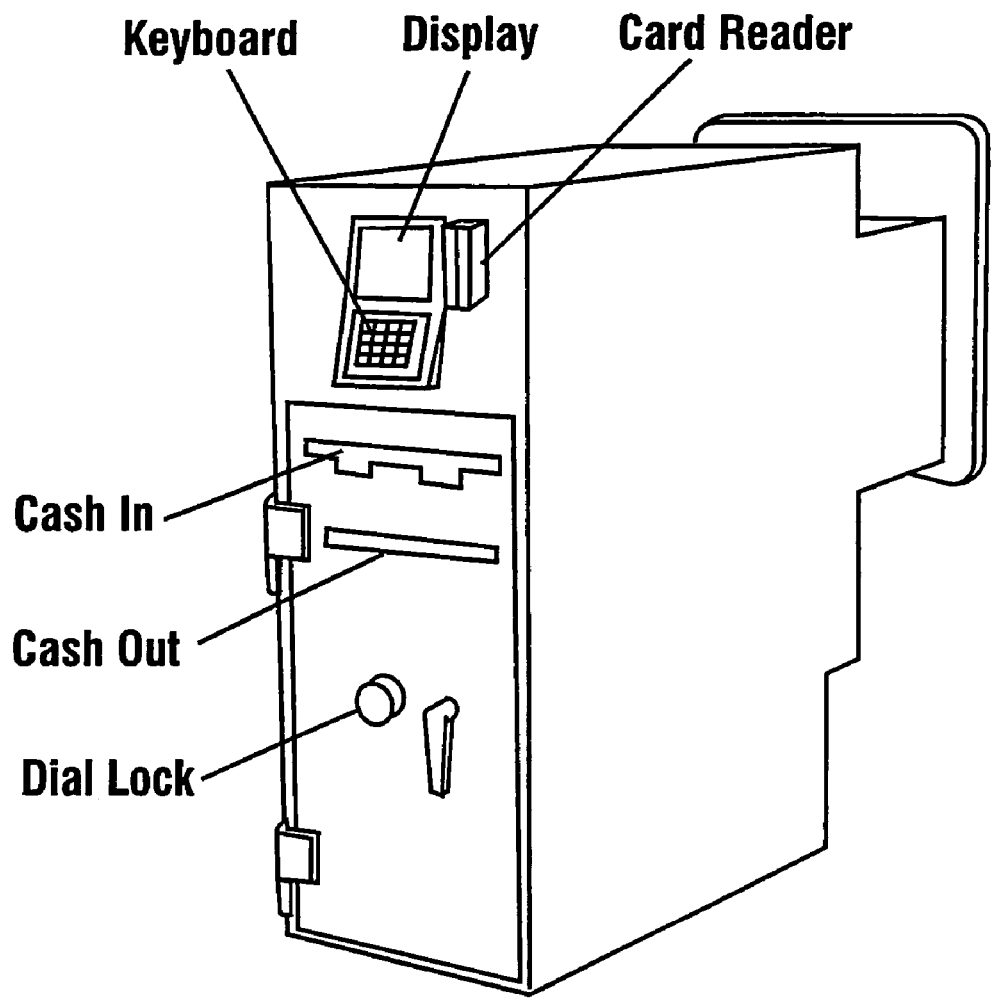
FIG. 45 is an isometric view of a through the wall type automated transaction machine.

FIG. 45 shows a through the wall type automated transaction machine which may be located to extend through a wall. The arrangement may be used when it is desirable to have the merchant interface on one side of the wall and the consumer interface on the other side of the wall. This view shows the merchant interface on the rear side of the machine. The consumer interface is adjacent the front side of the machine. A door and lock mechanism for the chest portion are also shown. Each of the machines shown in FIGS. 44 and 45 may use the sheet storage and dispensing mechanisms of FIG. 43 or other suitable arrangements.

In other exemplary embodiments, customers may use the automated transaction machine not only to obtain cash but also to pay for purchases by crediting the merchant's account. Customers may also use the machine to order items, such as food, and credit the merchant's account for the purchase. Additionally, a voucher may be printed and delivered to the customer showing a credit was made to the merchant's account. The voucher may then be used to make purchases from the merchant or an affiliated entity.

In operation of an exemplary automated transaction machine, the merchant side user may be required to input information through one or more input devices. In the machine having the configuration shown in FIG. 31 the merchant user may first need to unlock the locking mechanism to open the access door to access the cashier interface. The merchant user may then be required to pass a card through the card reader which includes account data corresponding to the business. Additionally, the merchant user may also be required to input a personal identification number through the keys of a keypad. The user may then be prompted with a series of prompts or questions.

In response to the user's inputs the controller is operative to determine whether the user is authorized to operate the machine and/or to deposit or withdraw amounts as requested. This may be done in some embodiments based on data stored in local memory in the machine. Alternatively, the controller may communicate with a remote computer system through a communications device to verify whether the merchant user may operate the machine.

In the exemplary embodiments of the invention, identification of the merchant side user of the transaction machine for use in authorizing machine operation may be determined based on the user's appearance and/or voice characteristics and/or other biometric information and/or card information. For example, an identification of the merchant side user of the transaction machine may be based on an iris scan of the user and/or the user's voice characteristics.

If it is determined that the merchant user is authorized to operate the machine, the controller operates in accordance with its programming to present the merchant user with one or more prompt messages through the output device of the cashier interface 352. These output messages in the exemplary embodiment request that the merchant user provide an input to indicate whether they wish to withdraw cash from the machine or to input cash. If the merchant user provides an input through an input device of the cashier side interface indicating that they wish to input funds, the output device then prompts the user to input cash through the cashier side inlet opening. As previously discussed this may be done one sheet at a time or in embodiments which include the capabilities of handling a stack of bills, an entire stack may be input to the machine. As the merchant user performs the cash input operation, the controller operates the output device on the cashier interface so that the user is instructed to provide a further input to indicate when they have completed the cash input operation. In alternative embodiments of the invention the controller may operate to provide a running total on the output device as to the value of the bills that have been input by the merchant user. Thus as notes pass through the validator and are verified, the total amount input as indicated on the screen of the cashier interface increases.

As the notes are received by the machine, the controller operates the transports and sheet receiving and dispensing mechanisms to route the notes to the appropriate mechanism for storage. The storage and dispensing mechanisms are then operated as the notes arrive so that they are stored therein. Sheets which are unsuitable or unidentifiable may be returned to the merchant user or routed to a divert area based on the programming of the controller.

Upon completion by the merchant user of the note input transaction, the merchant user may indicate that they are finished by providing an input through the cashier interface. In the exemplary embodiment the controller is then operative to cause a receipt to be printed for the merchant user. This receipt may include the total amount of money input and may be used as evidence by the merchant user that the money was deposited. Embodiments of the invention may be programmed to provide the merchant user with additional information which may be of value in the operation of the merchant's business. This may include for example the particular name of the merchant user associated with the card and/or PIN used for accessing the machine. The receipt information may also include in addition to the total value of money input, the particular number and denomination of each bill type deposited. The receipt may also include other information such as the character of any unsuitable notes which were deposited, the time the deposit was made, the amount and/or numbers of denominations of notes in the machine before and/or after completion of the transaction or any other information that may be useful in the operation of the merchant's business.

The printed receipt is delivered to the merchant user by an appropriate transport mechanism. This may include for example a transport and gate mechanism which delivers the receipt through the housing of the machine when the cashier interface is positioned outside of the machine. Alternatively in configurations of machines such as those shown in FIG. 31, the receipt may be delivered to the merchant user inside the top hat.

In the exemplary embodiments of the invention, a record of the input transactions may include information based on the user's appearance and/or voice characteristics and/or other biometric information and/or card information. For example, the transaction machine may receive money deposited by a merchant employee, then make a record based on the employee's appearance and/or voice characteristics and/or other biometric information and/or card information. This permits the operator and/or owner of the establishment to have a record of depositing money into the machine.

After the completion of the deposit transaction the merchant user may be prompted through, messages output through the interface to indicate whether they wish to conduct another transaction. Such transactions may include additional deposits or the dispensing of cash from a machine. Assuming that the merchant user provides an input indicating that they do not wish to conduct further transactions, the controller operates the machine to close the session and the machine is now ready for operation by consumers or further merchant users. In the case of an embodiment of the machine where the cashier interface is within the interior of the machine, the merchant user would also close the door used to access the cashier interface. This protects the cashier interface from dirt and other contaminants that may be found in the merchant's environment. It has been found that the use of a cashier interface which is enclosed within the machine is particularly well adapted for use in fast food environments and other environments where airborne contaminants otherwise may collect and eventually impede the operation of a merchant interface.

Merchant users may also use exemplary embodiments of the invention to obtain cash for use in operation of the merchant's business. This may be done by the merchant user accessing the machine in the manner previously described such as through use of a card and PIN number. If the machine is of the type where the cashier interface is disposed within the machine it necessary for the merchant user to open the machine in order to gain access to the card reader and key pad and other input and output devices. Once the user has identified themself to the machine and has been determined to be an authorized user, the merchant user is presented with the prompt messages which request an input concerning the type of transaction to be conducted. Alternatively after a merchant user has conducted a prior transaction such prompt messages may be presented. If the merchant user inputs a request to withdraw funds, the controller operates the machine so as to provide appropriate output messages. In response to these messages, the merchant user may indicate the amount of funds that they wish to withdraw.

In some embodiments the controller may operate to provide the merchant user with messages prompting the user to indicate the number and denomination of notes they wish to receive. This may be valuable to a merchant user who requires particular denominations of notes from the machine to carry out the efficient operation of their business, such as for making change. Various approaches to presenting merchant users with drawal options may be provided in embodiments of the invention through programming of a controller which controls operation of the machine.

In response to the merchant user providing the inputs corresponding to the amount and/or types and numbers of notes they wish to withdraw, the controller operates the machine to deliver the requested bills through the cashier side outlet opening. The controller operates the appropriate sheet receiving and dispensing mechanisms, transports, gates and other mechanisms to direct the bills to the merchant user. Once the bills have been delivered the merchant user may take them for use in operation of the business. After the completion of the dispensing operation the machine may provide the merchant user with a receipt indicating the amounts, types of notes and other information concerning the withdrawal transaction and/or status information concerning the machine. The merchant user may use the receipt for purposes of tracking the whereabouts of cash within the business as well as for auditing the operation of the machine. Of course the controller may also operate to present the merchant user with additional transaction options. The merchant user may provide inputs requesting such additional transactions or may provide an input ending the session so that they are signed off the machine. As previously discussed, in embodiments where the cashier interface is positioned within the machine the merchant user will generally close and/or lock the door when merchant transactions are not being conducted.

It should be understood that while merchant transactions are authorized in the exemplary embodiment using data encoded on a card and a corresponding PIN number, other approaches to authorizing operation of the machine by merchant users may be used. This may include for example a card or access code alone. Other forms of the invention may use other types of identifying articles or features to identify merchant users. This may include for example tokens which can be read by token readers or other types of identifying articles which can be read by a machine. Alternatively, the machine may include biometric type reading devices which are capable of reading a physical feature associated with a merchant user. These may include for example fingerprint readers, retina scanners, iris scanners, facial recognition features, voice recognition features or combinations of any of the above.

Also, in the exemplary embodiments of the invention, authorization and/or identification of the merchant side user of the transaction machine may be determined based on the user's appearance and/or voice characteristics and/or other biometric information and/or card information.

It should further be understood that records of all transactions conducted by exemplary embodiments of the invention are recorded and stored in a data store. In the exemplary embodiments of the invention, the records of the transactions may include information based on the user's appearance and/or voice characteristics and/or other biometric information and/or card information. Records of such transactions may be held within the machine and/or may be recorded in remote storage associated with other computers which are in communication with the machine through a communications device. This enables the operator of the machine to review transaction activities conducted through the machine. It further enables the merchant user to compare records of merchant transactions which are provided through receipts in hard copy form, to the electronic data concerning the operation of the machine. Various approaches to auditing and balancing the machine may also be employed to assure that all transactions and monetary amounts are accounted for in the operation of the business.

As can be appreciated, the exemplary embodiments of the present invention also enable consumers to operate the transaction machine. Consumers operate the machine through the consumer interface which includes input and output devices. For example, a consumer may present a card to a card reader which provides an input including an account number associated with the consumer. Likewise the consumer may present a PIN number which corresponds to the consumer or their account and is used to verify that the consumer is authorized to use the account associated with the card. Thereafter the controller operates in response to the input data from the consumer to determine whether the consumer is authorized to conduct a withdrawal of cash from the machine. Generally this is done through communication by the controller through a communications device to a remote computer. The consumer interface also operates responsive to the controller to prompt the consumer to indicate through inputs the amount of money they wish to withdraw. The interface may also provide the consumer with an indication of the transaction surcharges that may be associated with a requested transaction. Of course other information may also be presented to the consumer such as advertising or promotional information as previously discussed.

Assuming that the consumer is authorized to conduct a transaction the controller will operate the sheet receiving and dispensing mechanism within the machine to provide the consumer with the requested cash. In addition the controller will cause a receipt to be printed which provides the consumer with information concerning the transaction. The controller will also route the receipt to the consumer interface through an appropriate gate or transport mechanism so that the receipt may be taken by the consumer.

Thus the exemplary embodiments of the present invention may operate to provide consumers with cash in the manner of an automated teller machine while providing a merchant with a device which can be used to store, retrieve and track cash used in the operation of business. Exemplary embodiments of the invention also reduce the need for merchant users to access the interior areas of the machine for purposes of loading or dispensing cash therefrom. Exemplary embodiments of the invention also enable merchant users to limit access to cash to selected employees and to do so in a manner that provides a reliable audit trail related to the input and dispensing of cash. Embodiments of the present invention also enable a merchant user to make more effective use of the cash that they receive in their business and to pursue profit making opportunities for the merchant by being able to collect a portion of transaction fees that may be charged on transactions conducted by consumers at the machine. In addition embodiments of the invention as described herein are better suited for use in environments where contaminants may be present. Likewise embodiments of transaction machines of the present invention may be configured in a variety of ways suitable for use in various types of transaction environments.

Thus the automated transaction machines of the present invention achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method comprising:
   (a) receiving at least one input from a machine user through operation of at least one input device of a banking transaction machine, wherein the machine includes a keypad, a cash dispenser, and a card reader operable to read data from a card corresponding to a financial account;
   (b) operating the machine to dispense cash from the cash dispenser for a financial Account, responsive at least in part to a determination made as to whether voice data recieved from the machine user corresponds to stored voice data in at least one data store,
      (i) wherein when the determination indicates that the voice data received corresponds to stored voice data in the at least one data store, then the machine operates to dispense the cash without requiring the card reader to read card data that corresponds to the financial account;
      (ii) wherein when the determination indicates that the voice data received does not correspond to stored voice data in the at least one data store, then the machine operates to dispense the cash based at least in part on communication from a host system verifying that the user is authorized to withdrawal cash from the financial account responsive at least in part to at least one of:
         card data read from a card by the card reader; corresponding to the financial account, and
         data received through operation of the keypad, corresponding to a personal identification number (PIN), and
      wherein (ii) causes the at least one data store to be updated with data associated with the voice data received.

2. The method according to claim 1 and further comprising:
   c) prior to (b), receiving an audio input signal that includes the voice data received from the machine user, from an audio input device;
   d) responsive to the audio input signal received in (c), generating the determination as to whether the voice data received corresponds to stored voice data in the at least one data store.

3. The method according to claim 2, wherein in (c) the audio input device includes a microphone.

4. The method according to claim 2, wherein in (d) the determination includes operation of voice recognition software.

5. The method according to claim 2, wherein in (d) the determination includes operation of a speech recognition device.

6. The method according to claim 1 wherein (b) further includes operating the machine responsive to a further determination made as to whether image data of the user acquired with a camera corresponds in the at least one data store to the voice data received from the machine user.

7. A method comprising:
   operating at least one computer associated with an automated banking machine and including computer executable instructions, to
   (a) cause the machine to receive voice data provided by a user during a user session with the machine;
   (b) subsequently cause, responsive at least in part to a determination that voice data received in (a) does not correspond to user voice data in at least one authorized user data store, the machine to receive non audible data from the user during the user session; and
   (c) subsequently cause, responsive at least in part to a determination that non audible data received in (b) corresponds to non audible user data in the at least one authorized user data store, both
      (ci) the machine to allow during the user session, the user to request a transaction involving a financial account associated with the non audible user data received in (b), and
      (cii) the at least one authorized user data store to be updated with user voice data corresponding to the voice data received in (i).

8. The method according to claim 7 wherein the machine includes a cash dispenser, wherein (ci) allows the user to request a transaction that involves operation of the cash dispenser.

9. The method according to claim 7 wherein the machine includes at least one computer, wherein the at least one computer is operable to communicate with a banking system host computer, and further comprising:
   (d) prior to (b), operating at least one computer to receive responsive at least in part to communication with the host computer, the determination that the voice data received in (a) does not correspond to user voice data in the at least one authorized user data store; and
   (e) prior to (c), operating at least one computer to receive responsive at least in part to communication with the host computer, the determination that the non audible data received in (b) corresponds to non audible user data in the at least one authorized user data store.

10. The method according to claim 7 wherein the machine includes at least one manual input device, wherein (b) includes causing the machine to receive non audible data through the at least one manual input device.

11. The method according to claim 10 wherein the at least one manual input device includes at least one of a keypad and at least one data reader, wherein (b) includes causing the machine to receive non audible data through the at least one of the keypad and the at least one data reader.

12. The method according to claim 11 wherein the at least one data reader includes at least one of a card reader and a biometric reader, wherein (b) includes causing the machine to receive non audible data through the at least one of the card reader and the biometric reader.

13. Apparatus comprising:
   at least one computer associated with an automated banking machine,
      wherein the at least one computer includes computer executable instructions configured to
         (i) cause the machine to receive voice data provided by a user during a user session with the machine;
         (ii) subsequently cause, responsive at least in part to a determination that voice data received in (i) does not correspond to user voice data in at least one authorized user data store, the machine to receive non audible data from the user during the user session; and
         (iii) subsequently cause, responsive at least in part to a determination that non audible data received in (ii) corresponds to non audible user data in the at least one authorized user data store, both
            the machine to allow during the user session, the user to request a transaction involving a financial account associated with the non audible user data received in (ii), and
            the at least one authorized user data store to be updated with user voice data corresponding to the voice data received in (i).

14. The apparatus according to claim 13
wherein the at least one computer is configured to cause the machine to receive the voice data provided by the user in the form of a spoken phrase,
wherein the at least one computer includes speech recognition software,
wherein the at least one computer is configured to
(a) determine whether the spoken phrase audibly matches user speech data in the at least one authorized user data store, responsive at least in part to the speech recognition software,
(b) determine words used in the spoken phrase
(c) determine order of the words determined in (b)
(d) determine whether the order determined in (c) matches user word order data in the at least one authorized user data store, and
(e) responsive at least in part to a positive determination in both (a) and (d), further determine a corresponding financial account from the at least one authorized user data store,
wherein the at least one computer is configured to cause the machine to allow a user to request a transaction involving a financial account determined in (e) based solely on the machine receiving only the spoken phrase from the user.

15. The apparatus according to claim 14 wherein the machine includes a cash dispenser,
wherein the at least one computer is configured to cause based solely on the machine receiving only the spoken phrase from the user, the machine to allow the user to request a transaction which involves both the financial account and operation of the cash dispenser.

16. The apparatus according to claim 13 wherein the machine includes the at least one computer,
wherein the at least one computer is configured to communicate with a banking system host computer to receive
data indicative of a determination that the voice data received does not correspond to user voice data in at least one authorized user data store, and
data indicative of a determination that the non audible data received corresponds to non audible user data in the at least one authorized user data store.

17. The apparatus according to claim 13 wherein the machine includes at least one manual input device, wherein the machine is operable to receive the non audible data through the at least one manual input device.

18. The apparatus according to claim 17 wherein the at least one manual input device includes at least one of a keypad and at least one data reader, wherein the machine is operable to receive the non audible data through the at least one of the keypad and the at least one data reader.

19. The apparatus according to claim 18 wherein the at least one data reader includes at least one of a card reader and a biometric reader, wherein the machine is operable to receive the non audible data through the at least one of the card reader and the biometric reader.

* * * * *